United States Patent
Taguchi et al.

(10) Patent No.: US 7,037,365 B2
(45) Date of Patent: *May 2, 2006

(54) INK SET, INK CARTRIDGE, INK JET PRINTER AND RECORDING METHOD

(75) Inventors: Toshiki Taguchi, Shizuoka (JP); Yoshiharu Yabuki, Kanagawa (JP); Tomohiro Chino, Kanagawa (JP); Naotaka Wachi, Shizuoka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 183 days.

This patent is subject to a terminal disclaimer.

(21) Appl. No.: 10/645,797

(22) Filed: Aug. 22, 2003

(65) Prior Publication Data

US 2004/0053988 A1 Mar. 18, 2004

(30) Foreign Application Priority Data

Aug. 22, 2002 (JP) ............................ P.2002-242237

(51) Int. Cl.
*C09D 11/02* (2006.01)

(52) U.S. Cl. .................. 106/31.46; 106/31.27; 106/31.48; 106/31.49; 106/31.5; 106/31.52

(58) Field of Classification Search ............. 106/31.27, 106/31.48, 31.5, 31.52, 31.46, 31.49
See application file for complete search history.

(56) References Cited

U.S. PATENT DOCUMENTS

| | | | |
|---|---|---|---|
| 3,907,769 A | 9/1975 | Dehnert et al. | |
| 4,818,285 A | 4/1989 | Causley et al. | |
| 5,888,284 A | 3/1999 | Engel | |
| 5,980,623 A | 11/1999 | Hiraoka et al. | |
| 6,099,625 A | 8/2000 | Bradbury et al. | |
| 2004/0053988 A1* | 3/2004 | Taguchi et al. ............ | 514/419 |
| 2004/0070654 A1* | 4/2004 | Taguchi et al. ............ | 347/100 |
| 2004/0080596 A1* | 4/2004 | Taguchi et al. ............ | 347/100 |
| 2004/0154496 A1* | 8/2004 | Taguchi .................... | 106/31.48 |
| 2004/0187734 A1* | 9/2004 | Ozawa et al. ............. | 106/31.27 |
| 2004/0187736 A1* | 9/2004 | Taguchi et al. .......... | 106/31.27 |
| 2004/0187738 A1* | 9/2004 | Taguchi et al. .......... | 106/31.48 |

FOREIGN PATENT DOCUMENTS

| | | |
|---|---|---|
| EP | 0 422 668 A2 | 4/1991 |
| EP | 0 761 771 A2 | 3/1997 |
| GB | 2 289 473 A | 11/1995 |
| JP | 2002-249677 A | 9/2002 |
| JP | 2002-256167 A | 9/2002 |
| JP | 2002-275386 A | 9/2002 |
| JP | 2002-285050 A | 10/2002 |
| JP | 2002-294097 A | 10/2002 |
| JP | 2002-302623 A | 10/2002 |
| JP | 2002-309115 A | 10/2002 |
| JP | 2002-309116 A | 10/2002 |
| JP | 2002-309118 A | 10/2002 |
| JP | 2002-322151 A | 11/2002 |
| JP | 2002-327132 A | 11/2002 |
| JP | 2002-371079 A | 12/2002 |
| JP | 2002-371214 A | 12/2002 |
| JP | 2003-3086 A | 1/2003 |
| JP | 2003-3099 A | 1/2003 |
| JP | 2003-3109 A | 1/2003 |
| JP | 2003-12952 A | 1/2003 |
| JP | 2003-12956 A | 1/2003 |
| JP | 2003-49100 A | 2/2003 |
| JP | 2003-64275 A | 3/2003 |
| JP | 2003-64287 A | 3/2003 |
| JP | 2003-119415 A | 4/2003 |
| WO | WO 02/083795 A2 | 10/2002 |

OTHER PUBLICATIONS

European Search Report dated Dec. 15, 2003.

* cited by examiner

*Primary Examiner*—Helene Klemanski
(74) *Attorney, Agent, or Firm*—Sughrue Mion, PLLC

(57) ABSTRACT

The present invention provides an ink set, in which in ink jet recording, an ejection stability is enhanced, hues, light resistance and water resistance of an image obtained are made excellent, and image keeping quality under severe conditions is improved, wherein the color ink set comprising a plurality of inks different in hues in order to record on a recording medium, the ink set comprising as a black ink at least a specified coloring agent, which has a $\lambda$max of 500 nm to 700 nm and a half value width in an absorption spectrum of a dilute solution normalized to an absorbance of 100 nm or more, an ink cartridge containing the same, an ink jet printer carrying them, and an image recording method.

15 Claims, No Drawings

INK SET, INK CARTRIDGE, INK JET PRINTER AND RECORDING METHOD

FIELD OF THE INVENTION

The present invention relates to an ink set for ink jet recording high in quality of an image obtained, excellent in keeping quality, and moreover, excellent in ejection stability, a cartridge and an image recording method.

BACKGROUND OF THE INVENTION

With the recent popularization of computers, ink jet printers have been widely used for making prints on paper, films, cloth and so on, not only in offices but also in homes.

The ink jet recording processes include a system in which ink droplets are ejected by the application of pressure with piezoelectric elements, a system in which bubbles are generated in ink by heat, thereby ejecting ink droplets, a system using a ultrasonic wave and a system in which ink droplets are sucked and ejected by electrostatic force. As inks for ink jet recording used in these systems, aqueous inks, oil-based inks and solid (melt type) inks are used. Of these inks, the aqueous inks have prevailed from the viewpoints of easy production, convenience in handling, odors and safety.

Coloring materials used in these inks for inkjet recording have been required to have excellent solubility in solvents, the possibility of high-density recording, good hues, excellent resistance against light, heat, air, water and chemicals, good fixing properties and the difficulty of blotting to image-receiving materials, excellent keeping quality as the inks, no toxicity, high purity and furthermore availability at low cost. However, it is extremely difficult to seek a coloring material satisfying these requirements at high levels. In particular, a coloring material having a good magenta hue and excellent in light fastness has been strongly desired.

Various dyes and pigments have been already proposed as those for ink jet, and practically used. However, no coloring material satisfying all of these requirements has been discovered yet under the present circumstances. It is difficult to allow both the hue and the fastness required for the inks for ink jet recording to be compatible with each other, by using the dyes and pigments that have hitherto been well known (such as those having Color Index (C.I.) Number). As dyes improving fastness, there have been proposed azo dyes derived from aromatic amines and 5-membered heterocyclic amines described in JP-A-55-161856 (the term "JP-A" as used herein means an "unexamined published Japanese patent application"). However, these dyes have unfavorable hues in yellow and cyan regions, so that they have the problem of deteriorating color reproduction. JP-A-61-36362 and JP-A-2-212566 disclose inks for ink jet recording intending to allow hues and light fastness to be compatible. However, dyes used therein are insufficient in solubility in water, when used as water-soluble inks. Further, when the dyes described therein are used as water-soluble ink-jet ink, a problem is encountered also with regard to wet heat fastness. As means for solving these problems, there have been proposed compounds and ink compositions described in JP-T-11-504958 (the term "JP-T" as used herein means a published Japanese translation of a PCT patent application). Further, in order to improve hues and light fastness, inks for ink jet recording using pyrazolylanilineazo are described in Japanese Patent Application No. 2000-80733. However, in these inks for ink jet recording, it has become clear that deterioration of images occurs in some cases, when the inks are placed under severe conditions such as long-term storage at high temperatures, or when a gas such as a nitrogen oxide or ozone coexists therewith. In order to improve these disadvantages, the dye species has been studied. However, in gray or a secondary color such as blue, the effect of fastness is not sufficiently observed only when one kind of dye is changed, because of off-balanced hues. Further, the fastness becomes worse in some cases by an interaction due to mixing of two kinds of dyes. Accordingly, an ink set which can significantly improve the fastness, a cartridge, a printer using them, and highly fast printed matter have been desired.

SUMMARY OF THE INVENTION

It is therefore an object of the invention to provide an ink set excellent in respect to handling, odors and safety, high in ejection stability, moreover also excellent in hues, light resistance and water resistance of an image obtained, having no drawback with regard to image quality such as blotting of a thin line, and improved in image keeping quality under severe conditions. Another object of the invention is to provide an ink set, a cartridge and an image recording method, in which even an ink kept for a long period of time or under severe conditions is high in ejection stability.

Various studies by the present inventors have proved that the use of a specific black ink as an ink for ink jet recording provide highly fast printed matter without the deterioration of an image even under severe conditions such as long-term storage at high temperatures or under conditions in which a gas coexists. The deterioration of an image under severe conditions and/or under the coexistence of a gas is particularly remarkable on image receiving paper containing a white inorganic pigment in an image receiving layer, and it is presumed that the deterioration is affected by the reaction with the white inorganic pigment itself or the gas component adsorbed by the white inorganic pigment, as well as the deterioration reaction caused by heat.

That is to say, the invention relates to an ink cartridge containing integrally a specific black ink or independently at least a part thereof, in which a yellow ink, a magenta ink and a cyan ink are used in combination. Further, the invention relates to an ink jet printer and an image recording method using this ink set or ink cartridge.

That is to say, the invention relates to an ink set, an ink cartridge, an ink jet printer and an image recording method, as described below:

1. An ink set comprising a plurality of inks different in hues, wherein the plurality of inks includes a black ink containing a coloring agent that is a dye having: a λmax of 500 nm to 700 nm; a half value width of 100 nm or more in an absorption spectrum of a dilute solution normalized to an absorbance of 1.0; and a forced fading rate constant of $5.0 \times 10^{-2}$ [hour$^{-1}$] or less, in which the forced fading rate constant is decided by dissolving and/or dispersing the dye in an aqueous medium to form an ink composition for ink jet recording, printing the ink composition on a reflection type medium, thereafter measuring a reflection density through a Status A filter, specifying one point having a reflection density ($D_B$) in an yellow region of 0.90 to 1.10 as an initial density of the ink, forcedly fading the printed matter by use of an ozone fading tester that can regularly generate 5 ppm of ozone, and determining the time taken until the reflection density reaches 80% of the initial density.

2. An ink set comprising a plurality of inks different in hues, wherein the plurality of inks includes a black ink containing a coloring agent that is a dye represented by the following general formula (1), the dye having: a λmax of 500 nm to 700 nm; and a half value width of 100 nm or more in an absorption spectrum of a dilute solution normalized to an absorbance of 1.0:

  (1)

wherein A, B and C each independently represents an aromatic group or a heterocyclic group, which may be substituted, m is an integer of 1 or 2, and n is an integer of 0 or more, with the proviso that at least one of A, B and C is a heterocyclic group which may be substituted.

3. The ink set described in the item 1, wherein the dye is a compound represented by the following general formula (1):

  (1)

wherein A, B and C each independently represents an aromatic group or a heterocyclic group, which may be substituted, m is an integer of 1 or 2, and n is an integer of 0 or more, with the proviso that at least one of A, B and C is a heterocyclic group which may be substituted.

4. The ink set described in the item 1 or 2, which further comprises at least one dye having a λmax of 350 nm to 500 nm.

5. The ink set described in the item 2 or 3, wherein n and m in the formula (1) are 1.

6. The ink set described in the item 2 or 3, wherein at least two of A, B and C in the general formula (1) are a heterocyclic group which may be substituted.

7. The ink set described in the item 1 or 2, which further comprises at least a coloring agent represented by the following general formula (M-I) as the magenta ink:

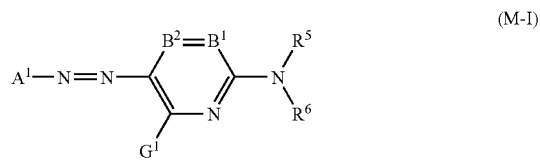  (M-I)

wherein $A^1$ represents a residue of a 5-membered heterocyclic diazo component $A^1$-$NH_2$; $B^1$ and $B^2$ each represent a nitrogen atom, —$CR^1$= and —$CR^2$=, and when one of $B^1$ and $B^2$ represents a nitrogen atom, the other represents —$CR^1$= or —$CR^2$=; $R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, which may further have a substituent group; $G^1$, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group (containing a heterocyclic amino group and an anilino group), an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, an alkyl- or arylsulfonyl group, a heterocyclic sulfonyl group, an alkyl- or arylsulfinyl group, a heterocyclic sulfinyl group, a sulfamoyl group, a sulfo group or a heterocyclic thio group, which may be further substituted; and $R^1$ and $R^5$, or $R^5$ and $R^6$ may combine with each other to form a 5- or 6-membered ring.

8. The ink set described in the item 1 or 2, which further comprises a coloring agent represented by the following general formula (C-I) as the cyan ink:

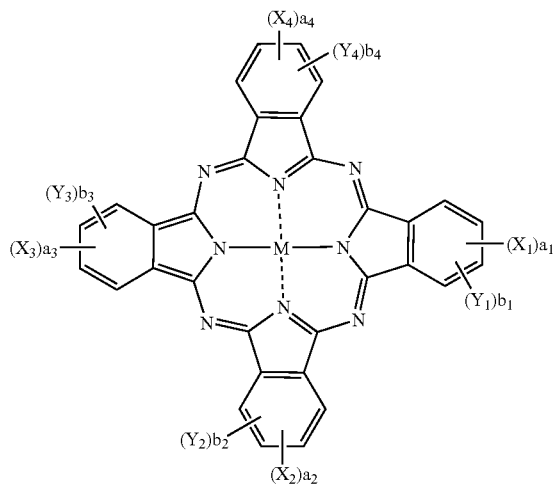  (C-I)

wherein $X_1$, $X_2$, $X_3$ and $X_4$ each independently represents —$SO$-$Z_1$, —$SO_2$-$Z_1$, —$SO_2NR_{21}R_{22}$, —$CONR_{21}R_{22}$ or —$CO_2R_{21}$; $Z_1$ represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; $R_{21}$ and $R_{22}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; $Y_1$, $Y_2$, $Y_3$ and $Y_4$ each independently represents a univalent substituent group; $a_1$ to $a_4$ and $b_1$ to $b_4$ each represents the substituent group number of $X_1$ to $X_4$ and $Y_1$ to $Y_4$, respectively, $a_1$ to $a_4$ each independently represents a number of 0 to 4, but there is no case where all are 0 at the same time, $b_1$ to $b_4$ each independently represents a number of 0 to 4, and when $a_1$ to $a_4$ and $b_1$ to $b_4$ each represents a number of 2 or more, pluralities of $X_1$'s to $X_4$'s and $Y_1$'s to $Y_4$'s may each be the same or different; and M is a hydrogen atom, a metal atom, or an oxide, hydroxide or halide thereof.

9. The ink set described in the item 1 or 2, which further comprises a coloring agent represented by the following general formula (Y-I) as the yellow ink:

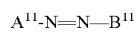  (Y-I)

wherein $A^{11}$ and $B^{11}$ each independently represents a heterocyclic group which may be substituted.

10. The ink set described in the item 7, wherein the magenta ink includes a set of two or more inks different in ink concentration, and the ink concentration of one magenta ink is 0.05 to 0.5 time that of the other magenta ink.

11. The ink set described in the item 8, wherein the cyan ink includes a set of two or more inks different in ink concentration, and the ink concentration of one cyan ink is 0.05 to 0.5 time that of the other cyan ink.

12. A color ink cartridge comprising at least a black ink, wherein the black ink includes the coloring agent described in the item 1 or 2.

13. The ink cartridge described in the item 12, which further comprises: a coloring agent represented by the following general formula (M-I) as the magenta ink; and a coloring agent represented by the following general formula (C-I) as the cyan ink:

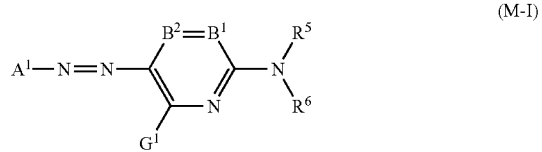

(M-I)

wherein $A^1$ represents a residue of a 5-membered heterocyclic diazo component $A^1$-$NH_2$; $B^1$ and $B^2$ each represent a nitrogen atom, —$CR^1$= or —$CR^2$=, and one of $B^1$ and $B^2$ represents a nitrogen atom, the other represents —$CR^1$= or —$CR^2$=; $R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, which may further have a substituent group; $G^1$, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group (containing a heterocyclic amino group and an anilino group), an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, an alkyl- or arylsulfonyl group, a heterocyclic sulfonyl group, an alkyl- or arylsulfinyl group, a heterocyclic sulfinyl group, a sulfamoyl group, a sulfo group or a heterocyclic thio group, which may be further substituted; and $R^1$ and $R^5$, or $R^5$ and $R^6$ may combine with each other to form a 5- or 6-membered ring:

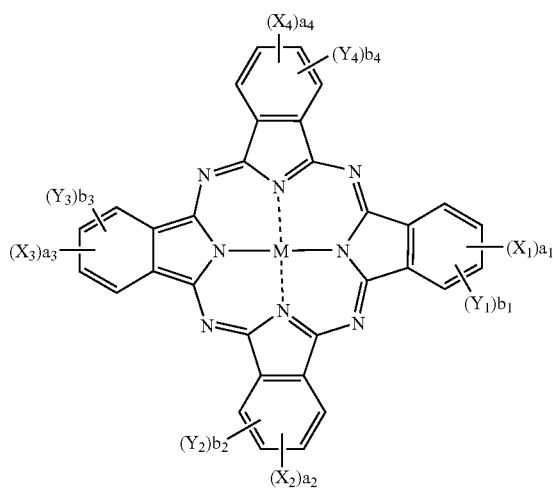

(C-I)

wherein $X_1$, $X_2$, $X_3$ and $X_4$ each independently represents —SO-$Z_1$, —$SO_2$-$Z_1$, —$SO_2NR_{21}R_{22}$, —$CONR_{21}R_{22}$ or —$CO_2R_{21}$; $Z_1$ represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; $R_{21}$ and $R_{22}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; $Y_1$, $Y_2$, $Y_3$ and $Y_4$ each independently represents a univalent substituent group; $a_1$ to $a_4$ and $b_1$ to $b_4$ each represents the substituent group number of $X_1$ to $X_4$ and $Y_1$ to $Y_4$, respectively, $a_1$ to $a_4$ each independently represents a number of 0 to 4, but there is no case where all are 0 at the same time, $b_1$ to $b_4$ each independently represents a number of 0 to 4, and when $a_1$ to $a_4$ and $b_1$ to $b_4$ each represents a number of 2 or more, pluralities of $X_1$'s to $X_4$'s and $Y_1$'s to $Y_4$'s may each be the same or different; and M is a hydrogen atom, a metal atom, or an oxide, hydroxide or halide thereof.

14. The ink cartridge described in the item 12, which further comprises at least one coloring agent represented by the following general formula (Y-I) as the yellow ink:

(Y-I)

wherein $A^{11}$ and $B^{11}$ each independently represents a heterocyclic group which may be substituted.

15. An ink jet printer using the ink set described in the item 1 or 2.

16. An image recording method comprising using the ink set described in the item 1 or 2 in conducting color printing.

DETAILED DESCRIPTION OF THE INVENTION

The invention will be described in greater detail below.

<Black Inks>

The black dye, the coloring agent used in the invention, is a dye having a λmax of 500 nm to 700 nm, a half value width in an absorption spectrum of a dilute solution normalized to an absorbance of 1.0 of 100 nm or more (preferably from 120 nm to 250 nm, and more preferably from 120 nm to 200 nm), and a characteristic that the forced fading rate constant is $5.0 \times 10^{-2}$ [hour$^{-1}$] or less (preferably $3.0 \times 10^{-2}$ [hour$^{-1}$] or less, and more preferably $1.0 \times 10^{-2}$ [hour$^{-1}$] or less), when the rate constant (k) is decided from $0.8 = e^{-kt}$ by printing on a reflection type medium an ink composition in which the dye is dissolved or dispersed in an aqueous medium, thereafter measuring the reflection density through a Status A filter (for example, an X-rite 310TR densitometer), specifying one point having a reflection density ($D_B$) in an yellow region of 0.90 to 1.10 as the initial density of the ink, forcedly fading the printed matter by use of an ozone fading tester which can regularly generate 5 ppm of ozone, and determining the time (t) taken until the reflection density reaches 80% of the initial density (this dye is referred to as "dye b" in this specification), or an azo dye, which is a compound represented by the above-mentioned general formula (1), having a λmax of 500 nm to 700 nm and a half value width in an absorption spectrum of a dilute solution normalized to an absorbance of 1.0 of 100 nm or more (this dye is referred to as "dye a" in this specification. A dye included in the above-mentioned dye a and dye b shall be considered to be called black dye (ab).

The compound represented by general formula (1) will be described below.

In general formula (1), A, B and C each independently represents an aromatic group which may be substituted or a heterocyclic group which may be substituted (A and C are each a univalent group, and B is a bivalent group). m is 1 or 2, and n is an integer of 0 or more. At least one of A, B and C is a heterocyclic group which may be substituted.

It is particularly preferred that the azo dye (dye a) represented by general formula (1) is a dye represented by the following general formula (2):

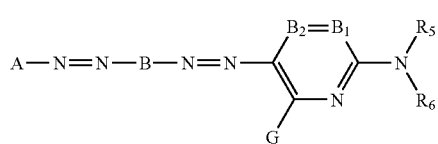

(2)

wherein A and B have the same meanings as given for formula (1); $B_1$ and $B_2$ each represent a nitrogen atom, $—CR_1=$ or $—CR_2=$, and one of $B_1$ and $B_2$ represents a nitrogen atom, the other represents $—CR_1=$ or $—CR_2=$.

G, $R_1$ and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group (containing an alkylamino group, an arylamino group and a heterocyclic amino group), an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, a heterocyclic thio group, an alkyl- or arylsulfonyl group, a heterocyclic sulfonyl group, an alkyl- or arylsulfinyl group, a heterocyclic sulfinyl group, a sulfamoyl group or a sulfo group, which may be further substituted.

$R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, which may further have a substituent group, with the proviso that there is no case where $R_5$ and $R_6$ are hydrogen atoms at the same time.

Further, $R_1$ and $R_5$ or $R_5$ and $R_6$ may combine with each other to form a 5- or 6-membered ring.

It is further preferred that the azo dye represented by general formula (2) is a dye represented by the following general formula (3):

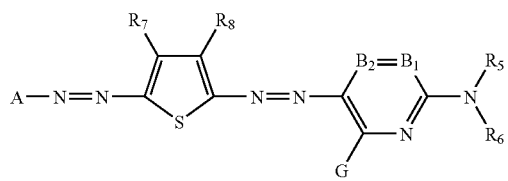

(3)

wherein $R_7$ and $R_8$ have the same meaning as $R_1$ of general formula (2).

The halogen atoms include a fluorine atom, a chlorine atom and a bromine atom. The aliphatic group means an alkyl group, a substituted alkyl group, an alkenyl group, a substituted alkenyl group, an alkynyl group, a substituted alkynyl group, an aralkyl group and a substituted aralkyl group. The aliphatic group may be branched, or may form a ring. The aliphatic group has preferably 1 to 20 carbon atoms, and more preferably 1 to 16 carbon atoms. Aryl moieties of the aralkyl group and the substituted aralkyl group are preferably phenyl or naphthyl, and particularly preferably phenyl. Examples of the aliphatic groups include a methyl group, an ethyl group, a butyl group, an isopropyl group, a t-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenetyl group, a vinyl group and an allyl group.

The univalent aromatic group means an aryl group and a substituted aryl group. The aryl group is preferably phenyl or naphthyl, and particularly preferably phenyl. The univalent aromatic group has preferably 6 to 20 carbon atoms, and more preferably 6 to 16 carbon atoms. Examples of the univalent aromatic groups include a phenyl group, a p-tolyl group, a p-methoxyphenyl group, a o-chlorophenyl group and a m-(3-sulfopropylamino)phenyl group. The bivalent aromatic group is a group in which the univalent aromatic group is made bivalent, and examples thereof include a phenylene group, a p-tolylene group, a p-methoxyphenylene group, a o-chlorophenylene group and a m-(3-sulfopropylamino) phenylene group and a naphthylene group.

The heterocyclic group includes a heterocyclic group having a substituent group and an unsubstituted heterocyclic group. An aliphatic ring, an aromatic ring or another heterocycle may be condensed with the heterocycle. The heterocyclic group is preferably a 5- or 6-membered heterocyclic group. Heteroatoms of the heterocycles include N, O and S. Examples of the above-mentioned substituent groups include an aliphatic group, a halogen atom, an alkylsulfonyl group, an arylsulfonyl group, an acyl group, an acylamino group, a sulfamoyl group, a carbamoyl group and an ionic hydrophilic group. Examples of the heterocycles used in the univalent and bivalent heterocyclic groups include pyridine, thiophene, thiazole, benzothiazole, benzoxazole and furan rings.

The carbamoyl group includes a carbamoyl group having a substituent group and an unsubstituted carbamoyl group. Examples of the substituent groups include an alkyl group. Examples of the carbamoyl groups include a methylcarbamoyl group and a dimethylcarbamoyl group.

The alkoxycarbonyl group includes an alkoxycarbonyl group having a substituent group and an unsubstituted alkoxycarbonyl group. As the alkoxycarbonyl group, an alkoxycarbonyl group having 2 to 20 carbon atoms is preferred. Examples of the substituent groups include an ionic hydrophilic group. Examples of the alkoxycarbonyl groups include a methoxycarbonyl group and an ethoxycarbonyl group.

The aryloxycarbonyl group includes an aryloxycarbonyl group having a substituent group and an unsubstituted aryloxycarbonyl group. As the aryloxycarbonyl group, an aryloxycarbonyl group having 7 to 20 carbon atoms is preferred. Examples of the substituent groups include an ionic hydrophilic group. Examples of the aryloxycarbonyl groups include a phenoxycarbonyl group.

The heterocyclic oxycarbonyl group includes a heterocyclic oxycarbonyl group having a substituent group and an unsubstituted heterocyclic oxycarbonyl group. As the heterocyclic oxycarbonyl group, a heterocyclic oxycarbonyl group having 2 to 20 carbon atoms is preferred. Examples of the substituent groups include an ionic hydrophilic group. Examples of the heterocyclic oxycarbonyl groups include a 2-pyridyloxycarbonyl group.

The acyl group includes an acyl group having a substituent group and an unsubstituted acyl group. As the acyl group, an acyl group having 1 to 20 carbon atoms is preferred. Examples of the substituent groups include an ionic hydrophilic group. Examples of the acyl groups include an acetyl group and a benzoyl group.

The alkoxyl group includes an alkoxyl group having a substituent group and an unsubstituted alkoxyl group. As the acyl group, an acyl group having 1 to 20 carbon atoms is preferred. Examples of the substituent groups include an alkoxyl group, a hydroxyl group and an ionic hydrophilic group. Examples of the alkoxyl groups include a methoxy group, an ethoxy group, an isopropoxy group, a methoxyethoxy group, a hydroxyethoxy group and a 3-carboxypropoxy group.

The aryloxy group includes an aryloxy group having a substituent group and an unsubstituted aryloxy group. As the aryloxy group, an aryloxy group having 6 to 20 carbon atoms is preferred. Examples of the substituent groups include an alkoxyl group and an ionic hydrophilic group. Examples of the aryloxy groups include a phenoxy group, a p-methoxyphenoxy group and an o-methoxyphenoxy group.

The heterocyclic oxy group includes a heterocyclic oxy group having a substituent group and an unsubstituted heterocyclic oxy group. As the heterocyclic oxy group, a heterocyclic oxy group having 2 to 20 carbon atoms is preferred. Examples of the substituent groups include an alkyl group, an alkoxyl group and an ionic hydrophilic group. Examples of the heterocyclic oxy groups include a 3-pyridyloxy group and a 3-thienyloxy group.

As the silyloxy group, preferred is a silyloxy group substituted by an aliphatic group having 1 to 20 carbon atoms or an aromatic group. Examples of the silyloxy groups include trimethylsilyloxy and diphenylmethylsilyloxy.

The acyloxy group includes an acyloxy group having a substituent group and an unsubstituted acyloxy group. As the acyloxy group, an acyloxy group having 1 to 20 carbon atoms is preferred. Examples of the substituent groups include an ionic hydrophilic group. Examples of the acyloxy groups include an acetoxy group and a benzoyloxy group.

The carbamoyloxy group includes a carbamoyloxy group having a substituent group and an unsubstituted carbamoyloxy group. Examples of the substituent groups include an alkyl group. Examples of the carbamoyloxy groups include an N-methylcarbamoyloxy group.

The alkoxycarbonyloxy group includes an alkoxycarbonyloxy group having a substituent group and an unsubstituted alkoxycarbonyloxy group. As the alkoxycarbonyloxy group, an alkoxycarbonyloxy group having 2 to 20 carbon atoms is preferred. Examples of the alkoxycarbonyloxy groups include a methoxycarbonyloxy group and an isopropoxycarbonyloxy group.

The aryloxycarbonyloxy group includes an aryloxycarbonyloxy group having a substituent group and an unsubstituted aryloxycarbonyloxy group. As the aryloxycarbonyloxy group, an aryloxycarbonyloxy group having 7 to 20 carbon atoms is preferred. Examples of the aryloxycarbonyloxy groups include a phenoxycarbonyloxy group.

The amino group includes an amino group substituted by an alkyl group, an aryl group or a heterocyclic group, and the alkyl group, the aryl group and the heterocyclic group may each further have a substituent group. As the alkylamino group, an alkylamino group having 1 to 20 carbon atoms is preferred. Examples of the substituent groups include an ionic hydrophilic group. Examples of the alkylamino groups include a methylamino group and a diethylamino group.

The arylamino group includes an arylamino group having a substituent group and an unsubstituted arylamino group. As the arylamino group, an arylamino group having 6 to 20 carbon atoms is preferred. Examples of the substituent groups include a halogen atom and an ionic hydrophilic group. Examples of the arylamino groups include an anilino group and a 2-chlorophenylamino group.

The heterocyclic amino group includes a heterocyclic amino group having a substituent group and an unsubstituted heterocyclic amino group. As the heterocyclic amino group, a heterocyclic amino group having 2 to 20 carbon atoms is preferred. Examples of the substituent groups include an alkyl group, a halogen atom and an ionic hydrophilic group.

The acylamino group includes an acylamino group having a substituent group and an unsubstituted acylamino group. As the acylamino group, an acylamino group having 2 to 20 carbon atoms is preferred. Examples of the substituent groups include an ionic hydrophilic group. Examples of the acylamino groups include an acetylamino group, a propionylamino group, a benzoylamino group, an N-phenylacetylamino group and a 3,5-disulfobenzoylamino group.

The ureido group includes a ureido group having a substituent group and an unsubstituted ureido group. As the ureido group, a ureido group having 1 to 20 carbon atoms is preferred. Examples of the substituent groups include an alkyl group and an aryl group. Examples of the ureido groups include a 3-methylureido group, a 3,3-dimethylureido group and a 3-phenylureido group.

The sulfamoylamino group includes a sulfamoylamino group having a substituent group and an unsubstituted sulfamoylamino group. Examples of the substituent groups include an alkyl group. Examples of the sulfamoylamino groups include an N,N-dipropylsulfamoylamino group.

The alkoxycarbonylamino group includes an alkoxycarbonylamino group having a substituent group and an unsubstituted alkoxycarbonylamino group. As the alkoxycarbonylamino group, an alkoxycarbonylamino group having 2 to 20 carbon atoms is preferred. Examples of the substituent groups include an ionic hydrophilic group. Examples of the alkoxycarbonylamino groups include an ethoxycarbonylamino group.

The aryloxycarbonylamino group includes an aryloxycarbonylamino group having a substituent group and an unsubstituted aryloxycarbonylamino group. As the aryloxycarbonylamino group, an aryloxycarbonylamino group having 7 to 20 carbon atoms is preferred. Examples of the substituent groups include an ionic hydrophilic group. Examples of the aryloxycarbonylamino groups include a phenoxycarbonylamino group.

The alkyl- and arylsulfonylamino groups include alkyl- and arylsulfonylamino groups having substituent groups and unsubstituted alkyl- and arylsulfonylamino groups. As the sulfonylamino group, a sulfonylamino group having 1 to 20 carbon atoms is preferred. Examples of the substituent groups include an ionic hydrophilic group. Examples of these sulfonylamino groups include a methylsulfonylamino group, an N-phenylmethylsulfonylamino group, a phenylsulfonylamino group and a 3-carboxyphenylsulfonylamino group.

The heterocyclic sulfonylamino group includes a heterocyclic sulfonylamino group having a substituent group and an unsubstituted heterocyclic sulfonylamino group. As the heterocyclic sulfonylamino group, a heterocyclic sulfonylamino group having 1 to 12 carbon atoms is preferred. Examples of the substituent groups include an ionic hydrophilic group. Examples of the heterocyclic sulfonylamino groups include a 2-thiophenesulfonylamino group and a 3-pyridinesulfonylamino group.

The heterocyclic sulfonyl group includes a heterocyclic sulfonyl group having a substituent group and an unsubstituted heterocyclic sulfonyl group. As the heterocyclic sulfonyl group, a heterocyclic sulfonyl group having 1 to 20 carbon atoms is preferred. Examples of the substituent groups include an ionic hydrophilic group. Examples of the heterocyclic sulfonyl groups include a 2-thiophenesulfonyl group and a 3-pyridinesulfonyl group.

The heterocyclic sulfinyl group includes a heterocyclic sulfinyl group having a substituent group and an unsubstituted heterocyclic sulfinyl group. As the heterocyclic sulfinyl group, a heterocyclic sulfinyl group having 1 to 20 carbon atoms is preferred. Examples of the substituent groups include an ionic hydrophilic group. Examples of the heterocyclic sulfinyl groups include a 4-pyridinesulfinyl group.

The alkyl-, aryl- and heterocyclic thio groups include alkyl-, aryl- and heterocyclic thio groups having substituent groups and unsubstituted alkyl-, aryl- and heterocyclic thio groups. As the alkyl-, aryl- and heterocyclic thio groups, ones having 1 to 20 carbon atoms are preferred. Examples of the substituent groups include an ionic hydrophilic group. Examples of the alkyl-, aryl- and heterocyclic thio groups include a methylthio group, a phenylthio group and a 2-pyridylthio group.

The alkyl- and arylsulfonyl groups include alkyl- and arylsulfonyl groups having substituent groups and unsubstituted alkyl- and arylsulfonyl groups. Examples of the alkyl- and arylsulfonyl groups include a methylsulfonyl group and a phenylsulfonyl group, respectively.

The alkyl- and arylsulfinyl groups include alkyl- and arylsulfinyl groups having substituent groups and unsubstituted alkyl- and arylsulfinyl groups. Examples of the alkyl- and arylsulfinyl groups include a methylsulfinyl group and a phenylsulfinyl group, respectively.

The sulfamoyl group includes a sulfamoyl group having a substituent group and an unsubstituted sulfamoyl group. Examples of the substituent groups include an alkyl group. Examples of the sulfamoyl groups include a dimethylsulfamoyl group and a di-(2-hydroxyethyl)sulfamoyl group.

General formulas (1), (2) and (3) will be described below.

In the following descriptions, the descriptions already made are applied to groups and substituent groups.

In general formula (1), A, B and C each independently represents an aromatic group which may be substituted (A and C are each a univalent aromatic group, for example, an aryl group, and B is a bivalent aromatic group, for example, an arylene group) or a heterocyclic group which may be substituted (A and C are each a univalent heterocyclic group, and B is a bivalent heterocyclic group). Examples of the aromatic rings include a benzene ring and a naphthalene ring, and heteroatoms of the heterocycles include N, O and S. An aliphatic ring, an aromatic ring or another heterocycle may be condensed with the heterocycle.

The substituent group may be an arylazo group or a heterocyclic azo group. At least two of A, B and C are preferably heterocycles.

Preferred examples of the heterocyclic groups of C include a 6-membered nitrogen-containing aromatic heterocyclic group represented by the following general formula (4). When C is the 6-membered nitrogen-containing aromatic heterocyclic group represented by the following general formula (4), general formula (1) corresponds to general formula (2).

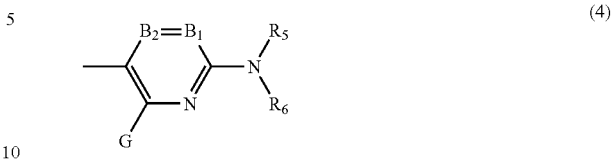

wherein $B_1$ and $B_2$ each represent a nitrogen atom, $-CR_1=$ or $-CR_2=$, and one of $B_1$ and $B_2$ represents a nitrogen atom, the other represents $-CR_1=$ or $-CR_2=$. However, it is more preferred that $B_1$ and $B_2$ represent $-CR_1=$ or $-CR_2=$, respectively.

$R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, which may further have a substituent group. Preferred examples of the substituent groups represented by $R^5$ and $R^6$ include a hydrogen atom, an aliphatic group, an aromatic group, a heterocyclic group, an acyl group and an alkyl- or arylsulfonyl group. More preferred are a hydrogen atom, an aromatic group, a heterocyclic group, an acyl group and an alkyl- or arylsulfonyl group, and most preferred are a hydrogen atom, an aryl group and a heterocyclic group. Each group may further have a substituent group. However, there is no case where $R_5$ and $R_6$ are hydrogen atoms at the same time.

G, $R_1$ and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group (containing an alkylamino group, an arylamino group and a heterocyclic amino group), an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, a heterocyclic thio group, an alkyl- or arylsulfonyl group, a heterocyclic sulfonyl group, an alkyl- or arylsulfinyl group, a heterocyclic sulfinyl group, a sulfamoyl group or a sulfo group, which may be further substituted.

As the substituent group represented by G, preferred is a hydrogen atom, a halogen atom, an aliphatic group, an aromatic group, a hydroxyl group, an alkoxyl group, an aryloxy group, an acyloxy group, a heterocyclic oxy group, an amino group (containing an alkylamino group, an arylamino group and a heterocyclic amino group), an acylamino group, a ureido group, a sulfamoylamino group, an alkoxycarbonylamino group, an aryloxycarbonylamino group, an alkyl- or arylthio group or a heterocyclic thio group, and more preferred is a hydrogen atom, a halogen atom, an alkyl group, a hydroxyl group, an alkoxyl group, an aryloxy group, an acyloxy group, an amino group (containing an alkylamino group, an arylamino group and a heterocyclic amino group) or an acylamino group. A hydrogen atom, an anilino group or an acylamino group is most preferred among others. Each group may further have a substituent group.

Preferred examples of the substituent groups represented by $R_1$ and $R_2$ include a hydrogen atom, an alkyl group, a halogen atom, an alkoxycarbonyl group, a carboxyl group, a carbamoyl group, a hydroxyl group, an alkoxyl group and cyano group. Each group may further have a substituent group.

$R_1$ and $R_5$ or $R_5$ and $R_6$ may combine with each other to form a 5- or 6-membered ring.

When the respective substituent groups represented by A, $R_1$, $R_2$, $R_5$, $R_6$ and G further have substituent groups, the substituent groups include the substituent groups mentioned above for G, $R_1$ and $R_2$. Further, it is preferable to have an ionic hydrophilic group as a substituent group on any position of A, $R_1$, $R_2$, $R_5$, $R_6$ and G.

The ionic hydrophilic groups as the substituent groups include a sulfo group, a carboxyl group, a phosphono group and a quaternary ammonium group. As the ionic hydrophilic group, preferred are a carboxyl group, a phosphono group and a sulfo group, and particularly preferred are a carboxyl group and a sulfo group. The carboxyl group, the phosphono group and the sulfo group may be in the salt form, and examples of counter ions for forming the salts include an ammonium ion, an alkali metal ion (for example, a lithium ion, a sodium ion or a potassium ion) and an organic cation (for example, a tetramethylammonium ion, a tetramethylguanidium ion or a tetramethylphosphonium ion).

When B is a ring structure, preferred examples of the heterocycles include a thiophene ring, a thiazole ring, an imidazole ring, a benzothiazole ring and a thienothiazole ring. Each heterocyclic group may further have a substituent group. A thiophene ring, a thiazole ring, an imidazole ring, a benzothiazole ring and a thienothiazole ring represented by the following general formulas (a) to (e), respectively, are preferred among others. When B is the thiophene group represented by general formula (a) and C is the structure represented by the above-mentioned general formula (4), general formula (1) at the time when n is 1 corresponds to general formula (3).

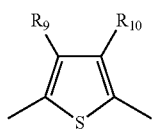
(a)

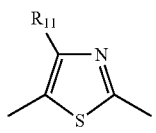
(b)

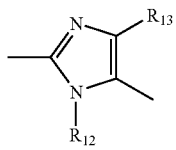
(c)

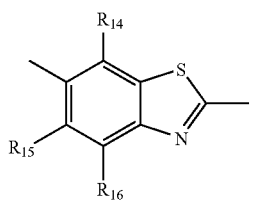
(d)

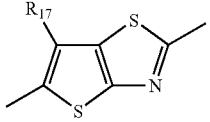
(e)

In the above-mentioned general formula (a) to (e), $R_9$ to $R_{17}$ have the same meanings as G, $R_1$ and $R_2$ in general formula (2).

In the invention, a particularly preferred structure is one represented by the following general formula (5):

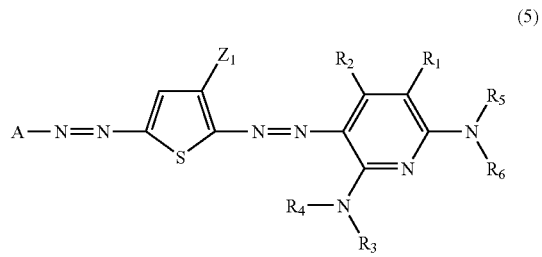
(5)

wherein $Z_1$ represents an electron attractive group having a Hammett substituent constant σp of 0.20 or more. $Z_1$ is preferably an electron attractive group having a constant of 0.30 or more, more preferably an electron attractive group having a constant of 0.45 or more, and particularly preferably an electron attractive group having a constant of 0.60 or more. However, it is desirable that the constant does not exceed 1.0. Preferred specific examples of the substituent groups include electron attractive substituent groups described later. An acyl group having 2 to 20 carbon atoms, an alkyloxycarbonyl group having 2 to 20 carbon atoms, a nitro group, a cyano group, an alkylsulfonyl group having 1 to 20 carbon atoms, an arylsulfonyl group having 6 to 20 carbon atoms, a carbamoyl group having 1 to 20 carbon atoms and an alkyl halide having 1 to 20 carbon atoms are preferred among others. Particularly preferred are a cyano group, an alkylsulfonyl group having 1 to 20 carbon atoms and an arylsulfonyl group having 6 to 20 carbon atoms, and most preferred is a cyano group.

$R_1$, $R_2$, $R_5$ and $R_6$ have the same meanings as given for general formula (2). $R_3$ and $R_4$ each independently represents a hydrogen, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group. A hydrogen atom, an aromatic group, a heterocyclic group, an acyl group or an alkyl- or arylsulfonyl group is preferred among others, and a hydrogen atom, an aromatic group or a heterocyclic group is particularly preferred.

The respective groups described for general formula (5) may further have substituent groups. When these respective groups further have the substituent groups, the substituent groups include the substituent groups described for general formula (2), and the groups and ionic hydrophilic groups exemplified for G, $R_1$ and $R_2$.

The Hammett substituent constant σp used in this specification will be described here. Hammett's rule is an empirical rule propounded by L. P. Hammett in 1935 in order to quantitatively deal with the influence of a substituent group on the reaction and equilibrium of a benzene derivative, and the validity thereof has today been widely recognized. As the substituent constants determined in Hammett's rule, there are the σp value and the σm value. These constants are described in detail, for example, in *Lange's Handbook of Chemistry*, the 12th edition, edited by J. A. Dean, 1979 (McGraw-Hill) and *Kagaku no Ryoiki* (Journal of Japanese Chemistry), an extra issue, 122, 96–103 (1979), Nankodo, although they can be found in many general literatures. In the invention, each substituent group is limited or illustrated by the Hammett substituent constant σp. However, this does not mean that the substituent group is limited to only a substituent group having the constant known in the above-mentioned general literatures. Even when the constant is unknown in literatures, it goes without saying that a substituent group having the constant that will be within the range when measured based on Hammett's rule is also included. Further, although the compounds represented by general formula (1) or (2) of the invention also include some compounds other than the benzene derivatives, the σp value is used as a measure indicating the electronic efficiency of the substituent group, independently of the substituted position. In the invention, the σp value is used in such a sense.

Examples of the electron attractive groups having a Hammett substituent constant σp of 0.60 or more include a cyano group, a nitro group, an alkylsulfonyl group (for example, methanesulfonyl) and an arylsulfonyl group (for example, benzenesulfonyl).

Examples of the electron attractive groups having a Hammett substituent constant σp of 0.45 or more include, as well as the above-mentioned groups, an acyl group (for example, acetyl), an alkoxycarbonyl group (for example, dodecyloxycarbonyl), an aryloxycarbonyl group (for example m-chlorophenoxycarbonyl), an alkylsulfinyl group (for example, n-propylsulfinyl), an arylsulfinyl group (for example, phenylsulfinyl), a sulfamoyl group (for example, N-ethylsulfamoyl or N,N-dimethylsulfamoyl) and an alkyl halide group (for example trifluoromethyl).

Examples of the electron attractive groups having a Hammett substituent constant σp of 0.30 or more include, as well as the above-mentioned groups, an acyloxy group (for example, acetoxy), a carbamoyl group (for example, N-ethylcarbamoyl or N,N-dibutylcarbamoyl), an alkoxyl halide group (for example, trifluoromethyloxy), an aryloxy halide group (for example, pentafluorophenyloxy), a sulfonyloxy group (for example, methylsulfonyloxy), an alkylthio halide group (for example, difluoromethylthio), an aryl group substituted by two or more electron attractive groups having a constant σp of 0.15 or more (for example, 2,4-dinitrophenyl or pentachlorophenyl) and a heterocycle (for example, 2-benzoxazolyl, 2-benzothiazolyl or 1-phenyl-2-benzimidazolyl).

Specific examples of the electron attractive groups having a constant σp of 0.20 or more include halogen atom, as well as the above-mentioned groups.

As for a particularly preferred combination of the substituent groups as the azo dye represented by general formula (3) described above, $R_5$ and $R_6$ are each preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, there is no case where $R_5$ and $R_6$ both are hydrogen atoms.

G is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

A is preferably a pyrazole ring, an imidazole ring, an isothiazole ring, a thiadiazole ring or a benzothiazole ring, more preferably a pyrazole ring or an isothiazole ring, and most preferably a pyrazole ring.

$B_1$ and $B_2$ are each preferably =CR$_1$— or —CR$_2$=. $R_1$ and $R_2$ are each preferably a hydrogen atom, an alkyl group, a halogen atom, a cyano group, a carbamoyl group, a carboxyl group, a hydroxyl group, an alkoxyl group or an alkoxycarbonyl group, and more preferably a hydrogen atom, an alkyl group, a carboxyl group, a cyano group or a carbamoyl group.

As for a preferred combination of the above-mentioned azo dyes, the compound in which at least one of various substituent groups is the above-mentioned preferred group is preferred, the compound in which more various substituent groups are the above-mentioned preferred groups is more preferred, and the compound in which all substituent groups are the above-mentioned preferred groups is most preferred.

Specific examples of the above-mentioned azo dyes are shown below, but the azo dyes used in the invention should not be construed as being limited to the following examples.

The carboxyl group, the phosphono group and the sulfo group may be in the salt form, and examples of counter ions for forming the salts include an ammonium ion, an alkali metal ion (for example, a lithium ion, a sodium ion or a potassium ion) and an organic cation (for example, a tetramethylammonium ion, a tetramethylguanidium ion or a tetramethylphosphonium ion).

TABLE 1

| A—N=N—B—N=N—C | | |
|---|---|---|
| A | B | C |

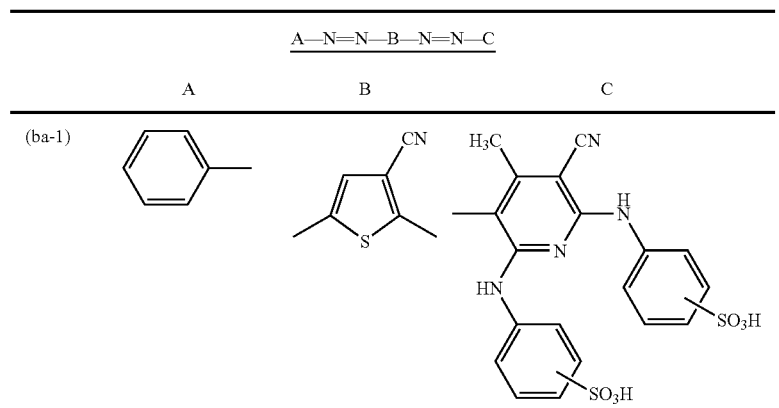

(ba-1)

TABLE 1-continued

A—N=N—B—N=N—C

| | A | B | C |
|---|---|---|---|
| (ba-2) | | | |
| (ba-3) | | | |
| (ba-4) | | | |
| (ba-5) | | | |
| (ba-6) | | | |

TABLE 2
A—N=N—B—N=N—C
| | A | B | C |
|---|---|---|---|
| (bb-1) | 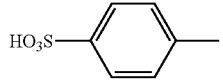 | 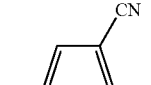 | 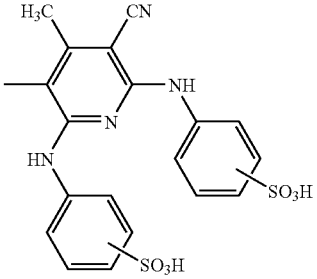 |
| (bb-2) | 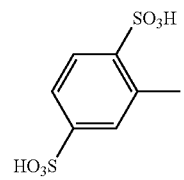 | 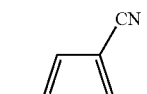 | 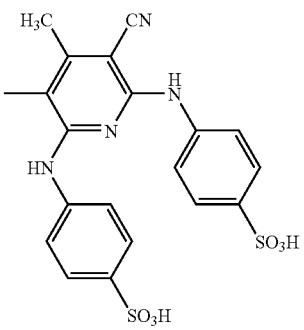 |
| (bb-3) | 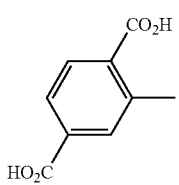 | 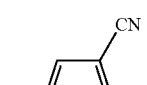 | 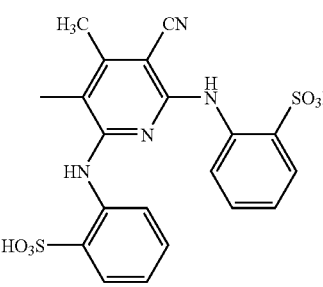 |
| (bb-4) | 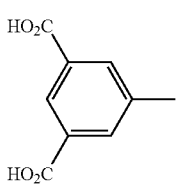 | 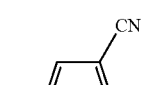 | 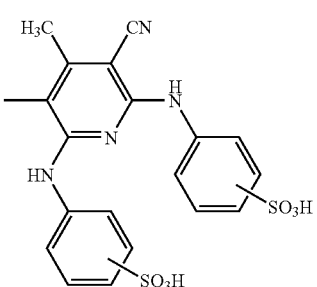 |
| (bb-5) | 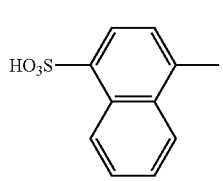 | 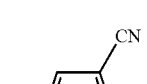 | 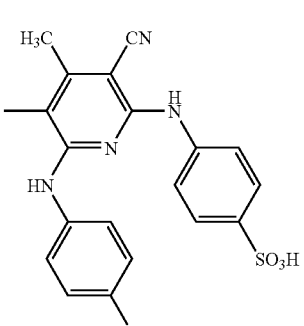 |

TABLE 2-continued

A—N=N—B—N=N—C

| | A | B | C |
|---|---|---|---|
| (bb-6) | | | |
| (bb-7) | | | |

TABLE 3

A—N=N—B—N=N—C

| | A | B | C |
|---|---|---|---|
| (bc-1) | | | |
| (bc-2) | | | |

TABLE 3-continued
A—N=N—B—N=N—C
| | A | B | C |
|---|---|---|---|
| (bc-3) | 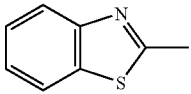 | 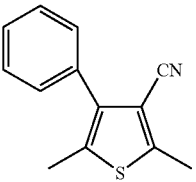 | 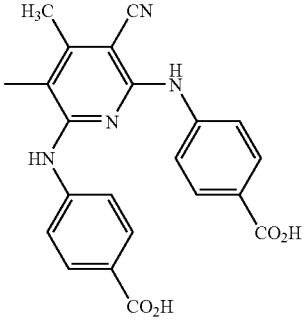 |
| (bc-4) | 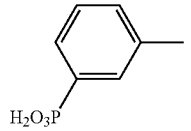 | 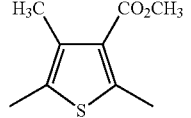 | 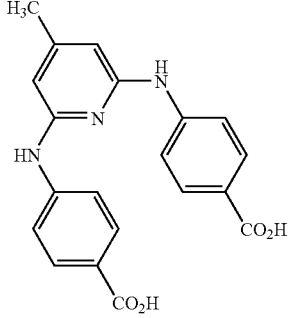 |
| (bc-5) | 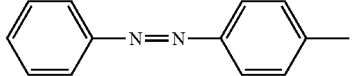 | 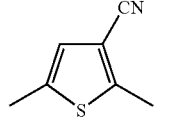 | 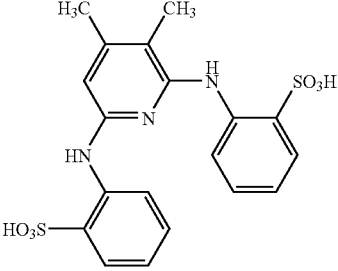 |
TABLE 4
A—N=N—B—N=N—C
| | A | B | C |
|---|---|---|---|
| (bd-1) | 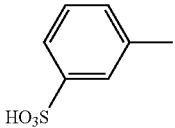 | 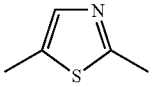 | 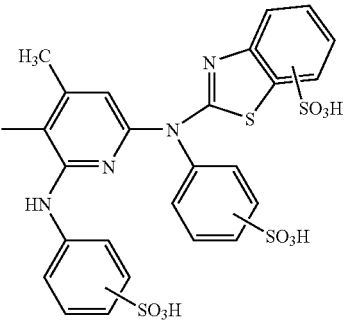 |

TABLE 4-continued
A—N=N—B—N=N—C
| | A | B | C |
|---|---|---|---|
| (bd-2) | 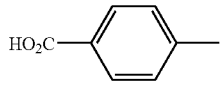 | 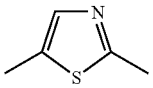 | 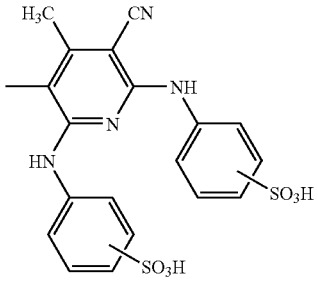 |
| (bd-3) | 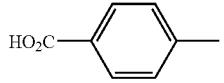 | 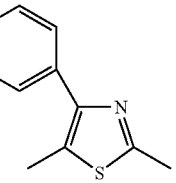 | 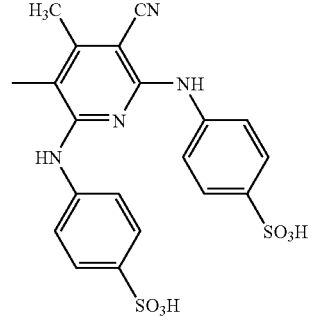 |
| (bd-4) | 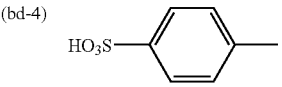 | 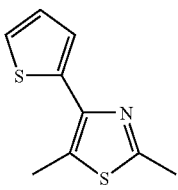 | 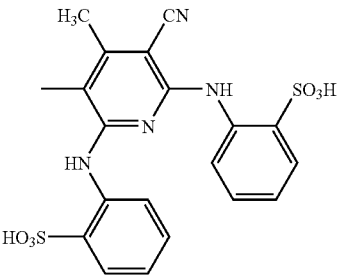 |
| (bd-5) | 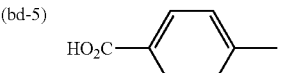 | 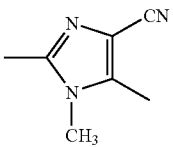 | 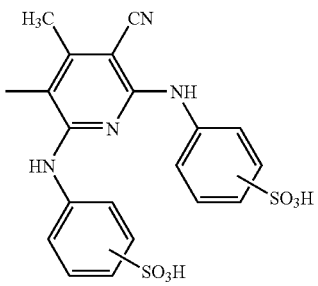 |
| (bd-6) | 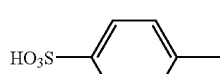 | 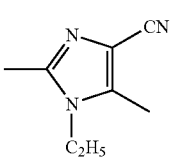 | 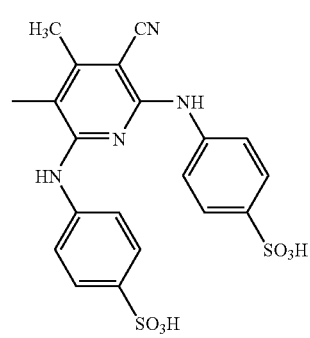 |

TABLE 5

A—N=N—B—N=N—C

| | A | B | C |
|---|---|---|---|
| (be-1) | HO₃S–⟨phenyl⟩– | 2,6-dimethylbenzothiazole | 4-methyl-5-methyl-3-cyano-2,6-bis(4-sulfophenylamino)pyridine |
| (be-2) | HO₃S–⟨phenyl⟩– | 2,5-dimethylthieno[2,3-d]thiazole | 4-methyl-5-methyl-3-cyano-2,6-bis(4-sulfophenylamino)pyridine |

TABLE 6

A—N=N—B—N=N—C

| | A | B | C |
|---|---|---|---|
| (bf-1) | HO₃S–⟨phenyl⟩– | 2,5-dimethyl-3-cyanothiophene | 5-amino-3-tert-butyl-4-methyl-1-ethylpyrazole |
| (bf-2) | 3,5-dicarboxyphenyl (HO₂C–⟨phenyl⟩–CO₂H) | 2,5-dimethyl-3-cyanothiophene | 5-amino-3,4-dimethyl-1-phenylpyrazole |

TABLE 6-continued

A—N=N—B—N=N—C

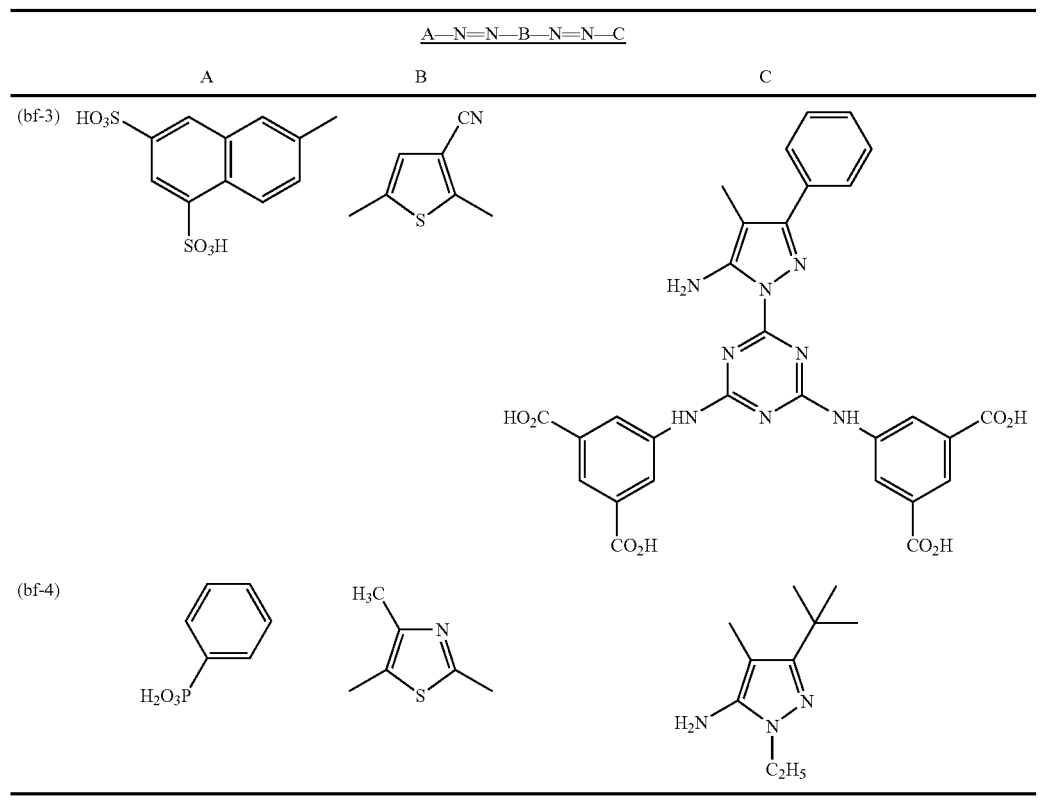

The azo dye (dye a) represented by the above-mentioned general formula (1), (2), (3) or (5) can be synthesized by the reaction of a diazo component and a coupler, and synthesized by a method described in Japanese Patent Application No. 2002-113460 as a main synthesis method.

As the dye having a λmax of 350 nm to 500 nm, a yellow dye or a yellow pigment described later is preferably used.

The black ink composition of the invention contains "black dye (ab)" [dye b described in the above 1), (a), and dye a represented by general formula (1)] preferably in an amount of 0.2 to 20% by weight, and more preferably in an amount of 0.5 to 15% by weight.

The black ink composition of the invention is characterized in that it is an ink composition in which at least one kind of the above-mentioned black dye (ab) is dissolved or dispersed in an aqueous medium.

The above-mentioned black dye (ab) (preferably the above-mentioned dye a) of the invention is substantially water-soluble or water-dispersible. In particular, the black dye-containing ink composition of the invention is preferably a solution type ink composition in which the dye is water-soluble. Specifically, the solubility of the dye in water at 20° C. is preferably 2% by weight or more, and more preferably 5% by weight or more.

Further, when two or more kinds of ink compositions are used in combination, the dyes contained in the ink compositions may be used either or as a mixture thereof. In the case of the mixture, it is preferred that the ink composition of the invention contains black ink (ab) of the invention in an amount of at least 10% by weight.

Furthermore, when two or more kinds of ink compositions are prepared, one can be prepared as a light ink, and the other as a deep ink. In the invention, it is possible to prepare the ink compositions different in depth as described above, and it is also possible to prepare the ink compositions approximately similar to each other in depth.

Besides black dye (ab), there can be used dyes known in the art such as a triarylmethane dye, an anthraquinone dye, an anthrapyridone dye, an azomethine dye, an azo dye, a cyanine dye, a merocyanine dye and an oxonol dye. They can be used either alone or as a combination thereof (preferably, a combination so as to give a black dye). In particular, an azo dye is preferred among others. Further, it is also possible to use a black pigment with them. As an example thereof, carbon black is preferably used.

<Magenta Inks>

The coloring agent represented by the above-mentioned general formula (M-I) in the invention will be described below.

In general formula (M-I), $A^1$ represents a 5-membered heterocyclic group.

$B^1$ and $B^2$ represent —$CR^1$= and —$CR^2$=, respectively, or either of them represents a nitrogen atom, and the other represents —$CR^1$= or —$CR^2$=. $R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, which may further have a substituent group.

$G^1$, $R^1$ and $R^2$ each independently represents a hydrogen atom or a substituent group, and the substituent group indicates a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group (containing an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, which may be further substituted.

$R^1$ and $R^5$ or $R^5$ and $R^6$ may combine with each other to form a 5- or 6-membered ring.

The dye of the above-mentioned general formula (M-I) will be described in more detail.

In general formula (M-I), $A^1$ represents a 5-membered heterocyclic group. Examples of heteroatoms of the heterocycles include N, O and S. Preferred is a 6-membered nitrogen-containing heterocycle, and an aliphatic group, an aromatic ring or another heterocycle may be condensed with the heterocycle. Preferred examples of the heterocycles include a pyrazole ring, an imidazole ring, a thiazole ring, an isothiazole ring, a thiadiazole ring, a benzothiazole ring, a benzoxazole ring and a benzoisothiazole ring. Each heterocyclic group may further have a substituent group. A pyrazole ring, an imidazole ring, an isothiazole ring, a thiadiazole ring and a benzothiazole ring represented by the following general formulas (a) to (f), respectively, are preferred among others.

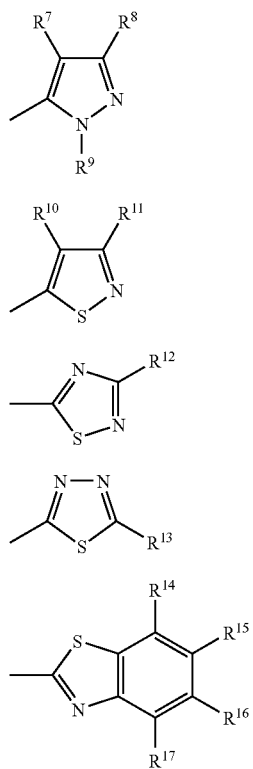

(a)

(b)

(c)

(d)

(e)

-continued

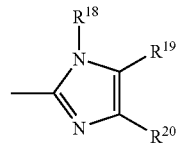

(f)

In the above-mentioned general formulas (a) to (f), $R^7$ to $R^{20}$ have the same substituent groups as $G^1$, $R^1$ and $R^2$ in general formula (M-I).

Of the rings represented by the above-mentioned general formulas (a) to (f), preferred are a pyrazole ring and an isothiazole ring represented by general formulas (a) and (b), respectively, and most preferred is a pyrazole ring represented by general formula (a).

In general formula (M-I), $B^1$ and $B^2$ represent —$CR^1$= and —$CR^2$=, respectively, or either of them represents a nitrogen atom, and the other represents —$CR^1$= or —$CR^2$=. However, it is more preferred that $B^1$ and $B^2$ represent —$CR^1$= and —$CR^2$=, respectively.

$R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. A hydrogen atom of each substituent group may be substituted.

$R^5$ and $R^6$ are each preferably a hydrogen atom, an aliphatic group, an aromatic group, a heterocyclic group, an acyl group, an alkylsulfonyl group or an arylsulfonyl group. More preferred is a hydrogen atom, an aromatic group, a heterocyclic group, an acyl group, an alkylsulfonyl group or an arylsulfonyl group, and most preferred is a hydrogen atom, an aryl group or a heterocyclic group. A hydrogen atom of each substituent group may be substituted. However, there is no case where $R_5$ and $R_6$ are hydrogen atoms at the same time.

$G^1$, $R^1$ and $R^2$ each independently represents a hydrogen atom or a substituent group, and the substituent group indicates a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group (containing an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group. A hydrogen atom of each substituent group may be substituted.

As $G^1$, preferred is a hydrogen atom, a halogen atom, an aliphatic group, an aromatic group, a hydroxyl group, an alkoxyl group, an aryloxy group, an acyloxy group, a heterocyclic oxy group, an amino group (containing an alkylamino group, an arylamino group and a heterocyclic amino group), an acylamino group, a ureido group, a sulfamoylamino group, an alkoxycarbonylamino group, an aryloxycarbonylamino group, an alkylthio group, an arylthio group or a heterocyclic thio group, and more preferred is a hydrogen atom, a halogen atom, an alkyl group, a hydroxyl group, an alkoxyl group, an aryloxy group, an acyloxy group, an amino group or an acylamino group. A hydrogen atom, an amino group (preferably an anilino group) or an acylamino group is most preferred among others. A hydrogen atom of each substituent group may be substituted.

Preferred examples of $R^1$ and $R^2$ include a hydrogen atom, an alkyl group, a halogen atom, an alkoxycarbonyl group, a carboxyl group, a carbamoyl group, a hydroxyl group, an alkoxyl group and a cyano group.

$R^1$ and $R^5$ or $R^5$ and $R^6$ may combine with each other to form a 5- or 6-membered ring.

When A has a substituent group, or when the substituent group of $R^1$, $R^2$, $R^5$, $R^6$ or G1 has further a substituent group, the substituent group includes the substituent groups given above for $G^1$, $R^1$ and $R^2$.

When the dye of general formula (M-I) of the invention is a water-soluble dye, it is preferred that the dye has further an ionic hydrophilic group as a substituent group on any position of $A^1$, $R^1$, $R^2$, $R^5$, $R^6$ and $G^1$. The ionic hydrophilic groups as the substituent groups include a sulfo group, a carboxyl group, a phosphono group and a quaternary ammonium group. As the ionic hydrophilic group, preferred is a carboxyl group, a phosphono group or a sulfo group, and particularly preferred is a carboxyl group or a sulfo group. The carboxyl group, the phosphono group and the sulfo group may be in the salt form, and examples of counter ions for forming the salts include an ammonium ion, an alkali metal ion (for example, a lithium ion, a sodium ion or a potassium ion) and an organic cation (for example, a tetramethylammonium ion, a tetramethylguanidium ion or a tetramethylphosphonium ion).

Definitions of the substituent groups used in this specification will be described. These definitions are common even when the substituent groups are expressed by different symbols in general formula (M-I) and general formula (M-Ia) described later.

The halogen atoms include a fluorine atom, a chlorine atom and a bromine atom.

The aliphatic group means an alkyl group, a substituted alkyl group, an alkenyl group, a substituted alkenyl group, an alkynyl group, a substituted alkynyl group, an aralkyl group and a substituted aralkyl group. In this specification, the term "substituted" used in "a substituted alkyl group" or the like means that a hydrogen atom existing in "the alkyl group" or the like is substituted by any one of the substituent groups given above for $G^1$, $R^1$ and $R^2$.

The aliphatic group may be branched, or may form a ring. The aliphatic group has preferably 1 to 20 carbon atoms, and more preferably 1 to 16 carbon atoms. Aryl moieties of the aralkyl group and the substituted aralkyl group are preferably phenyl groups or naphthyl groups, and particularly preferably phenyl groups. Examples of the aliphatic groups include a methyl group, an ethyl group, a butyl group, an isopropyl group, a t-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenetyl group, a vinyl group and an allyl group.

The aromatic group means an aryl group and a substituted aryl group. The aryl group is preferably a phenyl group or a naphthyl group, and particularly preferably a phenyl group. The aromatic group has preferably 6 to 20 carbon atoms, and more preferably 6 to 16 carbon atoms.

Examples of the aromatic groups include a phenyl group, a p-tolyl group, a p-methoxyphenyl group, a o-chlorophenyl group and a m-(3-sulfopropylamino)phenyl group.

The heterocyclic group includes a substituted heterocyclic group. In the heterocyclic group, an aliphatic ring, an aromatic ring or another heterocycle may be condensed with the heterocycle. The heterocyclic group is preferably a 5- or 6-membered heterocyclic group. Examples of the substituent groups of the above-mentioned substituted heterocyclic groups include an aliphatic group, a halogen atom, an alkylsulfonyl group, an arylsulfonyl group, an acyl group, an acylamino group, a sulfamoyl group, a carbamoyl group and an ionic hydrophilic group. Examples of the heterocyclic groups include a 2-pyridyl group, a 2-thienyl group, a 2-thiazolyl group, a 2-benzothiazolyl group, a 2-benzoxazolyl group and a 2-furyl group.

The carbamoyl group includes a substituted carbamoyl group. Examples of the substituent groups include an alkyl group. Examples of the carbamoyl groups include a methylcarbamoyl group and a dimethylcarbamoyl group.

The alkoxycarbonyl group includes a substituted alkoxycarbonyl group. As the alkoxycarbonyl group, an alkoxycarbonyl group having 2 to 20 carbon atoms is preferred. Examples of the substituent groups include an ionic hydrophilic group. Examples of the alkoxycarbonyl groups include a methoxycarbonyl group and an ethoxycarbonyl group.

The aryloxycarbonyl group includes a substituted aryloxycarbonyl group. As the aryloxycarbonyl group, an aryloxycarbonyl group having 7 to 20 carbon atoms is preferred. Examples of the substituent groups include an ionic hydrophilic group. Examples of the aryloxycarbonyl groups include a phenoxycarbonyl group.

The heterocyclic oxycarbonyl group includes a substituted heterocyclic oxycarbonyl group. The heterocycles include the heterocycles described for the above-mentioned heterocyclic groups. As the heterocyclic oxycarbonyl group, a heterocyclic oxycarbonyl group having 2 to 20 carbon atoms is preferred. Examples of the substituent groups include an ionic hydrophilic group. Examples of the heterocyclic oxycarbonyl groups include a 2-pyridyloxycarbonyl group.

The acyl group includes a substituted acyl group. As the acyl group, an acyl group having 1 to 20 carbon atoms is preferred. Examples of the substituent groups include an ionic hydrophilic group. Examples of the acyl groups include an acetyl group and a benzoyl group.

The alkoxyl group includes a substituted alkoxyl group. As the acyl group, an acyl group having 1 to 20 carbon atoms is preferred. Examples of the substituent groups include an alkoxyl group, a hydroxyl group and an ionic hydrophilic group. Examples of the alkoxyl groups include a methoxy group, an ethoxy group, an isopropoxy group, a methoxyethoxy group, a hydroxyethoxy group and a 3-carboxypropoxy group.

The aryloxy group includes a substituted aryloxy group. As the aryloxy group, an aryloxy group having 6 to 20 carbon atoms is preferred. Examples of the substituent groups include an alkoxyl group and an ionic hydrophilic group. Examples of the aryloxy groups include a phenoxy group, a p-methoxyphenoxy group and an o-methoxyphenoxy group.

The heterocyclic oxy group includes a substituted heterocyclic oxy group. The heterocycles include the heterocycles described for the above-mentioned heterocyclic groups. As the heterocyclic oxy group, a heterocyclic oxy group having 2 to 20 carbon atoms is preferred. Examples of the substituent groups include an alkyl group, an alkoxyl group and an ionic hydrophilic group. Examples of the heterocyclic oxy groups include a 3-pyridyloxy group and a 3-thienyloxy group.

As the silyloxy group, preferred is a silyloxy group substituted by an aliphatic group having 1 to 20 carbon atoms or an aromatic group. Examples of the silyloxy groups include trimethylsilyloxy and diphenylmethylsilyloxy.

The acyloxy group includes a substituted acyloxy group. As the acyloxy group, an acyloxy group having 1 to 20 carbon atoms is preferred. Examples of the substituent groups include an ionic hydrophilic group. Examples of the acyloxy groups include an acetoxy group and a benzoyloxy group.

The carbamoyloxy group includes a substituted carbamoyloxy group. Examples of the substituent groups include an alkyl group. Examples of the carbamoyloxy groups include an N-methylcarbamoyloxy group.

The alkoxycarbonyloxy group includes a substituted alkoxycarbonyloxy group. As the alkoxycarbonyloxy group, an alkoxycarbonyloxy group having 2 to 20 carbon atoms is preferred. Examples of the alkoxycarbonyloxy groups include a methoxycarbonyloxy group and an isopropoxycarbonyloxy group.

The aryloxycarbonyloxy group includes a substituted aryloxycarbonyloxy group. As the aryloxycarbonyloxy group, an aryloxycarbonyloxy group having 7 to 20 carbon atoms is preferred. Examples of the aryloxycarbonyloxy groups include a phenoxycarbonyloxy group.

The amino group includes a substituted amino group. The substituent groups include an alkyl group, an aryl group and a heterocyclic group, and the alkyl group, the aryl group and the heterocyclic group may each further have a substituent group. The alkylamino group includes a substituted alkylamino group. As the alkylamino group, an alkylamino group having 1 to 20 carbon atoms is preferred. Examples of the substituent groups include an ionic hydrophilic group. Examples of the alkylamino groups include a methylamino group and a diethylamino group.

The arylamino group includes a substituted arylamino group. As the arylamino group, an arylamino group having 6 to 20 carbon atoms is preferred. Examples of the substituent groups include a halogen atom and an ionic hydrophilic group. Examples of the arylamino groups include a phenylamino group and a 2-chlorophenylamino group.

The heterocyclic amino group includes a substituted heterocyclic amino group. The heterocycles include the heterocycles described for the above-mentioned heterocyclic groups. As the heterocyclic amino group, a heterocyclic amino group having 2 to 20 carbon atoms is preferred. Examples of the substituent groups include an alkyl group, a halogen atom and an ionic hydrophilic group.

The acylamino group includes a substituted acylamino group. As the acylamino group, an acylamino group having 2 to 20 carbon atoms is preferred. Examples of the substituent groups include an ionic hydrophilic group. Examples of the acylamino groups include an acetylamino group, a propionylamino group, a benzoylamino group, an N-phenylacetylamino group and a 3,5-disulfobenzoylamino group.

The ureido group includes a substituted ureido group. As the ureido group, a ureido group having 1 to 20 carbon atoms is preferred. Examples of the substituent groups include an alkyl group and an aryl group. Examples of the ureido groups include a 3-methylureido group, a 3,3-dimethylureido group and a 3-phenylureido group.

The sulfamoylamino group includes a substituted sulfamoylamino group. Examples of the substituent groups include an alkyl group. Examples of the sulfamoylamino groups include an N,N-dipropylsulfamoylamino group.

The alkoxycarbonylamino group includes a substituted alkoxycarbonylamino group. As the alkoxycarbonylamino group, an alkoxycarbonylamino group having 2 to 20 carbon atoms is preferred. Examples of the substituent groups include an ionic hydrophilic group. Examples of the alkoxycarbonylamino groups include an ethoxycarbonylamino group.

The aryloxycarbonylamino group includes a substituted aryloxycarbonylamino group. As the aryloxycarbonylamino group, an aryloxycarbonylamino group having 7 to 20 carbon atoms is preferred. Examples of the substituent groups include an ionic hydrophilic group. Examples of the aryloxycarbonylamino groups include a phenoxycarbonylamino group.

The alkylsulfonylamino group and the arylsulfonylamino group include a substituted alkylsulfonylamino group and a substituted arylsulfonylamino group, respectively. As the alkylsulfonylamino group and the arylsulfonylamino group, an alkylsulfonylamino group having 1 to 20 carbon atoms and an arylsulfonyl amino group having 7 to 20 carbon atoms are preferred. Examples of the substituent groups include an ionic hydrophilic group. Examples of the alkylsulfonylamino group and the arylsulfonylamino group include a methylsulfonylamino group, an N-phenylmethylsulfonylamino group, a phenylsulfonylamino group and a 3-carboxyphenylsulfonylamino group.

The heterocyclic sulfonylamino group includes a substituted heterocyclic sulfonylamino group. The heterocycles include the heterocycles described for the above-mentioned heterocyclic groups. As the heterocyclic sulfonylamino group, a heterocyclic sulfonylamino group having 1 to 12 carbon atoms is preferred. Examples of the substituent groups include an ionic hydrophilic group. Examples of the heterocyclic sulfonylamino groups include a 2-thienylsulfonylamino group and a 3-pyridylsulfonylamino group.

The alkylthio groups, the arylthio groups and the heterocyclic thio groups include a substituted alkylthio group, a substituted arylthio group and a substituted heterocyclic thio group, respectively. The heterocycles include the heterocycles described for the above-mentioned heterocyclic groups. As the alkylthio group, the arylthio group and the heterocyclic thio group, ones having 1 to 20 carbon atoms are preferred. Examples of the substituent groups include an ionic hydrophilic group. Examples of the alkylthio groups, the arylthio groups and the heterocyclic thio groups include a methylthio group, a phenylthio group and a 2-pyridylthio group.

The alkylsulfonyl group and the arylsulfonyl group include a substituted alkylsulfonyl group and a substituted arylsulfonyl group. Examples of the alkylsulfonyl groups and the arylsulfonyl groups include a methylsulfonyl group and a phenylsulfonyl group, respectively.

The heterocyclic sulfonyl group includes a substituted heterocyclic sulfonyl group. The heterocycles include the heterocycles described for the above-mentioned heterocyclic groups. As the heterocyclic sulfonyl group, a heterocyclic sulfonyl group having 1 to 20 carbon atoms is preferred. Examples of the substituent groups include an ionic hydrophilic group. Examples of the heterocyclic sulfonyl groups include a 2-thienylsulfonyl group and a 3-pyridylsulfonyl group.

The alkylsulfinyl group and the arylsulfinyl group include a substituted alkylsulfinyl group and a substituted arylsulfinyl group, respectively. Examples of the alkylsulfinyl groups and the arylsulfinyl groups include a methylsulfinyl group and a phenylsulfinyl group, respectively.

The heterocyclic sulfinyl group includes a substituted heterocyclic sulfinyl group. The heterocycles include the heterocycles described for the above-mentioned heterocyclic groups. As the heterocyclic sulfinyl group, a heterocyclic sulfinyl group having 1 to 20 carbon atoms is preferred. Examples of the substituent groups include an ionic hydrophilic group. Examples of the heterocyclic sulfinyl groups include a 4-pyridylsulfinyl group.

The sulfamoyl group includes a substituted sulfamoyl group. Examples of the substituent groups include an alkyl group. Examples of the sulfamoyl groups include a dimethylsulfamoyl group and a di-(2-hydroxyethyl)sulfamoyl group.

In the invention, a particularly preferred structure is one represented by the following general formula (M-Ia):

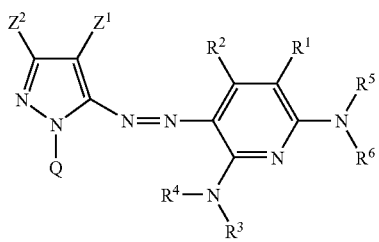

(M-Ia)

wherein $R^1$, $R^2$, $R^5$ and $R^6$ have the same meanings as given for general formula (M-I).

$R^3$ and $R^4$ each independently represents a hydrogen or a substituent group, and the substituent group indicates an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. A hydrogen atom, an aromatic group, a heterocyclic group, an acyl group, an alkylsulfonyl group or an arylsulfonyl group is preferred among others, and a hydrogen atom, an aromatic group or a heterocyclic group is particularly preferred.

$Z^1$ represents an electron attractive group having a Hammett substituent constant σp of 0.20 or more. $Z^1$ is preferably an electron attractive group having a constant of 0.30 or more, more preferably an electron attractive group having a constant of 0.45 or more, and particularly preferably an electron attractive group having a constant of 0.60 or more. However, it is desirable that the constant does not exceed 1.0. Preferred specific examples of the substituent groups include electron attractive substituent groups described later. An acyl group having 2 to 20 carbon atoms, an alkyloxycarbonyl group having 2 to 20 carbon atoms, a nitro group, a cyano group, an alkylsulfonyl group having 1 to 20 carbon atoms, an arylsulfonyl group having 6 to 20 carbon atoms, a carbamoyl group having 1 to 20 carbon atoms and an alkyl halide having 1 to 20 carbon atoms are preferred among others. Particularly preferred are a cyano group, an alkylsulfonyl group having 1 to 20 carbon atoms and an arylsulfonyl group having 6 to 20 carbon atoms, and most preferred is a cyano group.

$Z^2$ represents a hydrogen atom or a substituent group, and the substituent group indicates an aliphatic group, an aromatic group or a heterocyclic group. $Z^2$ is preferably an aliphatic group, and more preferably an alkyl group having 1 to 6 carbon atoms.

Q represents a hydrogen atom or a substituent group, and the substituent group indicates an aliphatic group, an aromatic group or a heterocyclic group. Q is preferably a group comprising a group of non-metallic elements necessary for forming a 5- to 8-membered ring among others. The 5- to 8-membered ring may be substituted, be a saturated ring or have an unsaturated bond. An aromatic group and a heterocyclic group are particularly preferred among others. Preferred examples of the non-metallic elements include a nitrogen atom, an oxygen atom, a sulfur atom and a carbon atom. Specific examples of such ring structures include, for example, a benzene ring, a cyclopentane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulfolane ring and a thiane ring.

A hydrogen atom of each substituent group described for general formula (M-Ia) may be substituted. The substituent groups include the substituent groups described for general formula (M-I), and the groups and ionic hydrophilic groups exemplified for $G^1$, $R^1$ and $R^2$.

The Hammett substituent constant σp used in this specification will be described here. Hammett's rule is an empirical rule propounded by L. P. Hammett in 1935 in order to quantitatively deal with the influence of a substituent group on the reaction and equilibrium of a benzene derivative, and the validity thereof has today been widely recognized. As the substituent constants determined in Hammett's rule, there are the σp value and the σm value. These constants are described in detail, for example, in *Lange's Handbook of Chemistry*, the 12th edition, edited by J. A. Dean, 1979 (McGraw-Hill) and Kagaku no Ryoiki (Journal of Japanese Chemistry), an extra issue, 122, 96–103 (1979), Nankodo, although they can be found in many general literatures. In the invention, each substituent group is limited or illustrated by the Hammett substituent constant σp. However, this does not mean that the substituent group is limited to only a substituent group having the constant known in the above-mentioned general literatures. Even when the constant is unknown in literatures, it goes without saying that a substituent group having the constant that will be within the range when measured based on Hammett's rule is also included. Further, although the compounds represented by general formula (1a) of the invention also include some compounds other than the benzene derivatives, the σp value is used as a measure indicating the electronic efficiency of the substituent group, independently of the substituted position. In the invention, the σp value is used in such a sense.

Examples of the electron attractive groups having a Hammett substituent constant σp of 0.60 or more include a cyano group, a nitro group, an alkylsulfonyl group (for example, methylsulfonyl) and an arylsulfonyl group (for example, phenylsulfonyl).

Examples of the electron attractive groups having a Hammett substituent constant σp of 0.45 or more include, as well as the above-mentioned groups, an acyl group (for example, acetyl), an alkoxycarbonyl group (for example, dodecyloxycarbonyl), an aryloxycarbonyl group (for example m-chlorophenoxycarbonyl), an alkylsulfinyl group (for example, n-propylsulfinyl), an arylsulfinyl group (for example, phenylsulfinyl), a sulfamoyl group (for example, N-ethylsulfamoyl or N,N-dimethylsulfamoyl) and an alkyl halide group (for example trifluoromethyl).

Examples of the electron attractive groups having a Hammett substituent constant σp of 0.30 or more include, as well as the above-mentioned groups, an acyloxy group (for example, acetoxy), a carbamoyl group (for example, N-ethylcarbamoyl or N,N-dibutylcarbamoyl), an alkoxyl halide group (for example, trifluoromethyloxy), an aryloxy halide group (for example, pentafluorophenyloxy), a sulfonyloxy group (for example, methylsulfonyloxy), an alkylthio halide group (for example, difluoromethylthio), an aryl group substituted by two or more electron attractive groups having a constant σp of 0.15 or more (for example, 2,4-dinitrophenyl or pentachlorophenyl) and a heterocycle (for example, 2-benzoxazolyl, 2-benzothiazolyl or 1-phenyl-2-benzimidazolyl).

Specific examples of the electron attractive groups having a constant σp of 0.20 or more include halogen atom, as well as the above-mentioned groups.

As for a particularly preferred combination of the substituent groups as the azo dye represented by general formula (M-I) described above, $R_5$ and $R_6$ are each preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, there is no case where $R_5$ and $R_6$ both are hydrogen atoms.

$G^1$ is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

$A^1$ is preferably a pyrazole ring, an imidazole ring, an isothiazole ring, a thiadiazole ring or a benzothiazole ring, more preferably a pyrazole ring or an isothiazole ring, and most preferably a pyrazole ring.

$B^1$ and $B_2$ are each preferably $=CR^1-$ or $-CR^2=$. $R^1$ and $R^2$ are each preferably a hydrogen atom, an alkyl group, a halogen atom, a cyano group, a carbamoyl group, a carboxyl group, a hydroxyl group, an alkoxyl group or an alkoxycarbonyl group, and more preferably a hydrogen atom, an alkyl group, a carboxyl group, a cyano group or a carbamoyl group.

As for a preferred combination of the compounds represented by the above-mentioned general formula (M-I), the compound in which at least one of various substituent groups is the above-mentioned preferred group is preferred, the compound in which more various substituent groups are the above-mentioned preferred groups is more preferred, and the compound in which all substituent groups are the above-mentioned preferred groups is most preferred.

Specific examples of the compounds (azo dyes) represented by the above-mentioned general formula (M-I) are shown below, but the azo dyes used in the invention should not be construed as being limited to the following examples.

TABLE 7

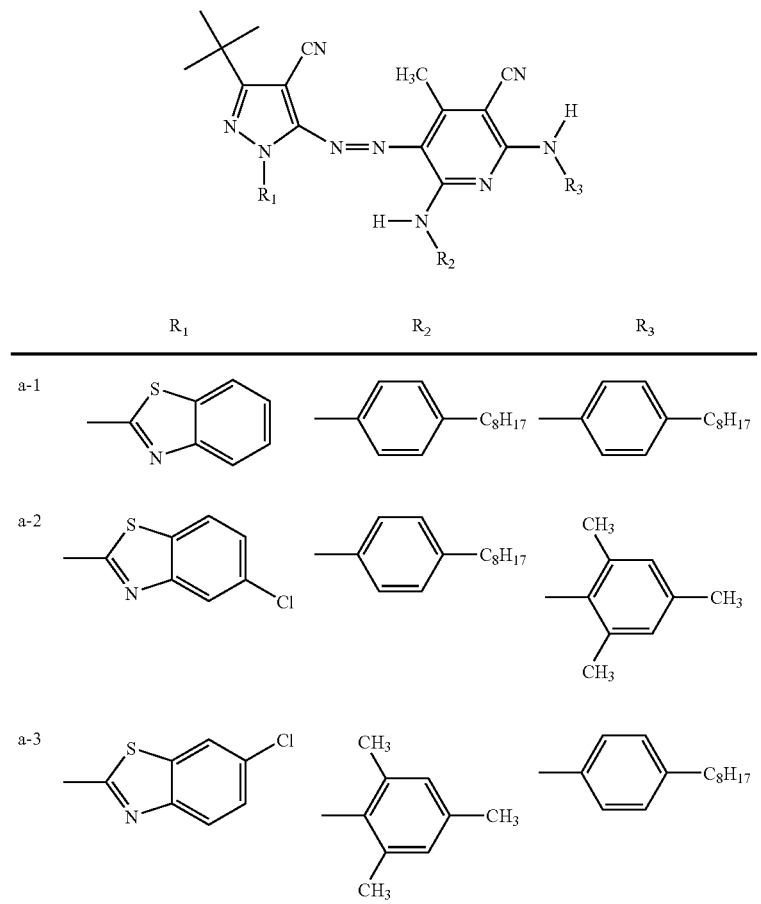

TABLE 7-continued
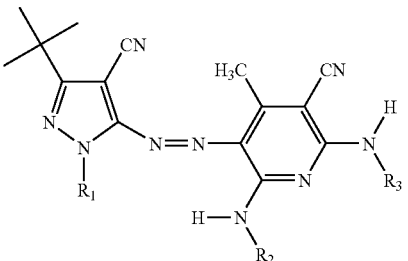
| | R₁ | R₂ | R₃ |
|---|---|---|---|
| a-4 | 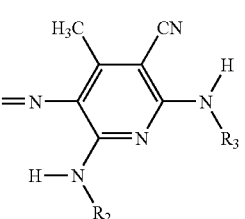 |  |  |
| a-5 | 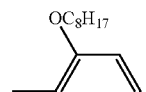 | 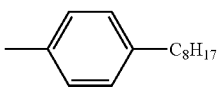 |  |
TABLE 8
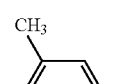
| | R₁ | R₂ | R₃ |
|---|---|---|---|
| a-6 | 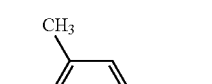 | 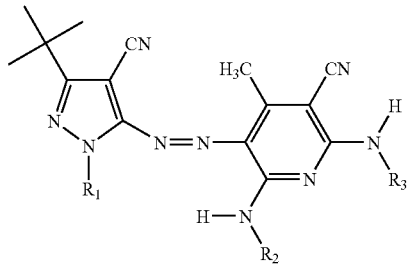 | 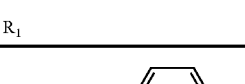 |
| a-7 | 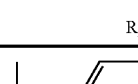 | 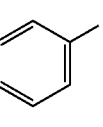 | 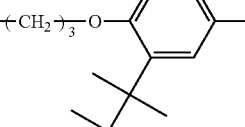 |
| a-8 | 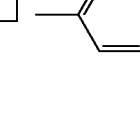 | 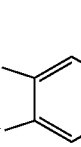 | 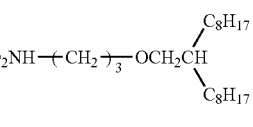 |

TABLE 8-continued
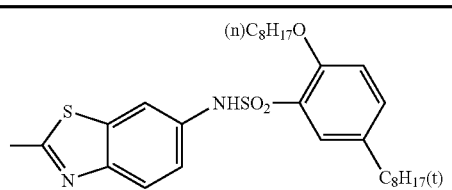
| | $R_1$ | $R_2$ | $R_3$ |
|---|---|---|---|
| a-9 | 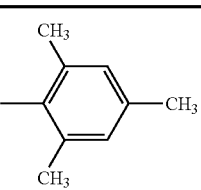 | 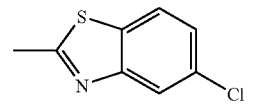 | $C_8H_{17}(t)$ |
| a-10 | 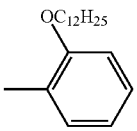 | 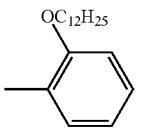 $OC_{12}H_{25}$ | 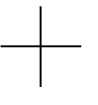 $OC_{12}H_{25}$ |
TABLE 9
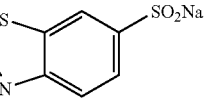
| | $R_1$ | $R_2$ | $R_3$ | $R_4$ |
|---|---|---|---|---|
| a-11 | 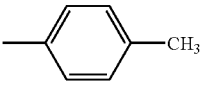 | 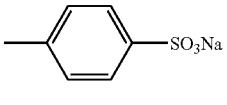 | 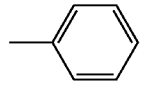 | 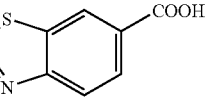 |
| a-12 | 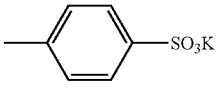 | 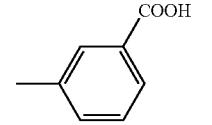 | 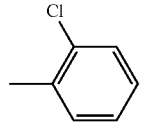 | 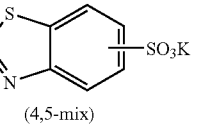 |
| a-13 | 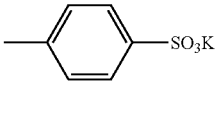 | 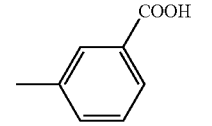 (4,5-mix) | 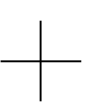 | 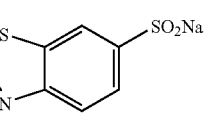 |
| a-14 | 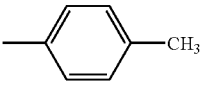 | 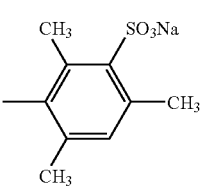 | 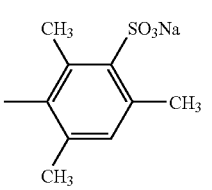 | 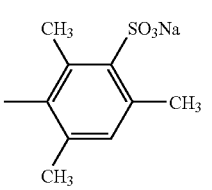 |

TABLE 9-continued
| | R₁ | R₂ | R₃ | R₄ |
|---|---|---|---|---|
| a-15 | 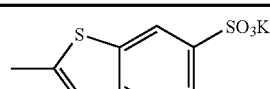 | 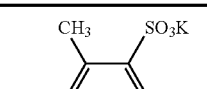 | 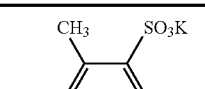 |  |
| a-16 | 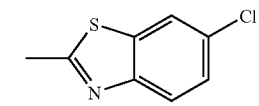 | 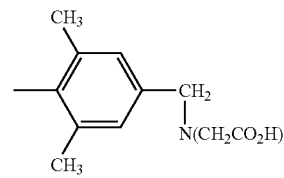 | 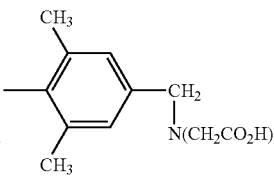 |  |
| a-17 | 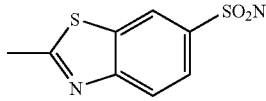 | 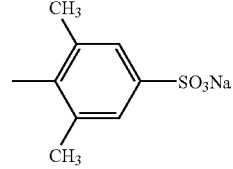 | 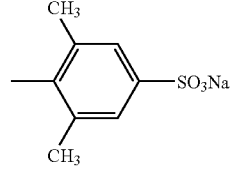 | |
TABLE 10
| | R₁ | R₂ | R₃ | R₄ |
|---|---|---|---|---|
| a-18 | | | | |
| a-19 | | —SO₂CH₃ | | |

TABLE 10-continued
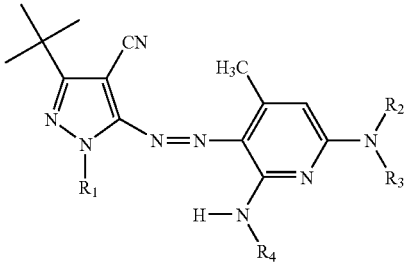
| | R₁ | R₂ | R₃ | R₄ |
|---|---|---|---|---|
| a-20 | 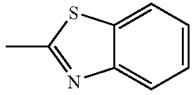 | —COCH₃ | C₈H₁₇(t) | C₈H₁₇(t) |
| a-21 | 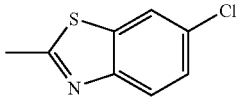 | —SO₂CH₃ | 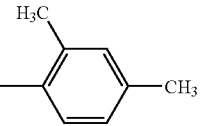 | C₈H₁₇(t) |
| a-22 | 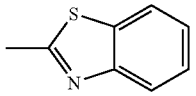 | H | 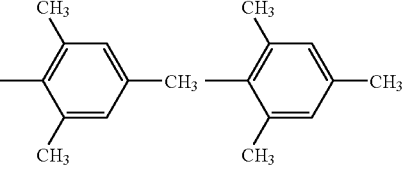 | 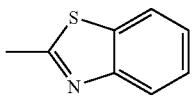 |
| a-23 | 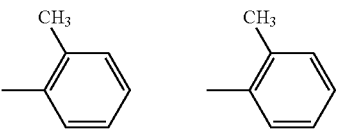 | H | 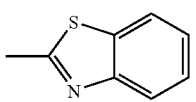 | 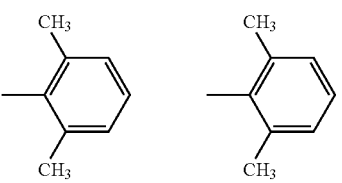 |
| a-24 | 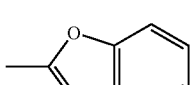 | H | 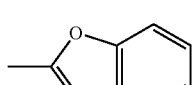 | 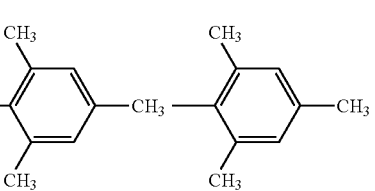 |
| a-25 |  |  |  |  |

TABLE 11
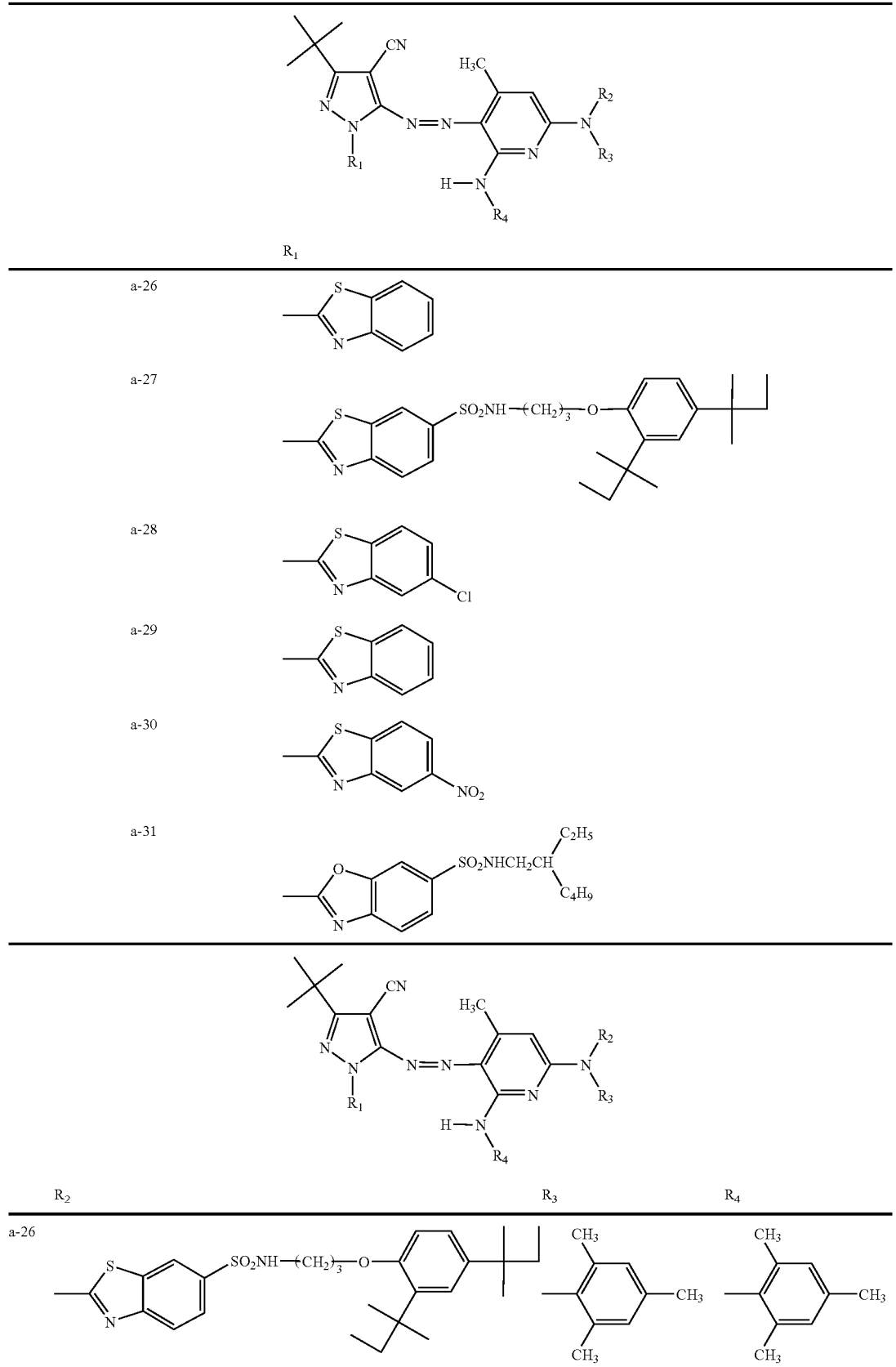

TABLE 11-continued

| | | | | |
|---|---|---|---|---|
| a-27 | | | | |
| a-28 | | | | |
| a-29 | | | | |
| a-30 | | | | |
| a-31 | | | | |

TABLE 12

| | R₁ | R₂ |
|---|---|---|
| a-32 | | |
| a-33 | | |

TABLE 12-continued
a-34 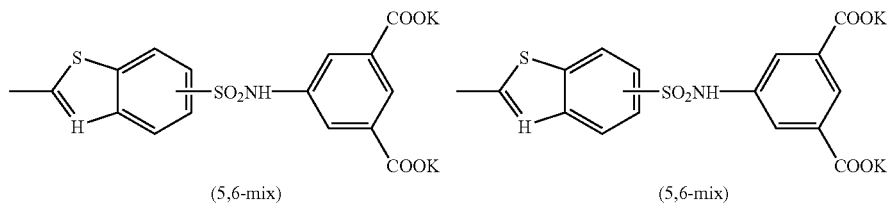
(5,6-mix)      (5,6-mix)
a-35 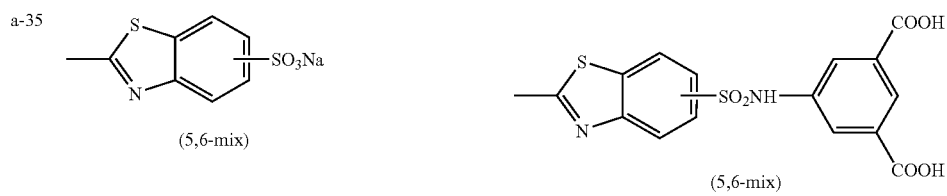
(5,6-mix)      (5,6-mix)
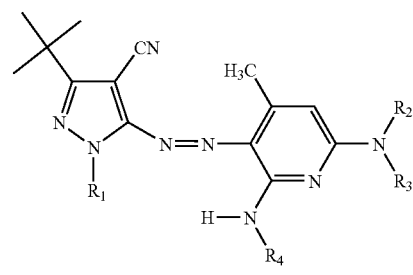
| | $R_3$ | $R_4$ |
|---|---|---|
| a-32 | 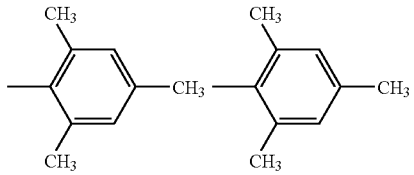 | |
| a-33 | 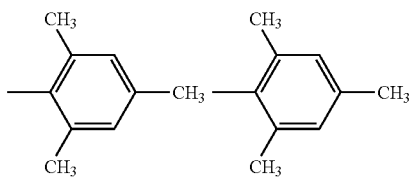 | |
| a-34 | 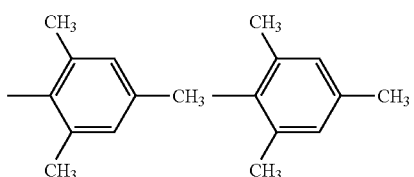 | |
| a-35 | 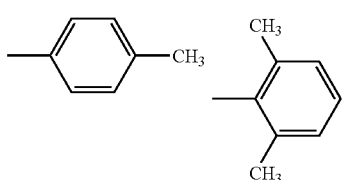 | |

TABLE 13

[Structure: pyrazole-azo-pyridine dye with R1, R2, R3, R4 substituents, tert-butyl and CN on pyrazole, CH3 on pyridine]

| | R1 | R2 |
|---|---|---|
| a-36 | 2-methylbenzothiazole-6-SO3Na | 2-methylbenzothiazole-6-SO3Na |
| a-37 | 2-methylbenzothiazole-6-SO2NH-(3,5-di-COOK-phenyl) | 2-methylbenzothiazole |
| a-38 | 2-methylbenzothiazole-6-SO3Li | 2-methylbenzothiazole-6-SO3Li |
| a-39 | 2-methylbenzothiazole-6-SO3Na | 2-methylbenzothiazole-6-SO3Na |
| a-40 | 2-methylbenzothiazole | 2-methylbenzothiazole-6-SO3K |

[Structure repeated]

| | R3 | R4 |
|---|---|---|
| a-36 | 2,3,4,6-tetramethyl-5-SO3Na-phenyl | 2,3,4,6-tetramethyl-5-SO3Na-phenyl |

TABLE 13-continued

| | | |
|---|---|---|
| a-37 | 2,4-dimethyl-6-SO₃K phenyl with CH₃ groups | 2,4-dimethyl-6-SO₃K phenyl with CH₃ groups |
| a-38 | 3,4,5-trimethylphenyl-SO₃Li | 3,4,5-trimethylphenyl-SO₃Li |
| a-39 | 3,4,5-trimethylphenyl-CH₂-N(CH₂COOH)₂ | 3,4,5-trimethylphenyl-CH₂-N(CH₂COOH)₂ |
| a-40 | trimethylphenyl-SO₃K | trimethylphenyl-SO₃K |

TABLE 14

Structure: pyrazole-N=N-pyridine with substituents $R_1, R_2, R_3$ on pyrazole and $R_4, R_5, R_6, R_7, R_8$ on pyridine

| | $R_1$ | $R_2$ | $R_3$ | $R_4$ | $R_5$ | $R_6$ |
|---|---|---|---|---|---|---|
| a-41 | 2-methylphenyl (CH₃) | CN | 2-pyridyl | H | CONH₂ | SO₂CH₃ |
| a-42 | t-butyl | Br | 2-pyrimidyl | COOEt | H | 2-benzothiazolyl |
| a-43 | 2-pyridyl | SO₂CH₃ | 4,6-bis(NHCH₃)-1,3,5-triazin-2-yl | CONH₂ | H | 6-chloro-2-benzothiazolyl |

TABLE 14-continued
| | | | | | |
|---|---|---|---|---|---|
| a-44 |  | CN | 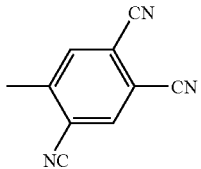 | H | H | 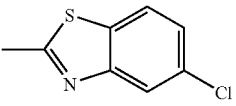 |
| a-45 |  | Br | 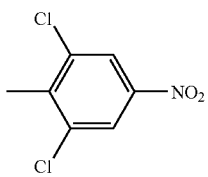 | H | CONH$_2$ | CCH$_3$<br>‖<br>O |
| a-46 |  | CN |  | CH$_3$ | H | 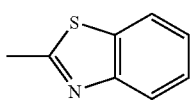 |
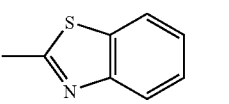
| | R$_7$ | R$_8$ |
|---|---|---|
| a-41 | 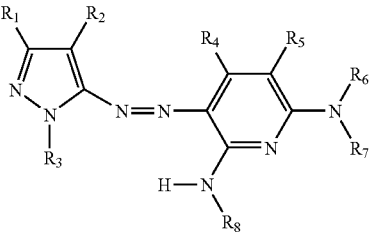 OC$_8$H$_{17}$ | 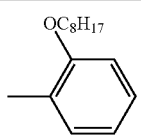 CH$_3$ |
| a-42 | C$_8$H$_{17}$(t) | COCH$_3$ |
| a-43 | 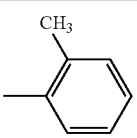 CH$_3$ | CO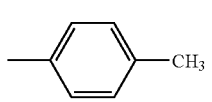 |
| a-44 | 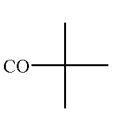 CH$_3$ | SO$_2$CH$_3$ |
| a-45 | 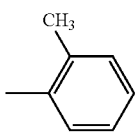 | 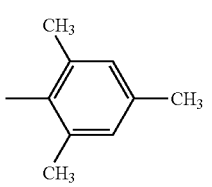 C$_8$H$_{17}$ |
| a-46 | 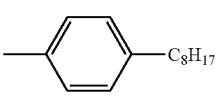 | 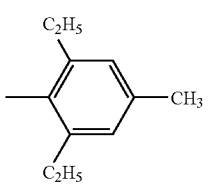 |

TABLE 15

Structure: isothiazole-CN with R1, linked via N=N to pyridine bearing R2, R3, NR4R5, and NH-R6.

| | R1 | R2 | R3 | R4 | R5 | R6 |
|---|---|---|---|---|---|---|
| b-1 | $CH_3$ | $CH_3$ | CN | H | -C6H4-$C_8H_{17}$ | -C6H4-$C_8H_{17}$ |
| b-2 | $CH_3$ | $CH_3$ | CN | H | 2,3,4,5-tetramethylphenyl | 2,3,4,5-tetramethylphenyl |
| b-3 | $CH_3$ | $CH_3$ | $CONH_2$ | H | -C6H4-$C_8H_{17}$ | 2,3,4,5-tetramethylphenyl |
| b-4 | $CH_3$ | $CH_3$ | H | H | 2,3,4,6-tetramethyl-5-$SO_3Li$-phenyl | 2,3,4,6-tetramethyl-5-$SO_3Li$-phenyl |
| b-5 | $CH_3$ | H | CN | H | -C6H4-$SO_3Na$ | -C6H4-$SO_3Na$ |

TABLE 16

Same structure as Table 15.

| | R1 | R2 | R3 | R4 | R5 | R6 |
|---|---|---|---|---|---|---|
| b-6 | $CH_3$ | $CH_3$ | H | 2-benzothiazolyl | 2,3,5,6-tetramethyl-4-$CH_2N(CH_2CO_2K)_2$-phenyl | 2,3,5,6-tetramethyl-4-$CH_2N(CH_2CO_2K)_2$-phenyl |

TABLE 16-continued

[Structure: isothiazole-azo-pyridine dye with R1, CN on isothiazole; R2, R3, NR4R5, NHR6 on pyridine]

| | R₁ | R₂ | R₃ | R₄ | R₅ | R₆ |
|---|---|---|---|---|---|---|
| b-7 | CH₃ | CH₃ | H | 2-benzothiazolyl | 2,4,6-trimethylphenyl | 4-C₈H₁₇-phenyl |
| b-8 | CH₃ | H | H | SO₂CH₃ | 3,4-dimethylphenyl-SO₃Na | 3,4-dimethylphenyl-SO₃Na |

TABLE 17

[Structure: thiadiazole-azo-pyridine dye with R1 on thiadiazole; R2, R3, NR4R5, NHR6 on pyridine]

| | R₁ | R₂ | R₃ | R₄ |
|---|---|---|---|---|
| c-1 | —SCH₃ | CH₃ | CN | H |
| c-2 | phenyl | H | CONH₂ | H |
| c-3 | —SCH₂CH₂SO₃K | CH₃ | H | 2-methylbenzothiazol-6-yl-SO₃K |
| c-4 | —CH₃ | CH₃ | H | 2-methylbenzothiazol-6-yl-SO₂NH(CH₂)₃O-(2,4-di-tert-pentylphenyl) |

TABLE 17-continued

| | | | | |
|---|---|---|---|---|
| c-5 | (phenyl-CH3) | H | H | 2-methylbenzothiazol-6-yl-NHSO2-(2-OC8H17(n), 5-C8H17(t))-phenyl |

[Structure: R1-substituted thiadiazole-azo-pyridine with R2, R3, R4, R5, R6 substituents, and H—N—R6]

| | R5 | R6 |
|---|---|---|
| c-1 | C8H17(t) | —C6H4—C8H17 |
| c-2 | —C6H4—SO3K | —C6H4—SO3K |
| c-3 | —C6H4—SO3K | —C6H4—SO3K |
| c-4 | 2,4,6-tri-CH3-phenyl | —C6H4—C8H17 |
| c-5 | 2,4,6-tri-CH3-phenyl | C8H17(t) |

TABLE 18

[Structure: R1-substituted thiadiazole-azo-pyridine with R2, R3, R4, R5, R6 substituents, and H—N—R6]

| | R1 | R2 | R3 | R4 | R5 | R6 |
|---|---|---|---|---|---|---|
| d-1 | Me | CH2 | CN | H | —C6H4—SO3K | —C6H4—SO3K |

TABLE 18-continued

[Structure: 1,3,4-thiadiazole with R¹, connected via N=N azo to pyridine ring with R², R³, NR⁴R⁵, and NHR⁶ substituents]

| | R₁ | R₂ | R₃ | R₄ | R₅ | R₆ |
|---|---|---|---|---|---|---|
| d-2 | Me | CH₃ | CN | H | 2,5-diethyl-4-methylphenyl | 2,5-diethyl-4-methylphenyl |
| d-3 | Me | H | H | 2-benzothiazolyl | 2,4,6-trimethyl-3-sulfo(K) phenyl | 2,4,6-trimethyl-3-sulfo(K) phenyl |
| d-4 | Ph | CH₃ | CONH₂ | H | 4-C₈H₁₇-phenyl | 4-C₈H₁₇-phenyl |
| d-5 | Ph | CH₃ | H | 2-methylbenzothiazol-6-yl-SO₂NH(CH₂)₃O-(2,4-di-tert-pentylphenyl) | 4-OC₄H₉(n)-phenyl | 2,5-diethyl-4-methylphenyl |

TABLE 19

[Structure: benzothiazole (positions 4,5,6,7) with R¹, connected via N=N azo to pyridine ring with R², R³, NR⁴R⁵, NHR⁶]

| | R₁ | R₂ | R₃ | R₄ | R₅ | R₆ |
|---|---|---|---|---|---|---|
| e-1 | 5-Cl | CH₃ | CONH₂ | H | C₈H₁₇(t) | C₈H₁₇(t) |
| e-2 | 5,6-diCl | H | H | 2-methylbenzothiazol-6-yl-(4-C₈H₁₇-phenyl) | 4-C₈H₁₇-phenyl | 4-C₈H₁₇-phenyl |

TABLE 19-continued
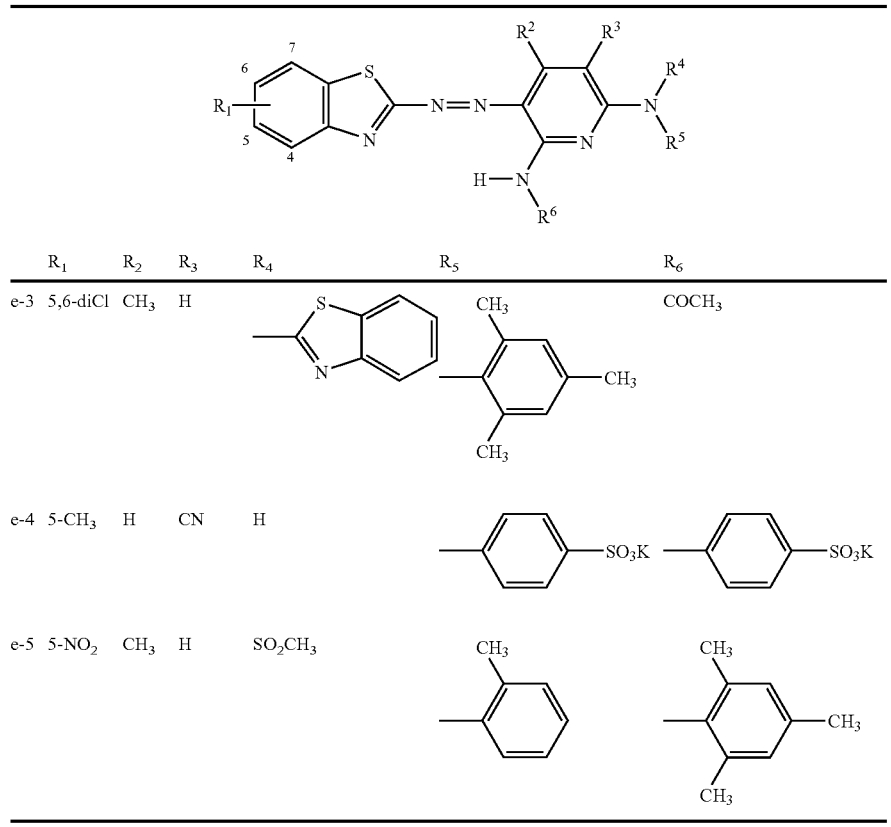
| | $R_1$ | $R_2$ | $R_3$ | $R_4$ | $R_5$ | $R_6$ |
|---|---|---|---|---|---|---|
| e-3 | 5,6-diCl | $CH_3$ | H | (2-methylbenzothiazolyl) | (2,4,6-trimethylphenyl) | $COCH_3$ |
| e-4 | 5-$CH_3$ | H | CN | H | (4-$SO_3K$-phenyl) | (4-$SO_3K$-phenyl) |
| e-5 | 5-$NO_2$ | $CH_3$ | H | $SO_2CH_3$ | (2-methylphenyl) | (2,4,6-trimethylphenyl) |
f-1
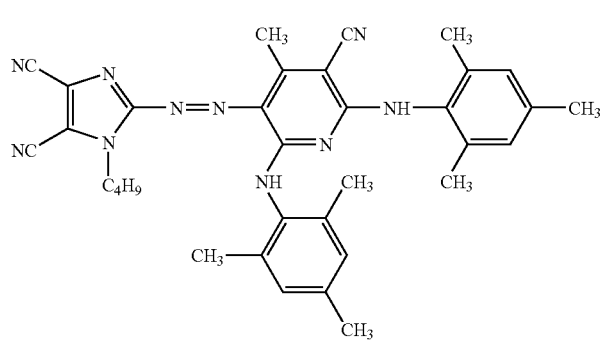
f-2
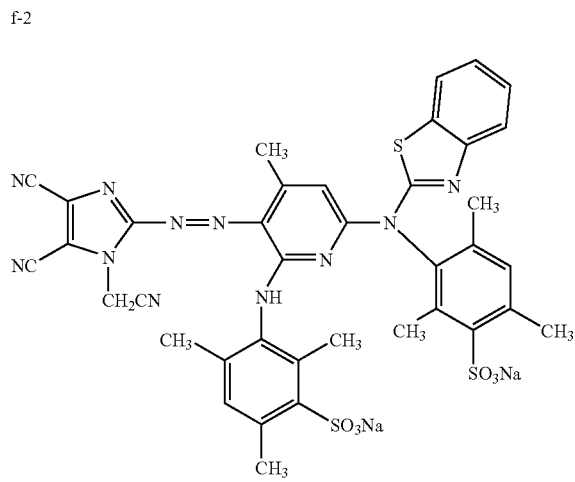

The magenta ink composition of the invention comprises at least one kind of azo dye M-I dispersed and/or dissolved in an aqueous medium, and contains the azo dye preferably in an amount of 0.2% to 20% by weight, more preferably in an amount of 0.5% to 15% by weight.

The above-mentioned azo dye M-I used in the invention is substantially water-soluble. The term "substantially water-soluble" means that the dye is soluble in water at 20° C. in an amount of 2% by weight or more.

Further, in the magenta ink composition, another magenta dye can be used in combination with the above-mentioned azo dye M-I.

The magenta dyes which can be used in combination include an arylazo or heterylazo dye having, for example, a phenol, a naphthol or an aniline as a coupling component; an azomethine dye having, for example, a pyrazolone or a pyrazolotriazole as a coupling component; a methine dye such as an arylidene dye, a styryl dye, a merocyanine dye or an oxonol dye; a carbonium dye such as a diphenylmethane dye, a triphenylmethane dye or a xanthene dye; a quinone dye such as a naphthoquinone dye, an anthraquinone dye or an anthrapyridone dye; and a condensed polycyclic coloring material such as a dioxazine dye. These dyes may be ones showing a yellow color only after chromophores partly dissociate. In that case, counter cations may be either inorganic cations such as alkali metals and ammonium or organic cations such as pyridinium and quaternary ammonium salts. Further, the counter cations may also be polymer cations having those as partial structures.

<Cyan Inks>

In order to lower the reactivity with an oxidative gas such as ozone, it is desirable that an electron attractive group is introduced into a phthalocyanine skeleton to allow the coloring agent as the cyan ink of the invention to be nobler than 1.0 V (vs. SCE) in oxidation potential. It is preferred that the oxidation potential is nobler. The oxidation potential is more preferably nobler than 1.1 V (vs. SCE), and most preferably nobler than 1.2 V (vs. SCE).

The value (Eox) of the oxidation potential can be easily measured by one skilled in the art. This measuring method is described, for example, in P. Delahay, *New Instrumental Methods in Electrochemistry* (Interscience Publishers, 1954), A. J. Bard et al., *Electrochemical methods* (John Wiley & Sons, 1980) and Shota Fujishima, *Electrochemical Measuring Methods* (Gihodo Shuppan, 1984).

Specifically, the oxidation potential is measured as a value to an SCE (saturated calomel electrode) by dissolving a sample to be tested in an amount of $1 \times 10^{-4}$ to $1 \times 10^{-6}$ mol/liter in a solvent such as dimethylformamide or acetonitrile containing a supporting electrolyte such as sodium perchlorate or tetrapropylammonium perchlorate, and using cyclic voltammetry or direct current polarography. This value deviates some tens millivolts under the influence of liquid junction potential, solution resistance of the sample solution or the like in some cases. However, the reproducibility of the potential can be assured by using a standard sample (for example, hydroquinone).

In order to primarily specify the potential, the value (vs. SCE) measured by using direct current polarography in dimethylformamide containing 0.1 mol·dm$^{-3}$ of tetrapropylammonium perchlorate (the dye concentration is 0.001 mol·dm$^{-3}$) is taken as the oxidation potential of the dye in the invention.

The Eox value indicates ease of electron transfer to an electrode, and the higher value (the nobler oxidation potential) indicates that the electron transfer from the sample to the electrode, in other words, oxidation, is more difficult. In relation to the structure of a compound, the oxidation potential becomes nobler by the introduction of an electron attractive group, and baser by the introduction of an electron donative group. In the invention, in order to lower the reactivity with ozone, an electrophile, it is desirable to introduce the electron attractive group into the phthalocyanine skeleton, thereby making the oxidation potential nobler. Accordingly, using the Hammett substituent constant σp that is a measure of electron attraction or electron donation of the substituent group, it is said that the oxidation potential can be made nobler by the introduction of the substituent group high in σp value such as a sulfinyl group, a sulfonyl group or a sulfamoyl group.

In the invention, the use of the phthalocyanine dye represented by the above-mentioned general formula (C-I) is particularly preferred.

The compound of general formula (C-I) used in the invention will be described in detail.

In general formula (C-I), $X_1$, $X_2$, $X_3$ and $X_4$ each independently represents —SO-Z, —SO$_2$-Z, —SO$_2$NR$_1$R$_2$, a sulfo group, —CONR$_1$R$_2$ or —CO$_2$R$_1$. Of these substituent groups, —SO-Z, —SO$_2$-Z, —SO$_2$NR$_1$R$_2$ and —CONR$_1$R$_2$ are preferred, —SO$_2$-Z and —SO$_2$NR$_1$R$_2$ are particularly preferred, and —SO$_2$-Z is most preferred. Here, when any one of $a_1$ to $a_4$ indicating the number of substituent groups represents a number of 2 or more, pluralities of $X_1$'s to $X_4$'s may each be the same or different, and each independently represents any one of the above-mentioned groups. Further, $X_1$, $X_2$, $X_3$ and $X_4$ may be either the completely same substituent group, or substituent groups of the same kind but partially different from one another, for example, $X_1$, $X_2$, $X_3$ and $X_4$ which are all —SO$_2$-Z, but different in each Z. Furthermore, they may be groups different from one another, for example, —SO$_2$-Z and —SO$_2$NR$_1$R$_2$.

The above-mentioned Z each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group. Preferred is a substituted or unsubstituted alkyl group, a substituted or unsubstituted aryl group or a substituted or unsubstituted heterocyclic group, and of these, most preferred is a substituted alkyl group, a substituted aryl group or a substituted heterocyclic group.

The above-mentioned $R_1$ and $R_2$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group. A hydrogen atom, a substituted or unsubstituted alkyl group, a substituted or unsubstituted aryl group and a substituted or unsubstituted heterocyclic group are preferred among others. Of these, a hydrogen atom, a substituted alkyl group, a substituted aryl group or a substituted heterocyclic group is more preferred. However, it is unfavorable that $R_1$ and $R_2$ are both hydrogen atoms.

As the substituted or unsubstituted alkyl group represented by $R_1$, $R_2$ and Z, an alkyl group having 1 to 30 carbon atoms is preferred. In particular, a branched alkyl group is preferred for the reason that dye solubility and ink stability are enhanced, and it is particularly preferred that an asymmetric carbon is contained (the use as a racemic modification). Examples of the substituent groups include the same substituent groups as those at the time when Z, $R_1$, $R_2$, $Y_1$, $Y_2$, $Y_3$ and $Y_4$ described later can further have substituent groups. A hydroxyl group, an ether group, an ester group, a cyano group, an amido group and a sulfonamido group are particularly preferred among others, because the associative properties of the ink are enhanced and the fastness is improved. In addition, a halogen atom or an ionic hydrophilic group may be contained. The carbon atom number of the alkyl group does not contain carbon atoms of the substituent group, and the same applies for the other groups.

As the substituted or unsubstituted cycloalkyl group represented by $R_1$, $R_2$ and Z, a cycloalkyl group having 5 to 30 carbon atoms is preferred. In particular, for the reason that dye solubility and ink stability are enhanced, it is particularly preferred that an asymmetric carbon is contained (the use as a racemic modification). Examples of the substituent groups include the same substituent groups as those at the time when Z, $R_1$, $R_2$, $Y_1$, $Y_2$, $Y_3$ and $Y_4$ described later can further have substituent groups. A hydroxyl group, an ether group, an ester group, a cyano group, an amido group and a sulfonamido group are particularly preferred among others, because the associative properties of the ink are enhanced and the fastness is improved. In addition, a halogen atom or an ionic hydrophilic group may be contained.

As the substituted or unsubstituted alkenyl group represented by $R_1$, $R_2$ and Z, an alkenyl group having 2 to 30 carbon atoms is preferred. In particular, a branched alkenyl group is preferred for the reason that dye solubility and ink stability are enhanced, and it is particularly preferred that an asymmetric carbon is contained (the use as a racemic modification). Examples of the substituent groups include the same substituent groups as those at the time when Z, $R_1$, $R_2$, $Y_1$, $Y_2$, $Y_3$ and $Y_4$ described later can further have substituent groups. A hydroxyl group, an ether group, an ester group, a cyano group, an amido group and a sulfonamido group are particularly preferred among others, because the associative properties of the ink are enhanced and the fastness is improved. In addition, a halogen atom or an ionic hydrophilic group may be contained.

As the substituted or unsubstituted aralkyl group represented by $R_1$, $R_2$ and Z, an aralkyl group having 7 to 30 carbon atoms is preferred. In particular, a branched aralkyl group is preferred for the reason that dye solubility and ink stability are enhanced, and it is particularly preferred that an asymmetric carbon is contained (the use as a racemic modification) Examples of the substituent groups include the same substituent groups as those at the time when Z, $R_1$, $R_2$, $Y_1$, $Y_2$, $Y_3$ and $Y_4$ described later can further have substituent groups. A hydroxyl group, an ether group, an ester group, a cyano group, an amido group and a sulfonamido group are particularly preferred among others, because the associative properties of the ink are enhanced and the fastness is improved. In addition, a halogen atom or an ionic hydrophilic group may be contained.

As the substituted or unsubstituted aryl group represented by $R_1$, $R_2$ and Z, an aralkyl group having 6 to 30 carbon atoms is preferred. Examples of the substituent groups include the same substituent groups as those at the time when Z, $R_1$, $R_2$, $Y_1$, $Y_2$, $Y_3$ and $Y_4$ described later can further have substituent groups. An electron attractive group is particularly preferred, because the oxidation potential of the dye is made noble and the fastness is improved. The electron attractive groups include a group having a positive Hammett substituent constant σp. Above all, preferred is a halogen atom, a heterocyclic group, a cyano group, a carboxyl group, an acylamino group, a sulfonamido group, a sulfamoyl group, a carbamoyl group, a sulfonyl group, an imido group, an acyl group, a sulfo group or a quaternary ammonium group, and more preferred is a cyano group, a carboxyl group, a sulfamoyl group, a carbamoyl group, a sulfonyl group, an imido group, an acyl group, a sulfo group or a quaternary ammonium group.

As the heterocyclic group represented by $R_1$, $R_2$ and Z, a 5- or 6-membered ring is preferred, and it may be further cyclocondensed. Further, it may be either an aromatic heterocycle or a non-aromatic heterocycle. The heterocyclic groups represented by $R_1$, $R_2$ and Z are exemplified below in the form of heterocycles omitting the substitution positions, but the substitution positions are not limited. For example, pyridine can be substituted at the 2-, 3- and 4-positions. Examples thereof include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperadine, imidazolidine and thiazoline. An aromatic heterocyclic group is preferred among others. When illustrated in the same manner as shown above, preferred examples thereof include pyridine, pyrazine, pyrimidine, pyridazine, triazine, pyrazole, imidazole, benzimidazole, triazole, thiazole, benzothiazole, isothiazole, benzisothiazole and thiadiazole. They may have substituent groups, and examples of the substituent groups include the same substituent groups as those at the time when Z, $R_1$, $R_2$, $Y_1$, $Y_2$, $Y_3$ and $Y_4$ described later can further have substituent groups. The substituent groups are preferably the same as the above-mentioned substituent groups for the aryl group, and more preferably the same as the above-mentioned more preferred substituent groups for the aryl group.

$Y_1$, $Y_2$, $Y_3$ and $Y_4$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxyl group, an aryloxy group, an acylamino group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, a carboxyl group or a sulfo group, which may further have a substituent group.

Above all, preferred are a hydrogen atom, a halogen atom, an alkyl group, an aryl group, a cyano group, an alkoxyl group, an amino group, a ureido group, a sulfonamido group, a carbamoyl group, a sulfamoyl group, an alkoxycarbonyl group, a carboxyl group and a sulfo group, particularly preferred are a hydrogen atom, a halogen atom, a carboxyl group and a sulfo group, and most preferred is a hydrogen atom.

When Z, $R_1$, $R_2$, $Y_1$, $Y_2$, $Y_3$ and $Y_4$ are groups which can further have substituent groups, they may have the following substituent groups.

They include a straight-chain or branched alkyl group having 1 to 12 carbon atoms, a straight-chain or branched aralkyl group having 7 to 18 carbon atoms, a straight-chain or branched alkenyl group having 2 to 12 carbon atoms, a straight-chain or branched alkynyl group having 2 to 12 carbon atoms, a straight-chain or branched cycloalkyl group having 3 to 12 carbon atoms, a straight-chain or branched cycloalkenyl group having 3 to 12 carbon atoms (each group described above preferably has a branched chain for the reason that dye solubility and ink stability are enhanced, and particularly preferably has an asymmetric carbon, for example, a methyl group, an ethyl group, a propyl group, an isopropyl group, a sec-butyl group, a 2-ethylhexyl group, a 2-methylsulfonylethyl group, a 3-phenoxypropyl group, a trifluoromethyl group or a cyclopentyl group), a halogen atom (for example, a chlorine atom or a bromine atom), an aryl group (for example, a phenyl group, a 4-t-butylphenyl group or a 2,4-di-t-amylphenyl group), a heterocyclic group (for example, an imidazolyl group, a pyrazolyl group, a triazolyl group, a 2-furyl group, a 2-thienyl group, a 2-pyrimidinyl group or a 2-benzothiazolyl), a cyano group, a hydroxyl group, a nitro group, a carboxyl group, an amino group, an alkyloxy group (for example, a methoxy group, an ethoxy group, a 2-methoxyethoxy group or a 2-methanesulfonylethoxy group), an aryloxy group (for example, a phenoxy group, a 2-methylphenoxy group, a 4-t-butylphenoxy group, a 3-nitrophenoxy group, a 3-t-butyloxycarbamoylphenoxy group or a-methoxycarbamoyl group), a acylamino group (for example, an acetamido group, a benzamido group or a 4-(3-t-butyl-4-hydroxyphenoxy)butaneamido group), an alkylamino group (for example, a methylamino group, a butylamino group, a diethylamino group or a methylbutylamino group), an anilino group (for example, a phenylamino group or a 2-chloroanilino group), a ureido group (for example, a phenylureido group, a methylureido group or an N,N-dibutylureido group), a sulfamoylamino group (for example, an N,N-dipropylsulfamoylamino group), an alkylthio group (for example, a methylthio group, an octylthio group or 2-phenoxyethylthio group), an arylthio group (for example, a phenylthio group, a 2-butoxy-5-t-octylphenylthio group or a 2-carboxyphenylthio group), an alkyloxycarbonylamino group (for example, a methoxycarbonylamino group), a sulfonamido group (for example, a methanesulfonamido group, a benzenesulfonamido group or a p-toluenesulfonamido group), a carbamoyl group (for example, an N,N-ethylcarbamoyl group or an N,N-dibutylcarbamoyl group), a sulfamoyl group (for example, an N-ethylsulfamoyl group, an N,N-dipropylsulfamoyl group or an N-phenylsulfamoyl group), a sulfonyl group (for example, a methanesulfonyl group, an octanesulfonyl group, a benzenesulfonyl group or a toluenesulfonyl group), an alkyloxycarbonyl group (for example, a methoxycarbonyl group or a butyloxycarbonyl group), a heterocyclic oxy group (for example, a 1-phenyltetrazole-5-oxy group or a 2-tetrahydropyranyloxy group), an azo group (for example, a phenylazo group, a 4-methoxyphenylazo group, a 4-pivaloylaminophenylazo group or a 2-hydroxy-4-propanoylphenylazo group), an acyloxy group (for example, an acetoxy group), a carbamoyloxy group (for example, an N-methylcarbamoyloxy group or an N-phenylcarbamoyloxy group), a silyloxy group (for example, a trimethylsilyloxy group or a dibutylmethylsilyloxy group), an aryloxycarbonylamino group (for example, a phenoxycarbonylamino group), an imido group (for example, an N-succinimido group or an N-phthalimido group), a heterocyclic thio group (for example, a 2-benzothiazolylthio group, a 2,4-diphenoxy-1,3,5-triazole-6-thio group or a 2-pyridylthio group), a sulfinyl group (for example, a 3-phenoxypropylsulfinyl group), a phosphonyl group (for example, a phenoxyphosphonyl group, an octyloxyphosphonyl group or a phenylphosphonyl group), an aryloxycarbonyl group (for example, a phenoxycarbonyl group), an acyl group (for example, an acetyl group, a 3-phenylpropanoyl group or a benzoyl group) and an ionic hydrophilic group (for example, an carboxyl group, a sulfo group, a phosphono group or a quaternary ammonium group).

When the phthalocyanine dye represented by the above-mentioned general formula (C-I) is water-soluble, it is preferred that an ionic hydrophilic group is contained. The ionic hydrophilic groups include a sulfo group, a carboxyl group, a phosphono group and a quaternary ammonium group. As the ionic hydrophilic group, preferred are a carboxyl group, a phosphono group and a sulfo group, and particularly preferred are a carboxyl group and a sulfo group. The carboxyl group, the phosphono group and the sulfo group may be in the salt form, and examples of counter ions for forming the salts include an ammonium ion, an alkali metal ion (for example, a lithium ion, a sodium ion or a potassium ion) and an organic cation (for example, a tetramethylammonium ion, a tetramethylguanidium ion or a tetramethylphosphonium ion). Of the counter ions, the alkali metal ion is preferred, and the lithium ion is particularly preferred, because dye solubility is enhanced and ink stability is improved.

As for the number of the ionic hydrophilic groups, it is preferred that at least two ionic hydrophilic groups are contained in one molecule of the phthalocyanine dye, and it is particularly preferred that at least two sulfo groups and/or carboxyl groups are contained.

$a_1$ to $a_4$ and $b_1$ to $b_4$ represent the substituent group numbers of $X_1$ to $X_4$ and $Y_1$ to $Y_4$, respectively. $a_1$ to $a_4$ each independently represents an integer of 0 to 4, but there is no case that all are 0 at the same time. $b_1$ to $b_4$ each independently represents an integer of 0 to 4. When any one of $a_1$ to $a_4$ and $b_1$ to $b_4$ is an integer of 2 or more, any one of $X_1$ to $X_4$ and $Y_1$ to $Y_4$ exists as plural groups, which may be the same or different.

$a_1$ and $b_1$ satisfy the relationship, $a_1+b_1=4$. Particularly preferred is a combination of $a_1=1$ or 2 and $b_1=3$ or 2, and above all, a combination of $a_1=1$ and $b_1=3$ is most preferred.

In respective combinations of $a_2$ and $b_2$, $a_3$ and $b_3$, and $a_4$ and $b_4$, the relationship therebetween is also the same as that between $a_1$ and $b_1$, and preferred combinations are also the same.

M represents a hydrogen atom, a metal element or an oxide, hydroxide or halide thereof.

In addition to a hydrogen atom, the metal atoms preferred as M include Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi.

Preferred examples of the oxides include VO and GeO. Further, preferred examples of the hydroxides include $Si(OH)_2$, $Cr(OH)_2$ and $Sn(OH)_2$. Furthermore, the halides include AlCl, $SiCl_2$, VCl, $VCl_2$, VOCl, FeCl, GaCl and ZrCl. Above all, Cu, Ni, Zn and Al are preferred, and Cu is most preferred.

Further, Pc's (phthalocyanine rings) may form a dimer (for example, Pc-M-L-M-Pc) or a trimer with the interposition of L (a bivalent connecting group), and at that time, M's may be the same or different.

The bivalent connecting group represented by L is preferably an oxy group —O—, a thio group —S—, a carbonyl group —CO—, a sulfonyl group —SO$_2$—, an imino group —NH—, a methylene group —CH$_2$— or a group formed by combining them.

As for a preferred combination of substituent groups of the compound represented by the above-mentioned general formula (C-I), the compound in which at least one of various substituent groups is the above-mentioned preferred group is preferred, the compound in which more various substituent groups are the above-mentioned preferred groups is more preferred, and the compound in which all substituent groups are the above-mentioned preferred groups is most preferred.

Of the phthalocyanine dyes represented by the above-mentioned general formula (C-I), a phthalocyanine dye represented by the following general formula (C-II) is more preferred. The phthalocyanine dye of the invention represented by general formula (C-II) will be described in detail below.

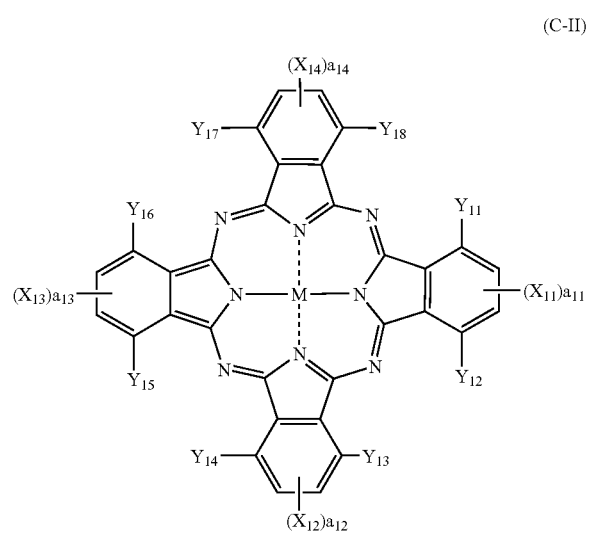

(C-II)

wherein $X_{11}$ to $X_{14}$ and $Y_{11}$ to $Y_{18}$ have the same meanings as given for $X_1$ to $X_4$ and $Y_1$ to $Y_4$, and preferred examples thereof are also the same. $M_1$ has the same meaning as given for M in general formula (C-I), and preferred examples thereof are also the same.

In general formula (C-II), $a_{11}$ to $a_{14}$ are each independently an integer of 1 or 2, and preferably, $a_{11}+a_{12}+a_{13}+a_{14}$ is from 4 to 6. Particularly preferably, $a_{11}$, $a_{12}$, $a_{13}$ and $a_{14}$ are each 1.

$X_{11}$, $X_{12}$, $X_{13}$ and $X_{14}$ may be either the completely same substituent group, or substituent groups of the same kind but partially different from one another, for example, $X_{11}$, $X_{12}$, $X_{13}$ and $X_{14}$ which are all —SO$_2$-Z, but different in each Z. Further, they may be groups different from one another, for example, —SO$_2$-Z and —SO$_2$NR$_1$R$_2$.

In the phthalocyanine dyes represented by general formula (C-II), preferred combinations of the substituent groups are as follows.

$X_{11}$ to $X_{14}$ each independently represents preferably —SO-Z, —SO$_2$-Z, —SO$_2$NR$_1$R$_2$ or —CONR$_1$R$_2$, particularly preferably —SO$_2$-Z or —SO$_2$NR$_1$R$_2$, and most preferably —SO$_2$-Z.

It is preferred that Z each independently represents a substituted or unsubstituted alkyl group, a substituted or unsubstituted aryl group, or a substituted or unsubstituted heterocyclic group. Of these, most preferred is a substituted alkyl group, a substituted aryl group or a substituted heterocyclic group. In particular, for the reason that dye solubility and ink stability are enhanced, it is particularly preferred that an asymmetric carbon is contained in the substituent group (the use as a racemic modification). Further, for the reason that the associative properties are enhanced and the fastness is improved, it is preferred that a hydroxyl group, an ether group, an ester group, a cyano group, an amido group or a sulfonamido group is contained in the substituent group.

It is preferred that R$_1$ and R$_2$ each independently represents a hydrogen atom, a substituted or unsubstituted alkyl group, a substituted or unsubstituted aryl group, or a substituted or unsubstituted heterocyclic group. Of these, most preferred is a hydrogen atom, a substituted alkyl group, a substituted aryl group or a substituted heterocyclic group. However, it is unfavorable that R$_1$ and R$_2$ are both hydrogen atoms. In particular, for the reason that dye solubility and ink stability are enhanced, it is particularly preferred that an asymmetric carbon is contained in the substituent group (the use as a racemic modification). Further, for the reason that the associative properties are enhanced and the fastness is improved, it is preferred that a hydroxyl group, an ether group, an ester group, a cyano group, an amido group or a sulfonamido group is contained in the substituent group.

$Y_{11}$ to $Y_{18}$ each independently represents a hydrogen atom, a halogen atom, an alkyl group, an aryl group, a cyano group, an alkoxyl group, an amido group, a ureido group, a sulfonamido group, a carbamoyl group, a sulfamoyl group, an alkoxycarbonyl group, a carboxyl group or a sulfo group. Particularly preferred is a hydrogen atom, a halogen atom, a cyano group, a carboxyl group or a sulfo group, and most preferred is a hydrogen atom.

It is preferred that $a_{11}$ to $a_{14}$ are each independently 1 or 2, and it is particularly preferred that all are 1. $M_1$ represents a hydrogen atom, a metal atom or an oxide, hydroxide or halide thereof. In particular, Cu, Ni, Zn or Al is preferred, and Cu is particularly preferred among others.

When the phthalocyanine dye represented by the above-mentioned general formula (C-II) is water-soluble, it is preferred that an ionic hydrophilic group is contained. The ionic hydrophilic groups include a sulfo group, a carboxyl group, a phosphono group and a quaternary ammonium group. As the ionic hydrophilic group, preferred are a carboxyl group, a phosphono group and a sulfo group, and particularly preferred are a carboxyl group and a sulfo group. The carboxyl group, the phosphono group and the sulfo group may be in the salt form, and examples of counter ions for forming the salts include an ammonium ion, an alkali metal ion (for example, a lithium ion, a sodium ion or a potassium ion) and an organic cation (for example, a tetramethylammonium ion, a tetramethylguanidium ion or a tetramethylphosphonium ion). Of the counter ions, the alkali metal ion is preferred, and the lithium ion is particularly preferred, because dye solubility is enhanced and ink stability is improved.

As for the number of the ionic hydrophilic groups, it is preferred that at least two ionic hydrophilic groups are contained in one molecule of the phthalocyanine dye, and it is particularly preferred that at least two sulfo groups and/or carboxyl groups are contained.

As for a preferred combination of substituent groups of the compound represented by the above-mentioned general formula (C-II), the compound in which at least one of various substituent groups is the above-mentioned preferred group is preferred, the compound in which more various substituent groups are the above-mentioned preferred groups is more preferred, and the compound in which all substituent groups are the above-mentioned preferred groups is most preferred.

As a chemical structure of the phthalocyanine dye of the invention, at least one electron attractive group such as a sulfinyl group, a sulfonyl group or a sulfamoyl group is preferably introduced into each of the four benzene rings of phthalocyanine so that the σp values of the substituent groups of the whole phthalocyanine skeleton amount to 1.6 or more in total.

The Hammett substituent constant σp will be described to some extent. Hammett's rule is an empirical rule propounded by L. P. Hammett in 1935 in order to quantitatively deal with the influence of a substituent group on the reaction and equilibrium of a benzene derivative, and the validity thereof has today been widely recognized. As the substituent constants determined in Hammett's rule, there are the σp value and the σm value. These constants are described in detail, for example, in *Lange's Handbook of Chemistry*, the 12th edition, edited by J. A. Dean, 1979 (McGraw-Hill) and Kagaku no Ryoiki (Journal of Japanese Chemistry), an extra issue, 122, 96–103 (1979), Nankodo, although they can be found in many general literatures.

The phthalocyanine derivative represented by the above-mentioned general formula (C-I) is generally a mixture of analogues in which substituent groups Xn (n=1 to 4) and Ym (m=1 to 4) are inevitably introduced to be different in position and number according to its synthesis method. Accordingly, the general formula is expressed by statistically averaging the mixture of these analogues in many cases. In the invention, when the analogue mixtures are classified into the following three types, it has been discovered that specific mixtures are particularly preferred. That is to say, the mixtures of the phthalocyanine dye analogues represented by the above-mentioned general formulas (C-I) and (C-II) are classified into the following three types and defined, based on substitution positions.

(1) β-Position substitution type: phthalocyanine dyes having specific substituent groups at the 2- and/or 3-position, the 6- and/or 7-position, the 10- and/or 11-position, or the 14- and/or 15-position;

(2) α-Position substitution type: phthalocyanine dyes having specific substituent groups at the 1- and/or 4-position, the 5- and/or 8-position, the 9- and/or 12-position, or the 13- and/or 16-position; and (3) α,β-Position mixed substitution type: phthalocyanine dyes having specific substituent groups at the 1- to 16 positions without regularity.

In this specification, phthalocyanine dye derivatives different in structure (particularly different in substitution positions) are described, the above-mentioned β-position substitution type, α-position substitution type and α,β-position mixed substitution type are used.

The phthalocyanine derivatives used in the invention can be synthesized, for example, by methods described or cited in Shirai and Kobayashi, *Phthalocyanine Chemistry and Functions*, pages 1 to 62, IPC, and C. C. Leznoff and A. B. P. Lever, *Phthalocyanines-Properties and Applications*, pages 1 to 54, VCH, or by combinations of methods similar thereto.

The phthalocyanine compound of the invention represented by general formula (C-I) can be synthesized, for example, through sulfonation, sulfonylchloridation and amidation of an unsubstituted phthalocyanine compound, as described in WO 00/17275, WO 00/08103, WO 00/08101, WO 98/41853 and JP-A-10-36471. In this case, the sulfonation can occur at any position of a phthalocyanine nucleus, and moreover, it is difficult to control the number of groups introduced by the sulfonation. Accordingly, when sulfo groups are introduced under such reaction conditions, the positions and number of the sulfo groups introduced into a product can not be specified, so that a mixture of compounds in which the substituent groups are different in number and position is invariably given. Accordingly, when the compound of the invention is synthesized using it as a raw material, the number and substitution positions of heterocyclic substituted sulfamoyl groups can not be specified, so that the compound of the invention is obtained as an α,β-position mixed substitution type mixture containing some kinds of compounds in which the substituent groups are different in number and position.

As described above, when the electron attractive groups such as sulfamoyl groups are introduced in larger numbers into the phthalocyanine nucleus, the oxidation potential becomes nobler to enhance ozone resistance. According to the above-mentioned synthesis methods, the inclusion of a phthalocyanine dye into which the electron attractive groups are introduced in smaller numbers, that is to say, in which the oxidation potential is baser, is unavoidable. Accordingly, in order to improve ozone resistance, it is more preferable to use such a synthesis method that the formation of a compound baser in oxidation potential is inhibited.

The phthalocyanine compound represented by general formula (C-II) of the invention can be obtained by reacting, for example, a phthalonitrile derivative (compound P) and/or a diiminoisoindoline (compound Q) represented by the following formulas with a metal derivative represented by general formula (III), or can be derived from a tetrasulfophthalocyanine compound obtained by reacting a 4-sulfophthalonitrile derivative (compound R) represented by the following formula with the metal derivative represented by general formula (III).

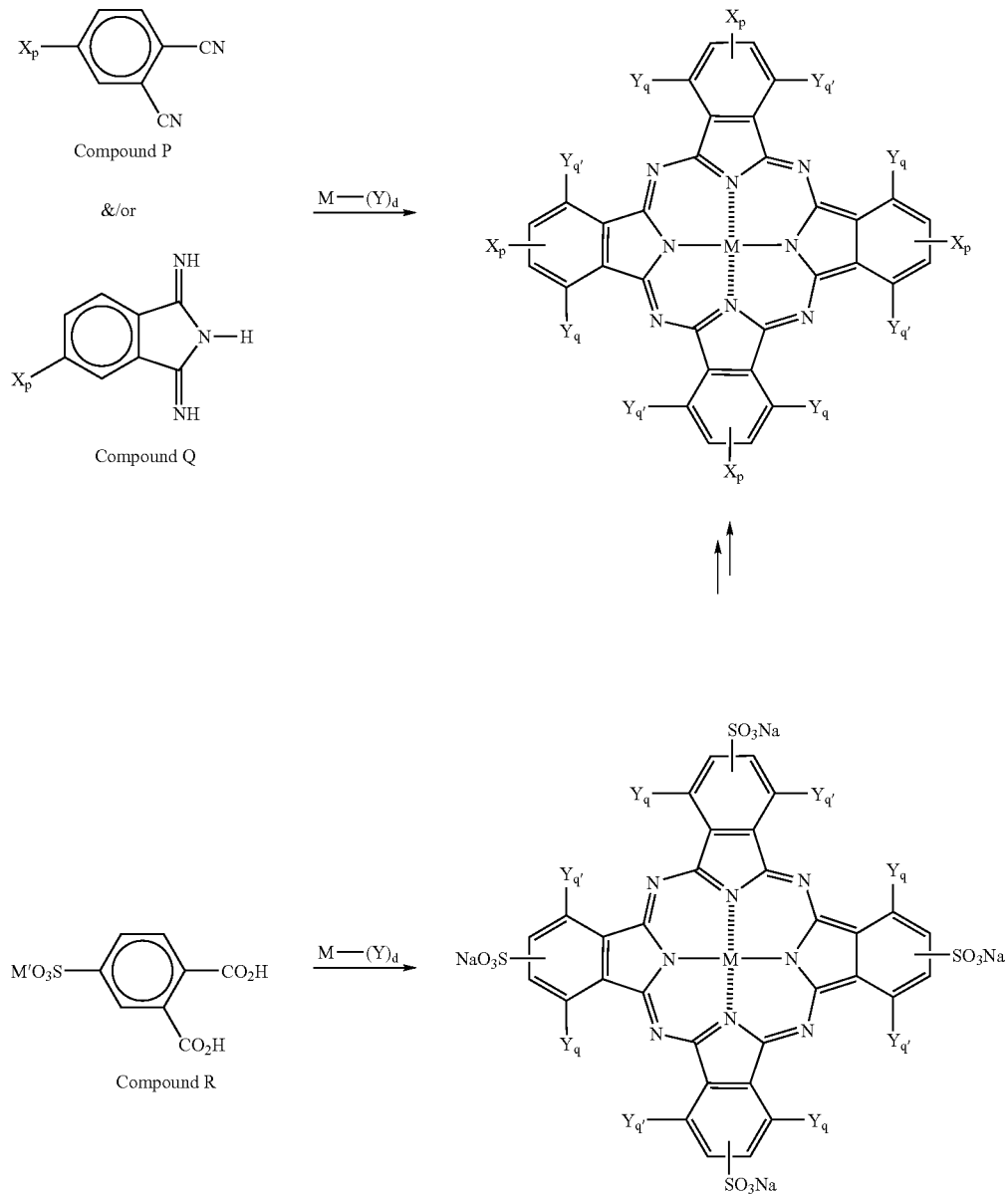

In the above-mentioned respective formulas, Xp corresponds to $X_{11}$, $X_{12}$, $X_{13}$ or $X_{14}$ in the above-mentioned general formula (C-II). Further, Yq and Yq' each corresponds to $Y_{11}$, $Y_{12}$, $Y_{13}$, $Y_{14}$, $Y_{15}$, $Y_{16}$, $Y_{17}$ or $Y_{18}$ in the above-mentioned general formula (C-II). In compound R, M' represents a cation.

The cations represented by M' include an alkali metal ion such as Li, Na or K, and an organic cation such as a triethylammonium ion or a pyridinium ion.

M-(Y)d              General formula (III):

In general formula (III), M has the same meaning as M1 given for the above-mentioned general formula (C-II), Y represents a univalent or bivalent ligand such as a halogen atom, an acetic acid anion, acetylacetonato or oxygen, and d is an integer of 1 to 4.

That is to say, according to the above-mentioned synthesis method, a specific number of desired substituent groups can be introduced. In particular, when the electron attractive groups are desired to be introduced in large numbers for making the oxidation potential noble as in the invention, the above-mentioned synthesis method is extremely excellent, compared to the methods which have already described for synthesizing the phthalocyanine compound of general formula (C-I).

The thus obtained phthalocyanine compound represented by the above-mentioned general formula (C-II) is generally a mixture of compounds represented by the following general formulas (a)-1 to (a)-4, or isomers in respective positions of Xp, that is to say, the β-position substitution type.

(a)-1

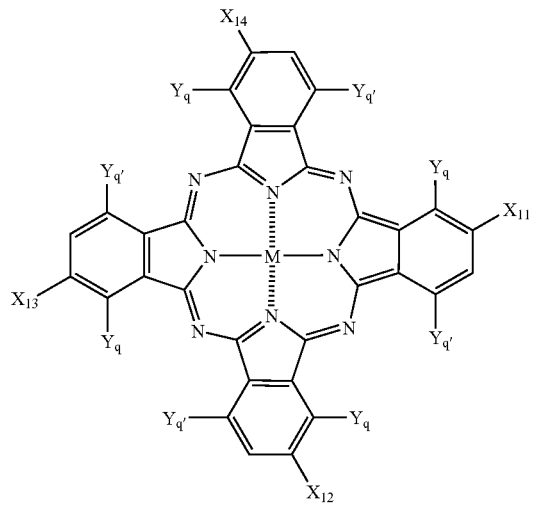

(a)-2

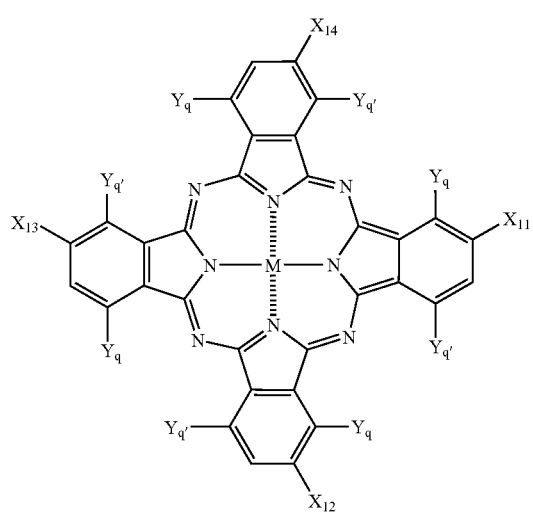

(a)-3

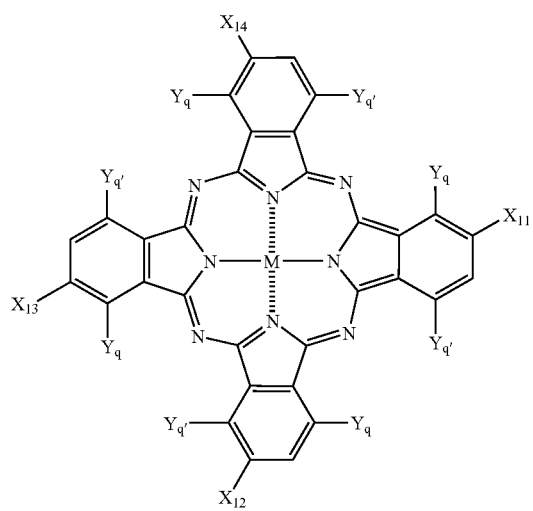

-continued (a)-4

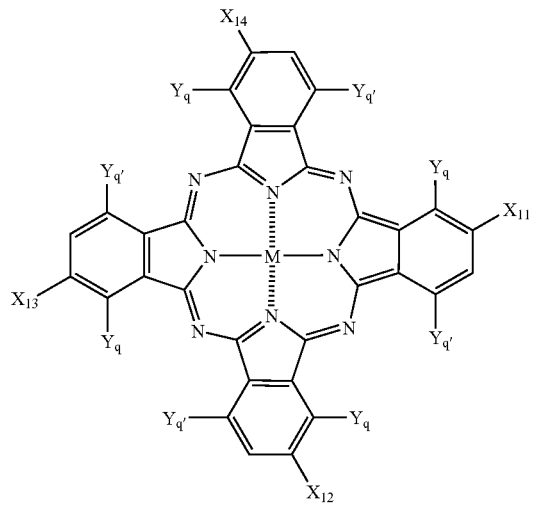

In the above-mentioned synthesis method, the use of compounds in which Xp's are all completely the same can provide a β-position substitution type phthalocyanine dye in which $X_{11}$, $X_{12}$, $X_{13}$ and $X_{14}$ are completely the same substituent group. On the other hand, the combined use of compounds different in Xp can synthesize a dye having substituent groups of the same kind but partially different from one another, or a dye having different kinds of substituent groups. Of the dyes of general formula (C-II), these dyes having electron attractive substituent groups different from one another are particularly preferred, because dye solubility, associative properties and ink stability with time can be adjusted.

In the invention, it has been discovered that an oxidation potential of nobler than 1.0 V (vs. SCE) in any substitution type is very important for improvement in fastness, and the magnitude of the effect thereof has been unexpectable from the above-mentioned prior art at all. Although the cause thereof is unknown in detail, there has obviously been a tendency of the β-position substitution type to be more excellent in hues, light fastness and ozone gas resistance than the α,β-position mixed substitution type.

Specific examples of the phthalocyanine dyes represented by the above-mentioned general formulas (C-I) and (C-II) (exemplified compounds I-1 to I-12 and 101 to 190) are shown below, but the phthalocyanine dyes used in the invention are not limited to the following exemplified compounds:

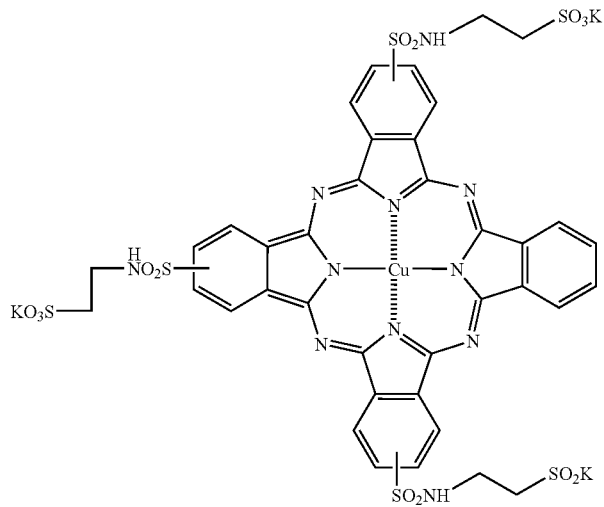
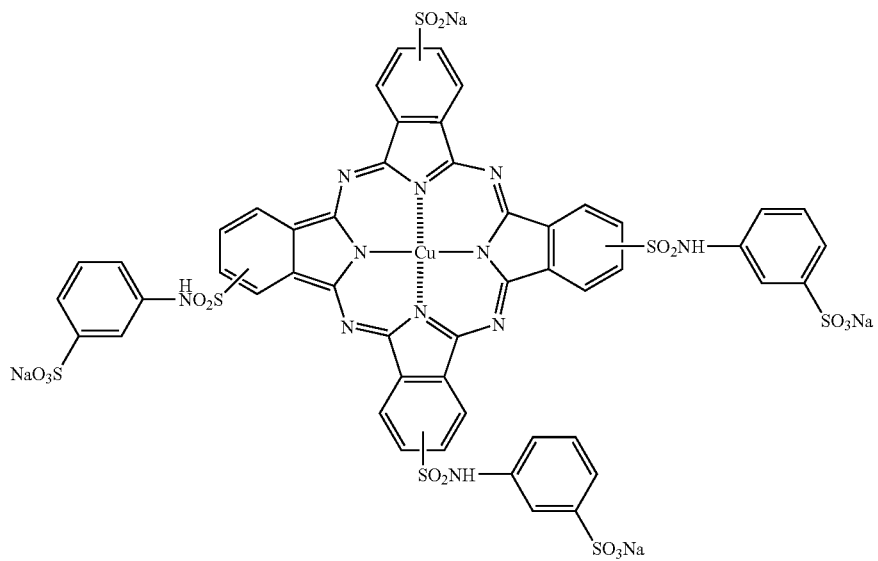
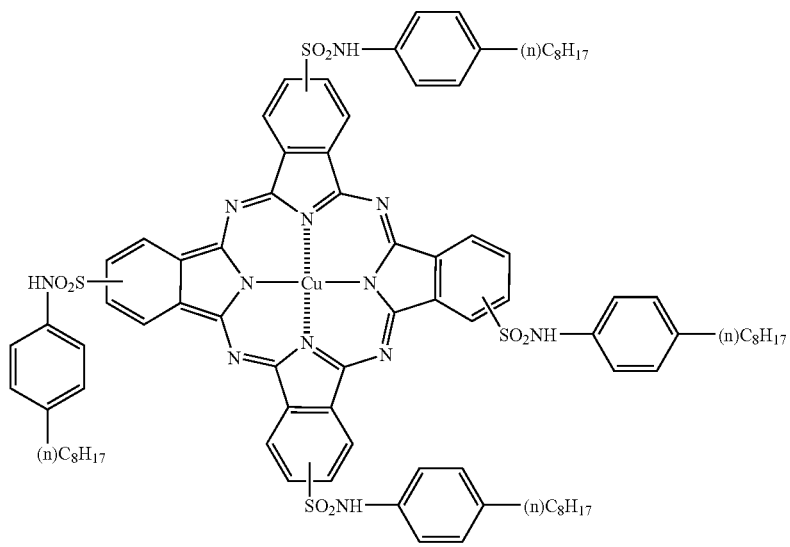

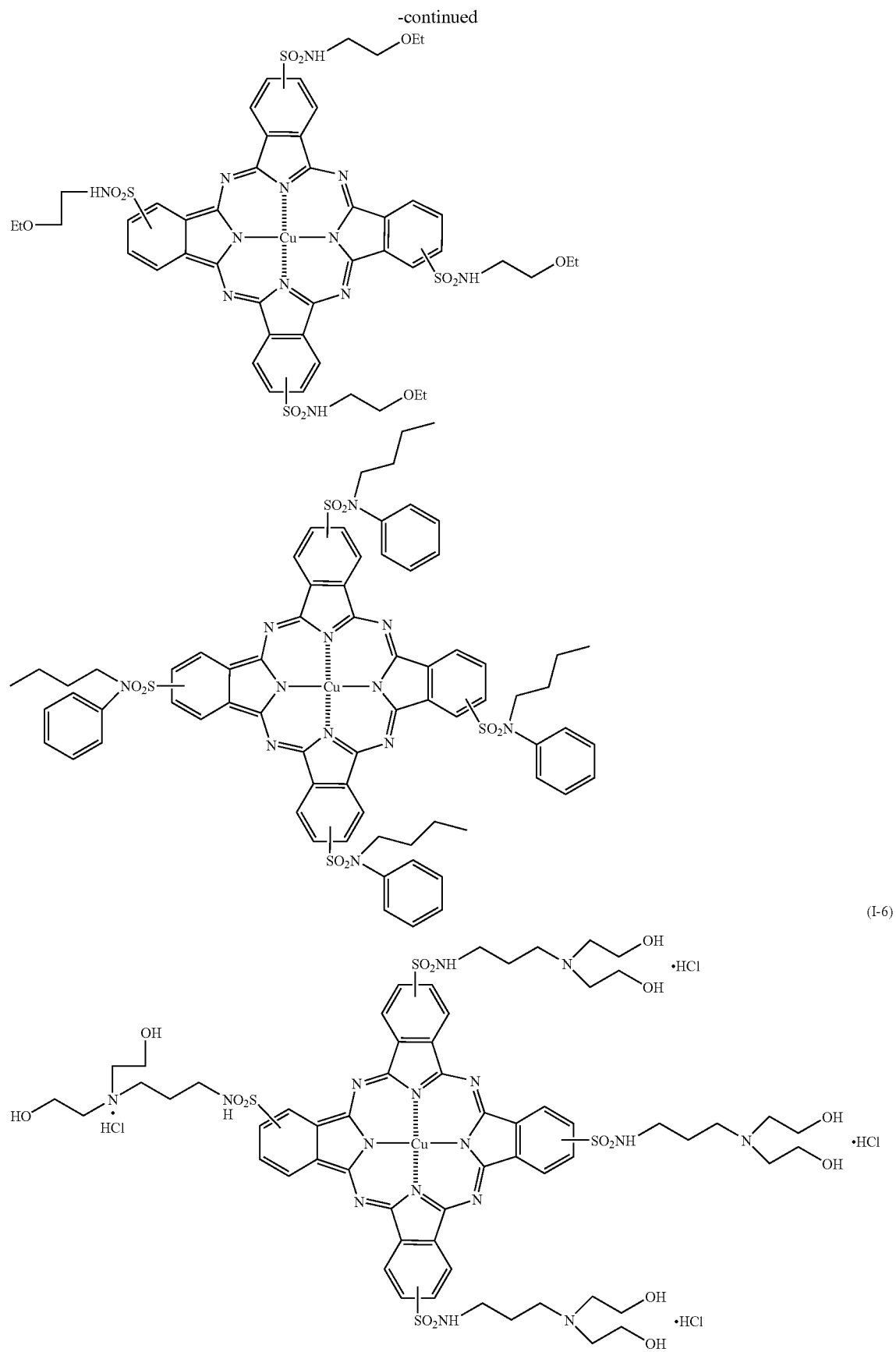

-continued
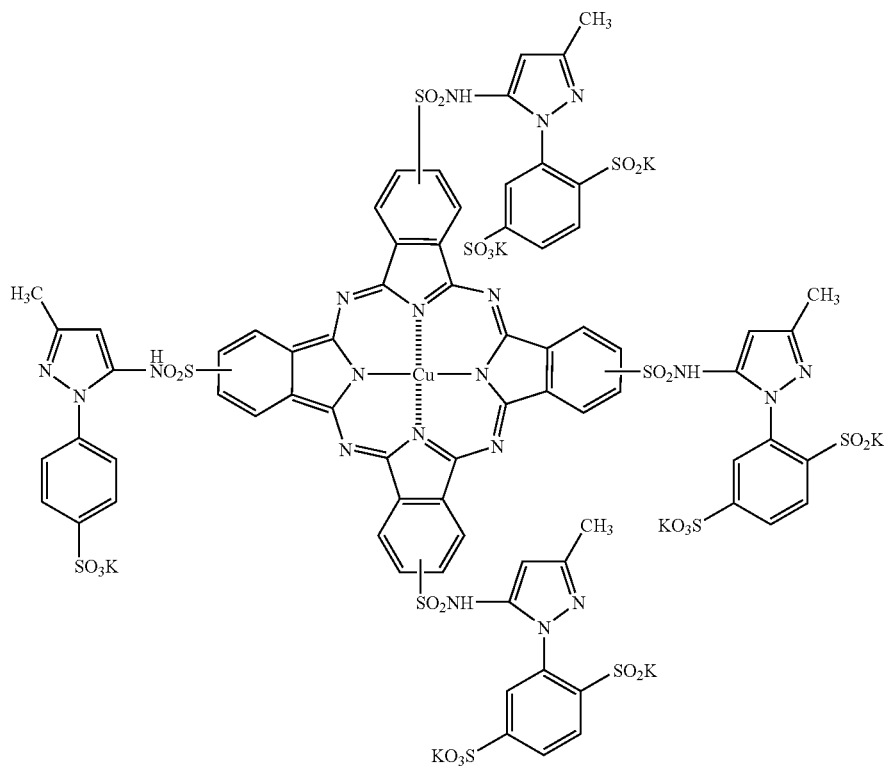
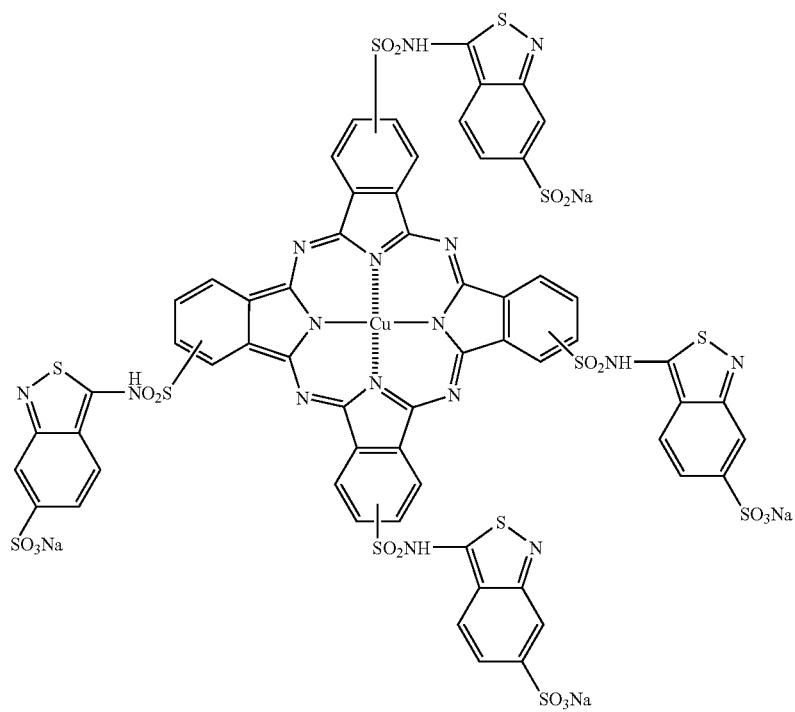

-continued
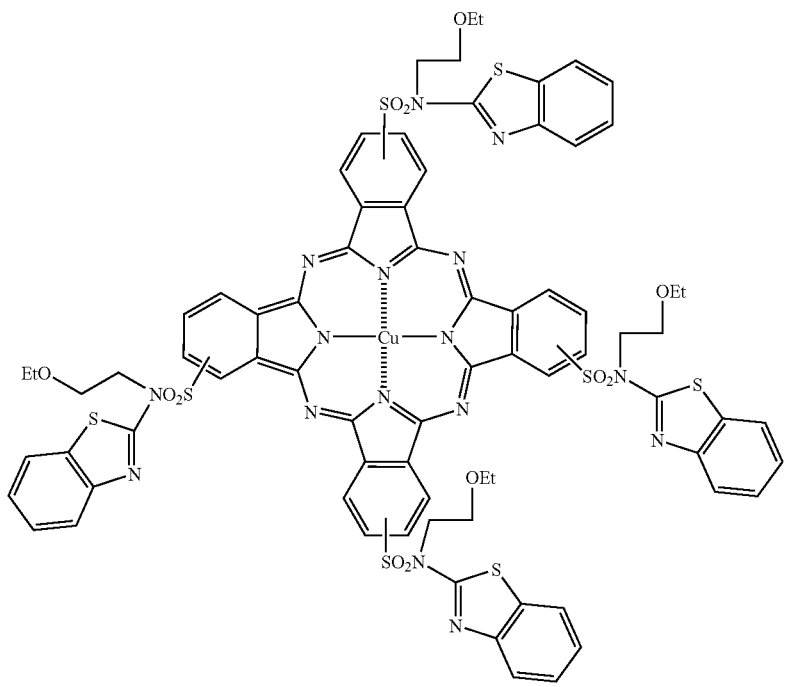
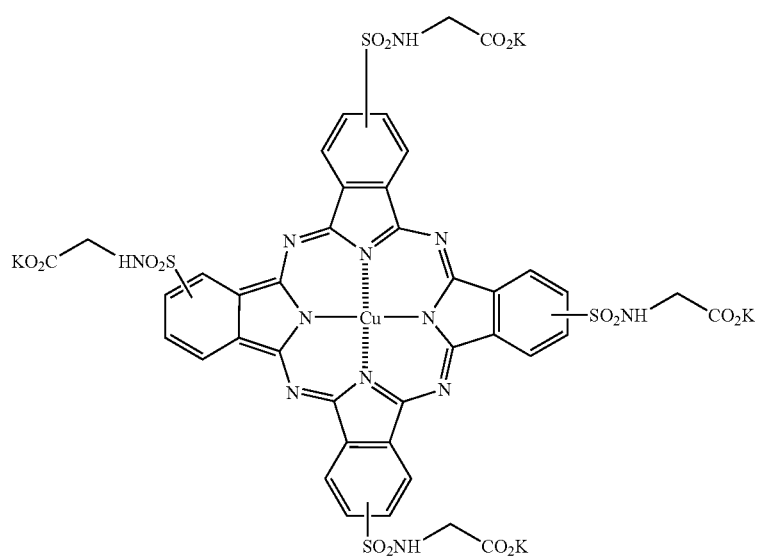

-continued
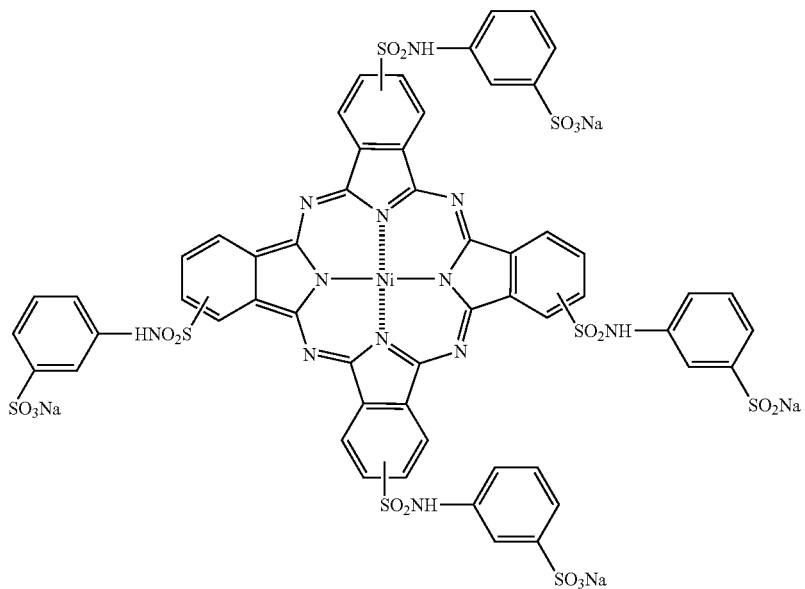
(I-12)
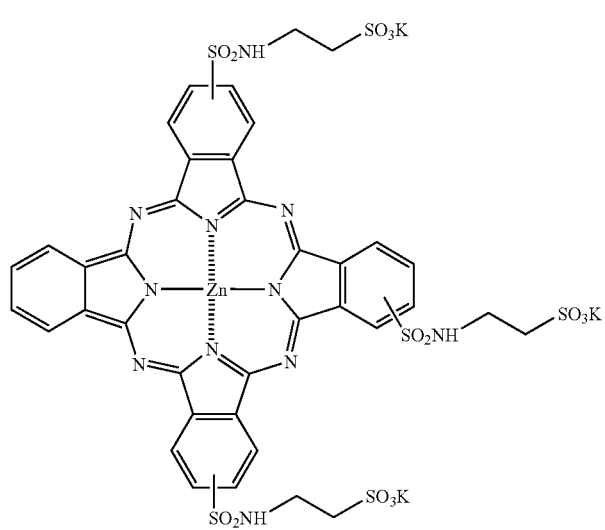
In the following tables, specific examples of respective pairs of $(X_1, X_2)$, $(Y_{11}, Y_{12})$, $(Y_{13}, Y_{14})$, $(Y_{15}, Y_{16})$ and $(Y_{17}, Y_{18})$ each independently has no special order.

TABLE 20

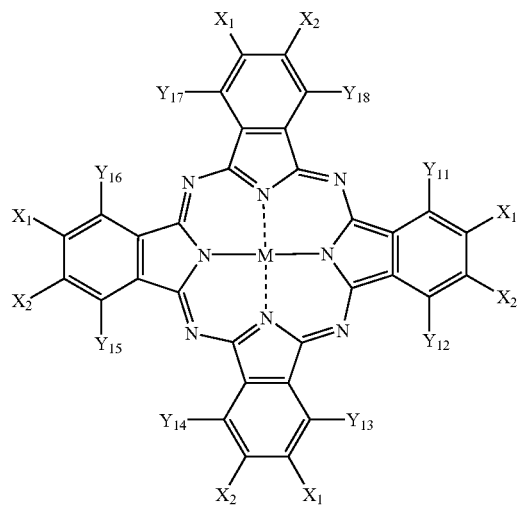

| No. | M | X$_1$ | X$_2$ | Y$_{11}$, Y$_{12}$ | Y$_{13}$, Y$_{14}$ | Y$_{15}$, Y$_{16}$ | Y$_{17}$, Y$_{18}$ |
|---|---|---|---|---|---|---|---|
| 101 | Cu | —SO$_2$—NH—CH$_2$—CH$_2$—SO$_2$Li | —H | —H, —H | —H, —H | —H, —H | —H, —H |
| 102 | Cu | —SO$_2$—NH—CH$_2$—CH(OH)—CO—NH—CH$_2$CH$_2$—SO$_3$Na | —H | —Cl, —H | —Cl, —H | —Cl, —H | —Cl, —H |
| 103 | Cu | —SO$_2$—NH—CH$_2$—CH$_2$—CH$_2$—SO$_2$NH—CH$_2$CH(OH)—SO$_3$Li | —H | —H, —H | —H, —H | —H, —H | —H, —H |
| 104 | Cu | —SO$_2$—NH—C$_6$H$_4$—SO$_2$NH—CH$_2$CH$_2$—SO$_3$Li | —H | —H, —H | —H, —H | —H, —H | —H, —H |
| 105 | Ni | —SO$_2$—NH—CH$_2$—CH$_2$—CO—NH—CH(CH$_2$COONa)—COONa | —H | —Cl, —H | —Cl, —H | —Cl, —H | —Cl, —H |
| 106 | Cu | —SO$_2$—NH—CH$_2$—CH$_2$—SO$_2$—NH—CH$_2$—COONa | —CN | —H, —H | —H, —H | —H, —H | —H, —H |
| 107 | Cu | —SO$_2$—CH$_2$—CH$_2$—CH$_2$—SO$_2$—NH—CH(CH$_2$OH)—COOLi | —H | —H, —H | —H, —H | —H, —H | —H, —H |
| 108 | Cu | —SO$_2$—CH$_2$—CH$_2$—CH$_2$—SO$_3$Li | —H | —H, —H | —H, —H | —H, —H | —H, —H |
| 109 | Cu | —SO$_2$—CH$_2$—CH$_2$—CH$_2$—SO$_3$K | —H | —H, —H | —H, —H | —H, —H | —H, —H |
| 110 | Cu | —SO$_2$—(CH$_2$)$_5$—SO$_2$K | —H | —H, —H | —H, —H | —H, —H | —H, —H |

TABLE 21
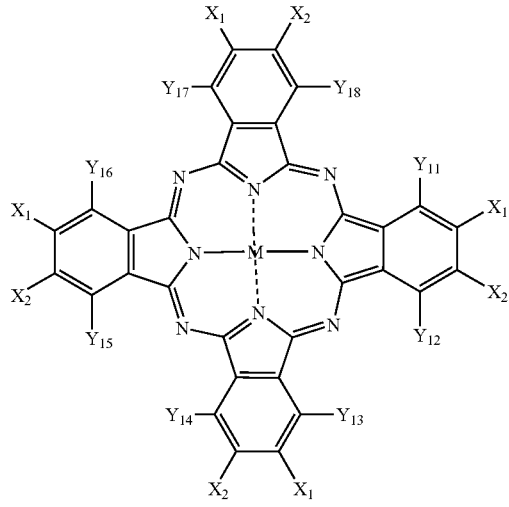
| No. | M | X₁ | X₂ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 111 | Cu | —SO₂—NH—CH₂—CH₂—CH₂—SO₂—NH—CH₂—CH(OH)—CH₂—SO₃Li | —H | —H, —H | —H, —H | —H, —H | —H, —H |
| 112 | Cu | —SO₂—NH—CH₂—CH₂—CH₂—SO₂NH—CH₂—CH(OH)—CH₃ | —SO₃Li | —H, —H | —H, —H | —H, —H | —H, —H |
| 113 | Cu | —SO₂—CH₂—CH(OH)—CH₂SO₃K | —H | —H, —H | —H, —H | —H, —H | —H, —H |
| 114 | Cu | —SO₂—CH₂—CH(OH)—CH₃ | —SO₃Li | —H, —H | —H, —H | —H, —H | —H, —H |
| 115 | Cu | —SO₂NH(CH₂)₃N⁺(CH₃)(CH₂CH₂OH)₂·CH₃-C₆H₄-SO₃⁻ | —H | —H, —H | —H, —H | —H, —H | —H, —H |
| 116 | Cu | —CO—NH—CH₂—CH(OH)—CH₂SO₃K | —H | —H, —H | —H, —H | —H, —H | —H, —H |
| 117 | Cu | —CO—NH—CH(COOLi)—CH₂CH₂SO₃Li | —H | —H, —H | —H, —H | —H, —H | —H, —H |

TABLE 22

[Structure: phthalocyanine with metal M, substituents $X_1$, $X_2$ and $Y_{11}$–$Y_{18}$]

| No. | M | $X_1$ | $X_2$ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 118 | Cu | —SO$_2$CH$_2$CH$_2$CH(CH$_3$)SO$_3$Li | —H | —H, —H | —H, —H | —H, —H | —H, —H |
| 119 | Cu | —SO$_2$—CH$_2$—CH(OH)—CH$_2$—SO$_3$Na | —H | —H, —H | —H, —H | —H, —H | —H, —H |
| 120 | Cu | —SO$_2$—CH$_2$—CH$_2$—CH(CH$_3$)—COOLi | —H | —H, —H | —H, —H | —H, —H | —H, —H |
| 121 | Cu | —SO$_2$(CH$_2$)$_3$SO$_2$NHCH$_2$—CH(OH)—CH$_2$—SO$_3$Li | —H | —H, —H | —H, —H | —H, —H | —H, —H |
| 122 | Cu | —CO$_2$CH$_2$CH$_2$CH$_2$SO$_2$—NH—CH$_2$—CH(OH)—CH$_2$—SO$_3$Li | —H | —H, —H | —H, —H | —H, —H | —H, —H |
| 123 | Cu | —SO$_2$NH—C$_8$H$_{17}$(t) | —H | —H, —H | —H, —H | —H, —H | —H, —H |
| 124 | Cu | —SO$_2$—NH—CH$_2$—CH(CH$_2$CH$_3$)—CH$_2$CHCH$_2$—CH$_3$ | —H | —H, —H | —H, —H | —H, —H | —H, —H |

TABLE 23
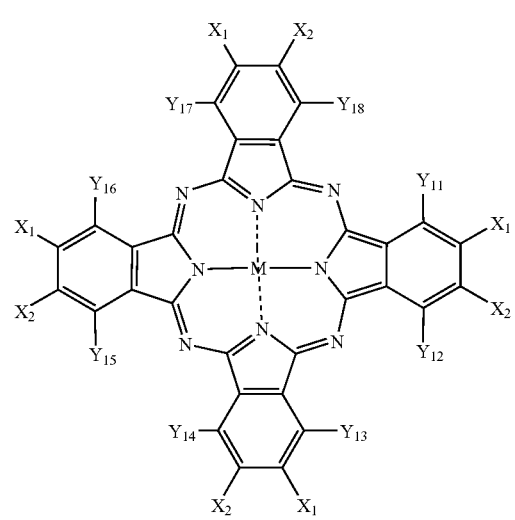
| No. | M | X₁ | X₂ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 125 | Cu | —SO₂CH₂CH₂CH₂SO₂—NH—CH₂—CH(CH₃)—CH₂—CH₃ | —H | —H, —H | —H, —H | —H, —H | —H, —H |
| 126 | Cu | —SO₂—CH₂—CH₂—CH₂—CO₂—CH(CH₃)—CH₂—O—CH₃ | —H | —H, —H | —H, —H | —H, —H | —H, —H |
| 127 | Cu | —SO₂CH₂CH₂CH₂SO₂NHCH₂CH₂CH₂O—CH(CH₃)₂ | —H | —H, —H | —H, —H | —H, —H | —H, —H |
| 128 | Cu | —SO₂—CH₂—CH(O—CH₃)—CH₂—O—CH₂ | —CN | —H, —H | —H, —H | —H, —H | —H, —H |
| 129 | Cu | —CO—NH—CH₂—CH(CH₂CH₃)—CH₂—CH₂—CH₂CH₃ | —H | —Cl, —H | —Cl, —H | —Cl, —H | —Cl, —H |
| 130 | Cu | —CO—CH(CH₃)—CH₂—O—C₄H₉(t) | —H | —H, —H | —H, —H | —H, —H | —H, —H |
| 131 | Cu | —SO₂—CH₂—CH₂—CH(CH₃)—SO₂—NH—C₆H₃(SO₃Li)₂ | —H | —H, —H | —H, —H | —H, —H | —H, —H |

TABLE 24
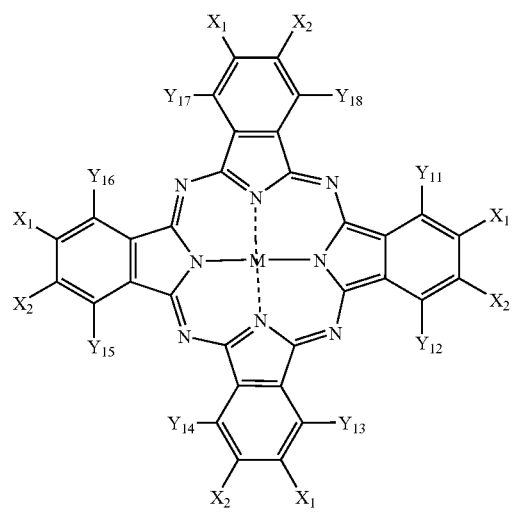
| No. | M | $X_1$ | $X_2$ | $Y_{11}$, $Y_{12}$ | $Y_{13}$, $Y_{14}$ | $Y_{15}$, $Y_{16}$ | $Y_{17}$, $Y_{18}$ |
|---|---|---|---|---|---|---|---|
| 132 | Cu | —SO₂NH—C₆H₃(CO₂C₆H₁₃(n))₂ (3,5-di(n-hexyloxycarbonyl)phenylsulfonamide) | —H | —H, —H | —H, —H | —H, —H | —H, —H |
| 133 | Cu | —SO₂NH—C₆H₃(OCH₂CH₂OCH₃)(SO₂NHCH₂CH(C₂C₅)(C₄H₉)) | —H | —H, —H | —H, —H | —H, —H | —H, —H |
| 134 | Cu | —SO₂NH—C₆H₄—SO₂—NH—CH₂—CH(CH₂CH₃)—CH₂CH₂—CH₂—CH₃ | —H | —H, —H | —H, —H | —H, —H | —H, —H |
| 135 | Cu | —SO₂—C₆H₄—CO₂Na | —H | —H, —H | —H, —H | —H, —H | —H, —H |
| 136 | Cu | —SO₂N(C₄H₉(n))(C₆H₅) | —H | —H, —H | —H, —H | —H, —H | —H, —H |

TABLE 25
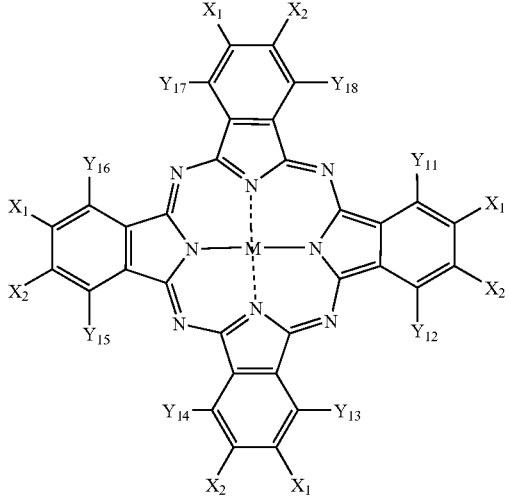
| No. | M | X₁ | X₂ | $Y_{11}$, $Y_{12}$ | $Y_{13}$, $Y_{14}$ | $Y_{15}$, $Y_{16}$ | $Y_{17}$, $Y_{18}$ |
|---|---|---|---|---|---|---|---|
| 137 | Cu | 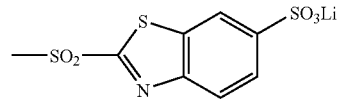 | —H | —H, —H | —H, —H | —H, —H | —H, —H |
| 138 | Cu | 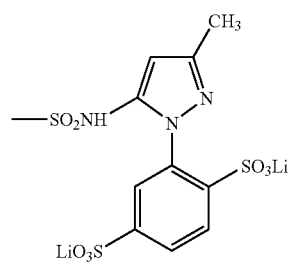 | —H | —H, —H | —H, —H | —H, —H | —H, —H |
| 139 | Cu | 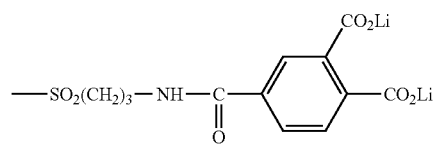 | —Cl | —H, —H | —H, —H | —H, —H | —H, —H |
| 140 | Cu | 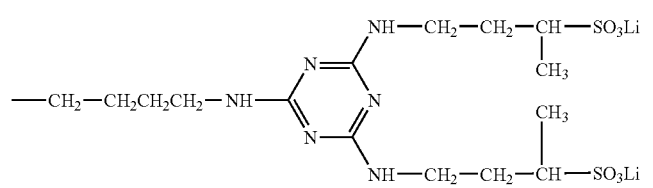 | —H | —H, —H | —H, —H | —H, —H | —H, —H |

TABLE 26

[Structure: Metal phthalocyanine with substituents X₁, X₂ on benzene rings and Y₁₁–Y₁₈ positions, central metal M]

| No. | M | $X_1$ | $X_2$ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 141 | Cu | —SO₂NH—CH(COONa)—CH₂—CO—N—(CH₂CH₂OH)₂ | —H | —H, —H | —H, —H | —H, —H | —H, —H |
| 142 | Cu | —SO₂NH—(C₆H₄)—NHC(O)—(C₆H₄)—SO₃Li (m,m' substituted) | —H | —H, —H | —H, —H | —H, —H | —H, —H |
| 143 | Cu | —CO—NH—CH₂—CH(OH)—CO—NH—CH(COOK)—CH₂CH₂—SO₃K | —H | —H, —H | —H, —H | —H, —H | —H, —H |
| 144 | Cu | —SO₂—CH₂CH₂CH₂—NH—CO—(C₆H₄)—CO—NH—CH(COOLi)—CH₂—COOLi | —H | —H, —H | —H, —H | —H, —H | —H, —H |
| 145 | Cu | —SO₂CH₂CH₂OCH₂CH₂OCH₂CH₂SO₃Li | —H | —H, —H | —H, —H | —H, —H | —H, —H |

As for the order of introduction positions of respective substituent groups (Xp₁) and (Xp₂) in the β-position substitution type in the following tables, no special order is observed.

TABLE 27

M-Pc(Xp₁)ₘ(Xp₂)ₙ

| No. | M | $Xp_1$ | m | $Xp_1$ | n |
|---|---|---|---|---|---|
| 146 | Cu | —SO₂—NH—CH₂—CH(CH₃)—SO₃Li | 3 | —SO₂—NH—CH₂—CH(OH)—CH₃ | 1 |
| 147 | Cu | —SO₂—NH—CH₂—CH₂SO₃Li | 3 | —SO₂—NH—CH₂—CH₂—CH₂—SO₂—NH—CH₂—CH(OH)—CH₃ | 1 |
| 148 | Cu | —SO₂—NH—CH₂—CH(CH₃)—SO₃Li | 3 | —SO₂NH—CH₂—CH₂—CH₂—SO₂—NH—CH₂—CH₂—O—CH₂—CH₂—OH | 1 |

TABLE 27-continued

| | | | M-Pc(Xp₁)ₘ(Xpₜ)ₙ | | |
|---|---|---|---|---|---|
| No. | M | Xp₁ | m | Xp₁ | n |
| 149 | Cu | —SO₂—NH—CH₂—CH(CH₃)—SO₃Li | 2 | —SO₂—NH—CH₂—CH₂—CH₂—CO—N—(CH₂—CH₂—OH)₂ | 2 |
| 150 | Cu | —SO₂—NH—CH₂—CH₂—SO₂—NH—CH₂CH₂—COONa | 3 | —SO₂NH—CH(CH₃)—CH₂OH | 1 |
| 151 | Cu | —SO₂—NH—C₆H₄—SO₂NH—CH₂—CH(OH)—SO₃Li | 3 | —SO₂NH—CH₂—CH₂—O—CH₂—CH₂—OH | 1 |
| 152 | Cu | —SO₂—CH₂—CH₂—CH(CH₃)—SO₃Li | 2.5 | —SO₂—CH₂—CH₂—O—CH₂—CH₂—OH | 1.5 |
| 153 | Cu | —SO₂—CH₂—CH₂—CH(CH₃)—SO₃Na | 2 | —SO₂—CH₂—CH₂—CH₂—CO—N—(CH₂—CH₂—OH)₂ | 2 |
| 154 | Cu | —SO₂—CH₂—CH₂—CH₂—SO₃Li | 3 | —SO₂—CH₂—CH₂—CH₂—SO₂—NH—CH₂—CH(OH)—CH₃ | 1 |
| 155 | Cu | —SO₂—CH₂—CH₂—CH₂—COOK | 2 | —SO₂—CH₂—CH₂—CH₂—SO₂—NH—CH₂—CH(OH)—CH₂—COOK | 2 |
| 156 | Cu | —SO₂—CH₂—CH₂—CH₂—SO₃Li | 3 | —SO₂—CH₂—CH(OH)—CH₂—SO₃Li | 1 |
| 157 | Cu | —SO₂—CH₂—CH₂—O—CH₂—CH₂—SO₃Li | 2 | —SO₂—CH₂—CH₂—CH₂—CO₂—CH₂—CH₂—CH(OH)—CH₂—COOK | 2 |

TABLE 28

| | | | M-Pc(Xp₁)ₘ(Xpₜ)ₙ | | |
|---|---|---|---|---|---|
| No. | M | Xp₁ | m | Xp₁ | n |
| 158 | Cu | —SO₂—CH₂—CH(OH)—CH₂SO₃Li | 3 | —SO₂—CH₂—C₆H₄—SO₂NH—CH₂—CH(OH)—CH₂—OH | 1 |
| 159 | Cu | —SO₂NHCH₂CH₂—SO₃Li | 3 | —SO₂—CH₂—CH₂—CH₂—SO₂—NH—CH₂—CH(OH)—CH₃ | 1 |
| 160 | Cu | —SO₂—CH₂—CH₂—O—CH₂—CH₂—O—CH₂—CH₂—SO₃Na | 3 | —SO₂—CH₂—CH₂—CH₂—CO—NH—CH(CH₂—CH₂—COONa)—CH₂—COONa | 1 |
| 161 | Cu | —SO₂CH₂CH₂CH₂SO₃Li | 3 | —SO₂CH₂CH₂CH₂SO₂NHCH₂—CH(OH)—CH₂SO₃Li | 1 |
| 162 | Cu | —SO₂CH₂CH₂CH₂SO₃Li | 2 | —SO₂CH₂CH₂OCH₂CH₂OCH₂CH₂OH | 2 |

TABLE 28-continued

| No. | M | $Xp_1$ | m | $Xp_1$ | n |
|-----|---|--------|---|--------|---|
| | | | | M-Pc$(Xp_1)_m(Xp_t)_n$ | |
| 163 | Cu | —SO$_2$CH$_2$CH$_2$CH$_2$SO$_3$K | 3 | —SO$_2$CH$_2$CH$_2$CH$_2$SO$_2$NH—CH(CH$_3$)—CH$_2$—OH | 1 |
| 164 | Cu | —SO$_2$CH$_2$CH$_2$CH$_2$SO$_3$Li | 2 | —SO$_2$CH$_2$CH$_2$CH$_2$SO$_2$N(CH$_2$CH$_2$OH)$_2$ | 2 |
| 165 | Cu | —CO—NH—CH$_2$—CH$_2$—SO$_3$K | 3 | —CO—NH—CH$_2$CH$_2$—O—CH$_2$—CH$_2$—OH | 1 |
| 166 | Cu | —CO—NH—CH$_2$—CH$_2$—SO$_2$—NH—CH$_2$—CH$_2$—COONa | 3 | —CO—NH—CH$_2$—CH(OH)—CH$_3$ | 1 |
| 167 | Cu | —SO$_2$(CH$_2$)$_3$SO$_2$NHCH$_2$—CH(OH)—CH$_2$CO$_2$Li | 2.5 | —CO—NH—CH$_2$—CH$_2$—CH$_2$—CO—N(CH$_2$—CH$_2$—OH)$_2$ | 1.5 |
| 168 | Cu | —CO$_2$—CH$_2$—CH$_2$—CH(CH$_3$)—SO$_3$Na | 2 | —CO—CH$_2$—CH$_2$—CH$_2$—CO—N(CH$_2$—CH$_2$—OH)$_2$ | 2 |
| 169 | Cu | —CO$_2$—CH$_2$—CH$_2$—CH$_2$—SO$_3$Li | 3 | —CH$_2$—CH$_2$—CH$_2$—SO$_2$—NH—CH$_2$—CH(OH)—CH$_3$ | 1 |
| 170 | Cu | —CO$_2$CH$_2$—CH$_2$—CH$_2$COOK | 2 | —CO$_2$—CH$_2$—CH$_2$—CH$_2$—SO$_2$—NH—CH$_2$—CH(OH)—CH$_2$—COOK | 2 |

TABLE 29

| No. | M | $Xp_1$ | m | $Xp_1$ | n |
|-----|---|--------|---|--------|---|
| | | | | M-Pc$(Xp_1)_m(Xp_t)_n$ | |
| 171 | Cu | —CO$_2$—CH$_2$—CH$_2$—O—CH$_2$—CH$_2$—O—CH$_2$—CH$_2$—SO$_3$Na | 3 | —SO$_2$—CH$_2$—C$_6$H$_4$—SO$_2$NH—CH$_2$—CH(OH)—CH$_2$—OH | 1 |
| 172 | Cu | —SO$_2$CH$_2$CH$_2$OCH$_2$CH$_2$O—CH$_2$CH$_2$SO$_3$K | 2 | —CO$_2$—CH$_2$—CH$_2$—CH$_2$—CO$_2$—CH$_2$—CH$_2$—CH$_2$—CH(OH)—CH$_2$—COOK | 2 |
| 173 | Cu | —SO$_2$(CH$_2$)$_3$SO$_2$NHCH$_2$CH(OH)CH$_2$OH | 2 | —CO$_2$—CH$_2$—CH(OH)—CH$_2$—CH$_2$—SO$_3$Li | 2 |
| 174 | Cu | —SO$_2$(CH$_2$)$_3$SO$_2$NHCH$_2$—CH(OH)—CH$_2$SO$_3$K | 3 | —CO$_2$—CH$_2$—CH$_2$—CH$_2$—SO$_2$—NH—CH$_2$—CH(OH)—CH$_3$ | 1 |
| 175 | Cu | —SO$_2$(CH$_2$)$_3$SO$_2$NH(CH$_2$)$_3$N(CH$_2$CH$_2$OH)$_3$ | 2 | —CO$_2$—CH$_2$—CH$_2$—CH$_2$—CO—N(CH$_2$—CH$_2$—COOLi)(CH$_2$—COOLi) | 2 |
| 176 | Cu | —SO$_2$—CH$_2$—CH$_2$—CH$_2$—SO$_2$—NH—CH$_2$—CH(OH)—CH$_3$ | 3 | —SO$_2$—CH$_2$—CH$_2$—CH$_2$—SO$_2$—NH—CH$_2$—CH(CH$_2$CH$_3$)—CH$_2$CH$_2$—CH$_3$ | 1 |

TABLE 29-continued $M\text{-}Pc(Xp_1)_m(Xp_t)_n$

| No. | M | $Xp_1$ | m | $Xp_1$ | n |
|---|---|---|---|---|---|
| 177 | Cu | $-SO_2-CH_2-CH_2-O-CH_2-CH_2-O-CH_2$ | 2 | $-SO_2-CH_2-CH_2-CH_2-NH-CH_2-CH(OH)-CH_3$ | 1 |
| 178 | Cu | $-SO_2-CH_2-CH_2-O-CH_2-CH_2-O-CH_2-CH_2-OH$ | 3 | $-SO_2-CH_2-CH_2-CH_2-CO_2-CH_2-CH(CH_2CH_3)-CH_2CH_2-CH_2CH_3$ | 1 |
| 179 | Cu | $-SO_2-CH_2-CH(CH_2CH_3)-CH_2CH_2-CH_2CH_3$ | 2 | $-SO_2-CH_2-CH_2-CH_2-SO_2-NH-CH_2-CH(O-CH_3)-CH_3$ | 2 |
| 180 | Cu | $-SO_2-CH_2-CH_2-CH_2-SO_2-NH-CH_2-CH(O-CH_3)-CH_3$ | 3 | $-SO_2NH-CH_2-CH_2-SO_2NH-CH_2-CH_2-O-CH_2-CH_2-OH$ | 1 |
| 181 | Cu | $-SO_2-CH_2-CH_2-CH_2-CO_2-NH-CH(CH_3)-CH_2-CH_3$ | 3 | $-SO_2-CH_2-CH_2-CH_2-SO_2-NH-CH-(CH_3)_2$ | 1 |
| 182 | Cu | $-SO_2-CH_2-CH_2-CH_2-SO_2NH-CH_2-CH(OH)-CH_3$ | 2.5 | $-CO_2-CH_2-CH(OH)-CH_2-SO_3Li$ | 1.5 |

TABLE 30

$M\text{-}Pc(Xp_1)_m(Xp_t)_n$

| No. | M | $Xp_1$ | m | $Xp_1$ | n |
|---|---|---|---|---|---|
| 183 | Cu | $-CO_2-CH_2-CH(OH)-CH_2-SO_3Li$ | 2 | $-SO_2-CH_2-CH_2-CH_2-SO_2-NH-(CH_2)_3-CH_2-O-CH_2CH_2-OH$ | 2 |
| 184 | Cu | $-SO_2-CH_2-CH_2-CH_2-SO_2-NH-CH_2-CH(OH)-CH_3$ | 3 | $-SO_2CH_2-CH_2-O-CH_2-CH_2-O-CH_3$ | 1 |
| 185 | Cu | $-SO_2-CH_2-CH_2-CH_2-SO_2-NH-CH_2-CH(OH)-CH_3$ | 3 | $-SO_2CH_2-CH_2-O-CH_2-CH_2-O-CH_2-CH_2-O-CH_3$ | 1 |
| 186 | Cu | $-CO_2-CH_2-CH(OH)-CH_2-SO_3Li$ | 3 | $-SO_2CH_2-CH_2-O-CH_2-CH_2-O-CH_2-CH_2-OH$ | 1 |
| 187 | Cu | $-SO_2-CH_2-CH_2-CH_2-SO_2-NH-CH-(CH_3)_2$ | 3 | $-CO_2-CH_2-CH(CH_2CH_3)-CH_2-CH_2-CH_2CH_3$ | 1 |
| 188 | Cu | $-CO_2-CH_2-CH(OH)-CH_2-SO_3Li$ | 3 | $-CO_2-CH_2-CH_2-O-CH_2-CH_2-O-CH_3$ | 1 |
| 189 | Cu | $-CO-NH-CH_2-CH_2-SO_2-NH-CH-(CH_3)_2$ | 3 | $-SO_2-NH-CH_2-CH(CH_2CH_3)-CH_2-CH_2-CH_2-CH_3$ | 1 |
| 190 | Cu | $-CO-NH-CH_2-CH(CH_2CH_3)-CH_2-CH_2-CH_2CH_3$ | 3 | $-CO-NH-CH_2-CH_2-O-CH_2-CH_2-O-CH_3$ | 1 |

The structure of the phthalocyanine compound represented by M-Pc(Xp$_1$)$_m$(Xp$_2$)$_n$ in Tables 27 to 30 is as follows:

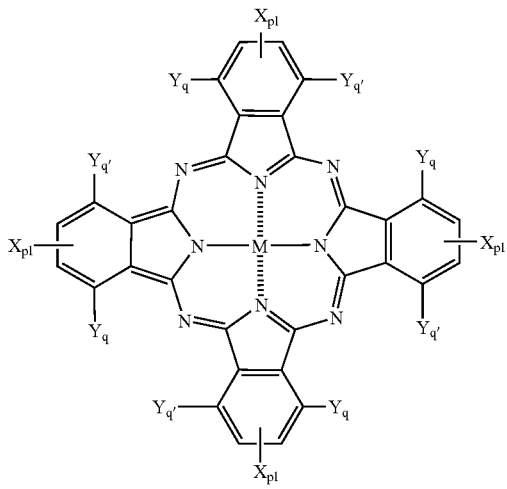

(each independently X$_{p1}$=X$_{p1}$ or X$_{p2}$)

The phthalocyanine dye represented by the above-mentioned general formula (C-I) can be synthesized according to methods described in the above-mentioned patents. Further, the phthalocyanine dye represented by the above-mentioned general formula (C-II) can be synthesized by methods described in JP-A-2001-226275, JP-A-2001-96610, JP-A-2001-47013 and JP-A-2001-193638, as well as the synthesis methods described above. However, starting materials, dye intermediates and synthesis routes should not be construed as being limited thereto.

The ink composition for ink jet recording of the invention contains the above-mentioned phthalocyanine dye preferably in an amount of 0.2 to 20% by weight, and more preferably in an amount of 0.5 to 15% by weight.

The phthalocyanine dye used in the invention is substantially water-soluble. The term "substantially water-soluble" means that the dye is soluble in water at 20° C. in an amount of 2% by weight or more.

Further, in the ink composition for ink jet recording of the invention, another cyan dye can be used in combination with the above-mentioned phthalocyanine dye.

The cyan dyes usable in combination with the phthalocyanine dye include, for example, an azomethine dye such as an indoaniline dye or a indophenol dye; a polymethine dye such as a cyanine dye, an oxonol dye or a merocyanine dye; a carbonium dye such as a diphenylmethane dye, a triphenylmethane dye or a xanthene dye; a phthalocyanine dye other than the dye represented by general formula (C-I) of the invention; an anthraquinone dye; an arylazo or heterylazo dye having, for example, a phenol, a naphthol or an aniline as a coupling component; and an indigo/thioindigo dye. These dyes may be ones showing a cyan color only after chromophores partly dissociate. In that case, counter cations may be either inorganic cations such as alkali metals and ammonium, or organic cations such as pyridinium and quaternary ammonium salts. Further, the counter cations may also be polymer cations having those as partial structures.

<Yellow Inks>

In the invention, the coloring agent represented by the above-mentioned general formula (Y-I) is preferably contained as a yellow ink.

In general formula (Y-I), A$^{11}$ and B$^{11}$ each independently represents a heterocyclic group which may be substituted. However, the dye represented by general formula (Y-I) has at least one ionic hydrophilic group in its molecule.

The dye represented by general formula (Y-I) has the feature that both light fastness and hues are good. Of the dyes represented by general formula (Y-I), particularly, an yellow dye shows a sharp shape in a peak of an absorption spectrum. Of the dyes represented by general formula (Y-I), the yellow dye is preferred, and further, a yellow dye is more preferred in which λmax of an absorption spectrum of an aqueous solution is from 390 nm to 470 nm, and the ratio of the absorbance I(λmax+70) of λmax+70 (nm) to the absorbance I(λmax) of λmax (nm) (I(λmax+70)/I(λmax)) is 0.2 or less, and more preferably 0.1 or less.

In the above-mentioned general formula (Y-1), A$^{11}$ and B$^{11}$ each independently represents a heterocyclic group which may be substituted. The substituent groups of the heterocyclic groups include an ionic hydrophilic group. The heterocyclic group is preferably a heterocyclic group composed of a 5- or 6-membered ring, and may have either a monocyclic structure or a polycyclic structure in which two or more rings are condensed. Further, as the heterocyclic group, a heterocyclic group containing at least any one of N, O and S atoms is preferred.

In the above-mentioned general formula (Y-I), as the heterocycle represented by A$^{11}$, preferred is 5-pyrazolone, pyrazole, oxazolone, isoxazolone, barbituric acid, pyridone, rhodanine, pyrazolidinedione, pyrazolopyridone, Meldrum's acid or a complex heterocycle in which an aromatic hydrocarbon ring or a heterocycle is further cyclocondensed. Above all, 5-pyrazolone, 5-aminopyrazole, pyridone and pyrazoloazole are preferred, and 5-aminopyrazole, 2-hydroxy-6-pyridone and pyrazolotriazole are particularly preferred.

The heterocycles represented by B$^{11}$ include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, isoxazole, benzoxazole, thiazole, benzothiazole, isothiazole, benzisothiazole, thiadiazole, benzisoxazole, pyrrolidine, piperidine, piperadine, imidazolidine and thiazoline. Above all, pyridine, quinoline, thiophene, benzothiophene, pyrazole, imidazole, benzimidazole, triazole, oxazole, isoxazole, benzoxazole, thiazole, benzothiazole, isothiazole, benzisothiazole, thiadiazole and benzisoxazole are preferred, quinoline, thiophene, pyrazole, thiazole, benzoxazole, benzisothiazole, isothiazole, imidazole, benzothiazole and thiadiazole are more preferred, and pyrazole, benzoxazole, imidazole, 1,2,4-thiadiazole and 1,3,4-thiadiazole are particularly preferred.

Examples of the substituent groups substituted on A$^{11}$ and B$^{11}$ include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxyl group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, alkyl- and arylsulfonylamino groups, a mercapto group, an alkylthio group, an arylthio group, a heterocyclic thio group, a sulfamoyl group, alkyl- and arylsulfinyl groups, alkyl- and arylsulfonyl groups, an acyl group, an aryloxycarbamoyl group, an alkoxycarbonyl group, a carbamoyl group, an imido group, a phosphino group, a phosphinyl group, a phosphinyloxy group, a phosphinylamino group and a silyl group.

The dye represented by the above-mentioned general formula (Y-I) contains at least one ionic hydrophilic group in its molecule, so that solubility or dispersibility in an aqueous medium is good. The ionic hydrophilic groups include a sulfo group, a carboxyl group, a phosphono group and a quaternary ammonium salt. Above all, a sulfo group and a carboxyl group are preferred, and a sulfo group is particularly preferred. Further, the above-mentioned dye may contain two or more ionic hydrophilic groups in its molecule. When two or more ionic hydrophilic groups are contained, a combination of a carboxyl group and a sulfo group is preferred. The above-mentioned carboxyl group and sulfo group may be in the salt form, and examples of counter ions for forming the salts include an alkali metal ion (for example, a lithium ion, a sodium ion or a potassium ion) and an organic cation (for example, a tetramethylammonium ion, a tetramethylguanidium ion or a tetramethylphosphonium ion).

Of the dyes represented by the above-mentioned general formula (Y-I), dyes represented by the following general formulas (Y-II), (Y-III) and (Y-IV) are preferred because of their better hue and light fastness.

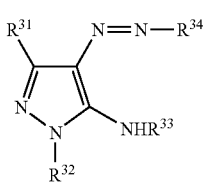

(Y-II)

wherein $R^{31}$, $R^{32}$ and $R^{33}$ each independently represents a hydrogen atom, a halogen atom, a cyano group, an alkyl group, a cycloalkyl group, an aralkyl group, an aryl group, an alkylthio group, an arylthio group or an ionic hydrophilic group, and $R^{34}$ represents a heterocyclic group, with the proviso that the dye represented by general formula (Y-II) has at least one ionic hydrophilic group in its molecule.

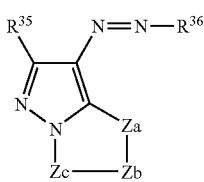

(Y-III)

wherein $R^{35}$ represents a hydrogen atom, a cyano group, an alkyl group, a cycloalkyl group, an aralkyl group, an aryl group, an alkylthio group, an arylthio group or an ionic hydrophilic group, Za represents —N=, —NH— or —C($R^{41}$)=, Zb and Zc each independently represents —N= or —C($R^{41}$)=, $R^{41}$ represents a hydrogen atom or a non-metallic substituent group, and $R^{36}$ represents a heterocyclic group, with the proviso that the dye represented by general formula (Y-III) has at least one ionic hydrophilic group in its molecule.

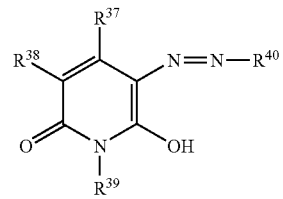

(Y-IV)

wherein $R^{37}$ and $R^{39}$ each independently represents a hydrogen atom, a cyano group, an alkyl group, a cycloalkyl group, an aralkyl group, an aryl group, an alkylthio group, an arylthio group or an ionic hydrophilic group, $R^{38}$ represents a hydrogen atom, a halogen atom, an alkyl group, an alkoxyl group, an aryl group, an aryloxy group, a cyano group, an acylamino group, a sulfonylamino group, an alkoxycarbonylamino group, a ureido group, an alkylthio group, an arylthio group, an alkoxycarbonyl group, a carbamoyl group, a sulfamoyl group, a sulfonyl group, an acyl group, an alkylamino group, an arylamino group, a hydroxyl group or an ionic hydrophilic group, and $R^{40}$ represents a heterocyclic group, with the proviso that the dye represented by general formula (Y-IV) has at least one ionic hydrophilic group in its molecule.

In the above-mentioned general formulas (Y-II), (Y-III) and (Y-IV), $R^{31}$, $R^{32}$, $R^{33}$, $R^{35}$, $R^{37}$ and $R^{39}$ each independently represents a hydrogen atom, a halogen atom, a cyano group, an alkyl group, a cycloalkyl group, an aralkyl group, an aryl group, an alkylthio group, an arylthio group or an ionic hydrophilic group.

The alkyl group represented by $R^3$, $R^{32}$, $R^{33}$, $R^{35}$, $R^{37}$ and $R^{39}$ includes substituted and unsubstituted alkyl groups. As the alkyl group, an alkyl group having 1 to 12 carbon atoms is preferred. Examples of the substituent groups include a hydroxyl group, an alkoxyl group, a cyano group, a halogen atom and an ionic hydrophilic group. Examples of the alkyl groups include methyl, ethyl, butyl, isopropyl, t-butyl, hydroxyethyl, methoxyethyl, cyanoethyl, trifluoromethyl, 3-sulfopropyl and 4-sulfobutyl.

The cycloalkyl group represented by $R^{31}$, $R^{32}$, $R^{33}$, $R^{35}$, $R^{37}$ and $R^{39}$ includes substituted and unsubstituted cycloalkyl groups. As the cycloalkyl group, a cycloalkyl group having 5 to 12 carbon atoms is preferred. Examples of the substituent groups include an ionic hydrophilic group. Examples of the cycloalkyl groups include cyclohexyl.

The aralkyl group represented by $R^{31}$, $R^{32}$, $R^{33}$, $R^{35}$, $R^{37}$ and $R^{39}$ includes substituted and unsubstituted aralkyl groups. As the aralkyl group, an aralkyl group having 7 to 12 carbon atoms is preferred. Examples of the substituent groups include an ionic hydrophilic group. Examples of the aralkyl groups include benzyl and 2-phenetyl.

The aryl group represented by $R^{31}$, $R^{32}$, $R^{33}$, $R^{35}$, $R^{37}$ and $R^{39}$ includes substituted and unsubstituted aryl groups. As the aryl group, an aryl group having 7 to 12 carbon atoms is preferred. Examples of the substituent groups include an alkyl group, an alkoxyl group, a halogen atom, an alkylamino group and an ionic hydrophilic group. Examples of the aryl groups include phenyl, p-tolyl, p-methoxyphenyl, o-chlorophenyl and m-(3-sulfopropylamino)phenyl.

The alkylthio group represented by $R^{31}$, $R^{32}$, $R^{33}$, $R^{35}$, $R^{37}$ and $R^{39}$ includes substituted and unsubstituted alkylthio groups. As the alkylthio group, an alkylthio group having 1 to 12 carbon atoms is preferred. Examples of the substituent groups include an ionic hydrophilic group. Examples of the alkylthio groups include methylthio and ethylthio.

The arylthio group represented by $R^{31}$, $R^{32}$, $R^{33}$, $R^{35}$, $R^{37}$ and $R^{39}$ includes substituted and unsubstituted arylthio groups. As the arylthio group, an arylthio group having 6 to 12 carbon atoms is preferred. Examples of the substituent groups include an alkyl group and an ionic hydrophilic group. Examples of the arylthio groups include phenylthio and p-tolylthio.

The ionic hydrophilic group represented by $R^{31}$, $R^{32}$, $R^{33}$, $R^{35}$, $R^{37}$ and $R^{39}$ includes a sulfo group, a carboxyl group and a quaternary ammonium salt. Above all, a sulfo group and a carboxyl group are preferred, and a sulfo group is particularly preferred. The above-mentioned carboxyl group and sulfo group may be in the salt form, and examples of counter ions for forming the salts include an alkali metal ion (for example, a sodium ion or a potassium ion) and an organic cation (for example, a tetramethylguanidium ion).

In the above-mentioned general formula (Y-IV), $R^{38}$ represents a hydrogen atom, a halogen atom, an alkyl group, an alkoxyl group, an aryl group, an aryloxy group, a cyano group, an acylamino group, a sulfonylamino group, an alkoxycarbonylamino group, a ureido group, an alkylthio group, an arylthio group, an alkoxycarbonyl group, a carbamoyl group, a sulfamoyl group, a sulfonyl group, an acyl group, an alkylamino group, an arylamino group, a hydroxyl group or an ionic hydrophilic group.

The halogen atom represented by $R^{38}$ includes a fluorine atom, a chlorine atom and a bromine atom.

The alkyl group represented by $R^{38}$ includes substituted and unsubstituted alkyl groups. The alkyl group is preferably an alkyl group having 1 to 12 carbon atoms. Examples of the substituent groups include a hydroxyl group, an alkoxyl group, a cyano group, a halogen atom and an ionic hydrophilic group. Examples of the alkyl groups include methyl, ethyl, butyl, isopropyl, t-butyl, hydroxyethyl, methoxyethyl, cyanoethyl, trifluoromethyl, 3-sulfopropyl and 4-sulfobutyl.

The alkoxyl group represented by $R^{38}$ includes substituted and unsubstituted alkoxyl groups. As the alkoxyl group, an alkoxyl group having 1 to 12 carbon atoms is preferred. Examples of the substituent groups include a hydroxyl group and an ionic hydrophilic group. Examples of the alkoxyl groups include methoxy, ethoxy, isopropoxy, methoxyethoxy, hydroxyethoxy and 3-carboxypropoxy.

The aryl group represented by $R^{38}$ includes substituted and unsubstituted aryl groups. As the aryl group, an aryl group having 7 to 12 carbon atoms is preferred. Examples of the substituent groups include an alkyl group, an alkoxyl group, a halogen atom, an alkylamino group and an ionic hydrophilic group. Examples of the aryl groups include phenyl, p-tolyl, p-methoxyphenyl, o-chlorophenyl and m-(3-sulfopropylamino)phenyl.

The aryloxy group represented by $R^{38}$ includes substituted and unsubstituted aryloxy groups. As the aryloxy group, an aryloxy group having 6 to 12 carbon atoms is preferred. Examples of the substituent groups include an alkoxyl group and an ionic hydrophilic group. Examples of the aryloxy groups include phenoxy, p-methoxyphenoxy and o-methoxyphenoxy.

The acylamino group represented by $R^{38}$ includes substituted and unsubstituted acylamino groups. As the acylamino group, an acylamino group having 2 to 12 carbon atoms is preferred. Examples of the substituent groups include an ionic hydrophilic group. Examples of the acylamino groups include acetamido, benzamido and 3,5-disulfobenzamido.

The sulfonylamino group represented by $R^{38}$ includes substituted and unsubstituted sulfonylamino groups. As the sulfonylamino group, a sulfonylamino group having 2 to 12 carbon atoms is preferred. Examples of the sulfonylamino groups include methylsulfonylamino and ethylsulfonylamino.

The alkoxycarbonyl amino group represented by $R^{38}$ includes substituted and unsubstituted alkoxycarbonylamino groups. As the alkoxycarbonylamino group, an alkoxycarbonylamino group having 2 to 12 carbon atoms is preferred. Examples of the substituent groups include an ionic hydrophilic group. Examples of the alkoxycarbonylamino groups include ethoxycarbonylamino.

The ureido group represented by $R^{38}$ includes substituted and unsubstituted ureido groups. As the ureido group, a ureido group having 1 to 12 carbon atoms is preferred. Examples of the substituent groups include an alkyl group and an aryl group. Examples of the ureido groups include 3-methylureido, 3,3-dimethylureido and 3-phenylureido.

The alkylthio group represented by $R^{38}$ includes substituted and unsubstituted alkylthio groups. As the alkylthio group, an alkylthio group having 1 to 12 carbon atoms is preferred. Examples of the substituent groups include an ionic hydrophilic group. Examples of the alkylthio groups include methylthio and ethylthio.

The arylthio group represented by $R^{38}$ includes substituted and unsubstituted arylthio groups. As the arylthio group, an arylthio group having 6 to 12 carbon atoms is preferred. Examples of the substituent groups include an alkyl group and an ionic hydrophilic group. Examples of the arylthio groups include phenylthio and p-tolylthio.

The alkoxycarbonyl group represented by $R^{38}$ includes substituted and unsubstituted alkoxycarbonyl groups. As the alkoxycarbonyl group, an alkoxycarbonyl group having 2 to 12 carbon atoms is preferred. Examples of the substituent groups include an ionic hydrophilic group. Examples of the alkoxycarbonyl groups include methoxycarbonyl and ethoxycarbonyl.

The carbamoyl group represented by $R^{38}$ includes substituted and unsubstituted carbamoyl groups. Examples of the substituent groups include an alkyl group. Examples of the carbamoyl groups include methylcarbamoyl and dimethylcarbamoyl.

The sulfamoyl group represented by $R^{38}$ includes substituted and unsubstituted sulfamoyl groups. Examples of the substituent groups include an alkyl group. Examples of the sulfamoyl groups include dimethylsulfamoyl and di-(2-hydroxyethyl)sulfamoyl.

Examples of the sulfonyl groups represented by $R^{38}$ include methanesulfonyl and phenylsulfonyl.

The acyl group represented by $R^{38}$ includes substituted and unsubstituted acyl groups. As the acyl group, an acyl group having 1 to 12 carbon atoms is preferred. Examples of the substituent groups include an ionic hydrophilic group. Examples of the acyl groups include acetyl and benzoyl.

The alkylamino group represented by $R^{38}$ includes substituted and unsubstituted alkylamino groups. As the alkylamino group, an alkylamino group having 1 to 6 carbon atoms is preferred. Examples of the substituent groups include an ionic hydrophilic group. Examples of the alkylamino groups include methylamino and diethylamino.

The arylamino group represented by $R^{38}$ includes substituted and unsubstituted arylamino groups. As the arylamino group, an arylamino group having 6 to 12 carbon atoms is preferred. Examples of the substituent groups include a halogen atom and an ionic hydrophilic group. Examples of the arylamino groups include anilino and 2-chloroanilino.

The ionic hydrophilic group represented by $R^{38}$ includes a sulfo group, a carboxyl group and a quaternary ammonium salt. Above all, a sulfo group and a carboxyl group are preferred, and a sulfo group is particularly preferred. The above-mentioned carboxyl group and sulfo group may be in the salt form, and examples of counter ions for forming the salts include an alkali metal ion (for example, a sodium ion or a potassium ion) and an organic cation (for example, a tetramethylguanidium ion).

In the above-mentioned general formula (Y-III), Za represents —N=, —NH— or —C($R^{41}$)=, Zb and Zc each independently represents —N= or —C($R^{41}$)=, and $R^{41}$ represents a hydrogen atom or a non-metallic substituent group. As the non-metallic substituent group represented by $R^{41}$, preferred is a cyano group, a cycloalkyl group, an aralkyl group, an aryl group, an alkylthio group, an arylthio group or an ionic hydrophilic group. Each of the above-mentioned substituent groups has the same meaning as each of the substituent groups represented by $R^{31}$, and preferred examples thereof are also the same. Skeleton examples of heterocycles each composed of two 5-membered rings and included in the above-mentioned general formula (Y-III) are shown below:

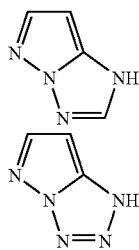
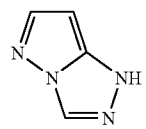
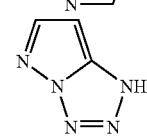

Each of the dyes represented by the above-mentioned general formulas (Y-II) to (Y-IV) has at least one ionic hydrophilic group in its molecule. The dyes include a dye in which any one of $R^{38}$ to $R^{41}$ in general formulas (Y-II) to (Y-IV) further has an ionic hydrophilic group as a substituent group, as well as a dye in which $R^{31}$, $R^{32}$, $R^{33}$, $R^{35}$, $R^{37}$, $R^{38}$ and $R^{39}$ in general formulas (Y-II) to (Y-IV) are ionic hydrophilic groups. Like this, the above-mentioned dye contains the ionic hydrophilic group in its molecule, so that solubility or dispersibility in an aqueous medium is good. The ionic hydrophilic groups include a sulfo group, a carboxyl group and a quaternary ammonium salt. Above all, a sulfo group and a carboxyl group are preferred, and a sulfo group is particularly preferred. Further, the above-mentioned dye may contain two or more ionic hydrophilic groups in its molecule. When two or more ionic hydrophilic groups are contained, a combination of a carboxyl group and a sulfo group is preferred. The above-mentioned carboxyl group and sulfo group may be in the salt form, and examples of counter ions for forming the salts include an alkali metal ion (for example, a lithium ion, a sodium ion or a potassium ion) and an organic cation (for example, a tetramethylammonium ion, a tetramethylguanidium ion or a tetramethylphosphonium ion).

Specific examples of the dyes represented by general formula (Y-I) (specific examples (Y1-1 to Y1-17) of the dyes represented by general formula (Y-II), specific examples (Y2-1 to Y2-20) of the dyes represented by general formula (Y-III), specific examples (Y3-1 to Y3-12) of the dyes represented by general formula (Y-IV), and further Y-101 to Y-155) are shown below, but the dyes used in the invention should not be construed as being limited to the following specific examples. These compounds can be synthesized with reference to JP-A-2-24191 and JP-A-2001-279145.

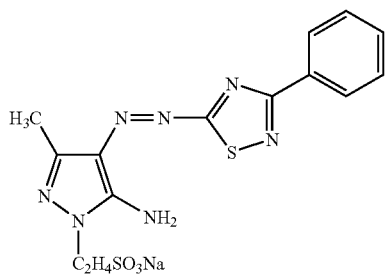

Y1-1

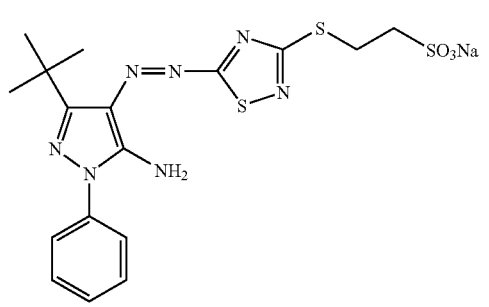

Y1-2

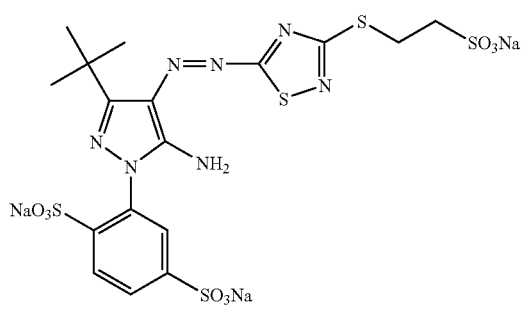

Y1-3

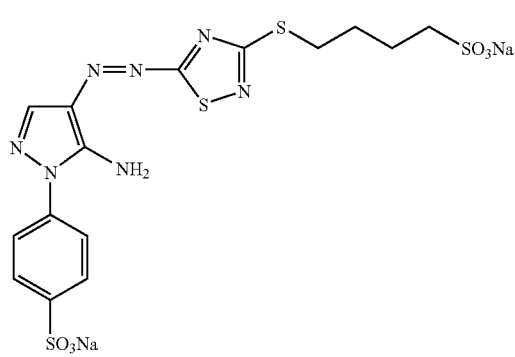

Y1-4

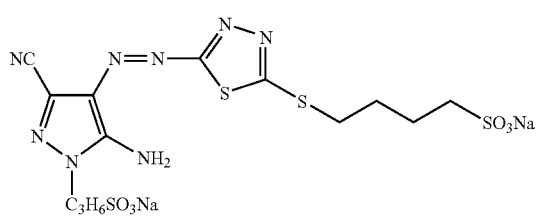

Y1-5

-continued
Y1-6
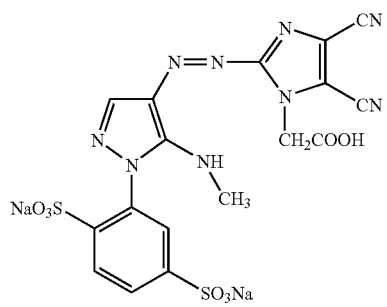
Y1-7
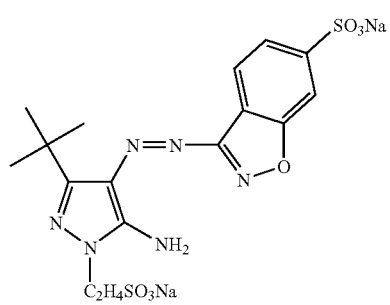
Y1-8
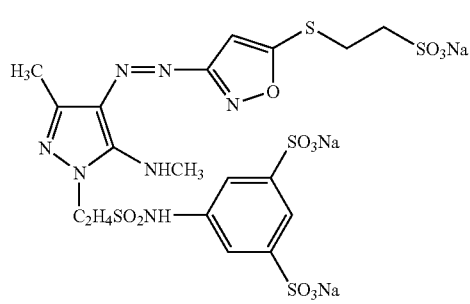
Y1-9
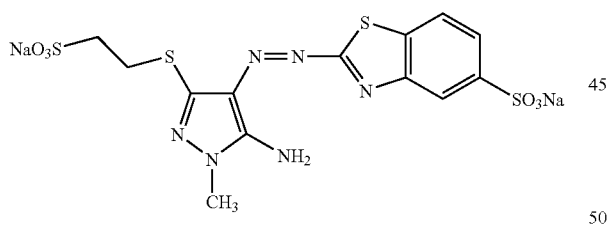
Y1-10
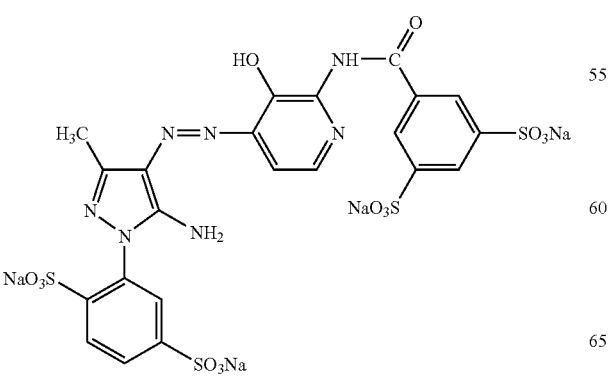
-continued
Y1-11
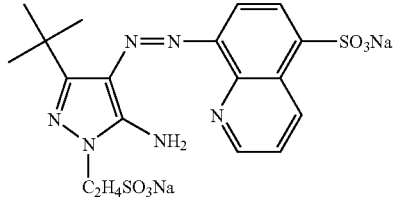
Y1-12
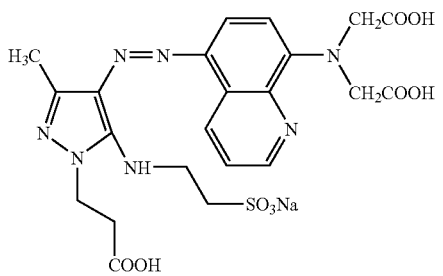
Y1-13
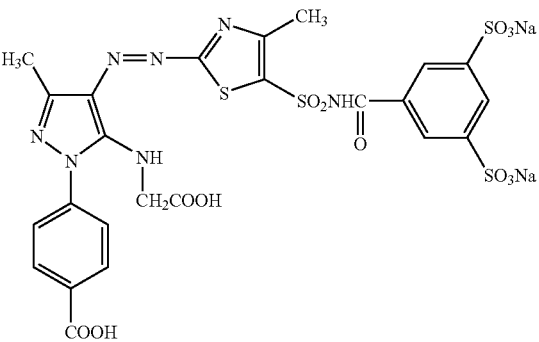
Y1-14
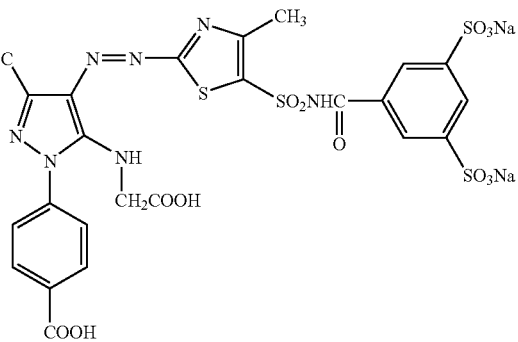
Y1-15
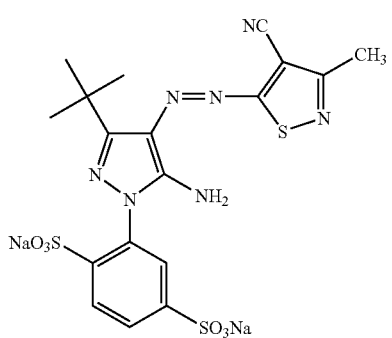

-continued
Y1-16
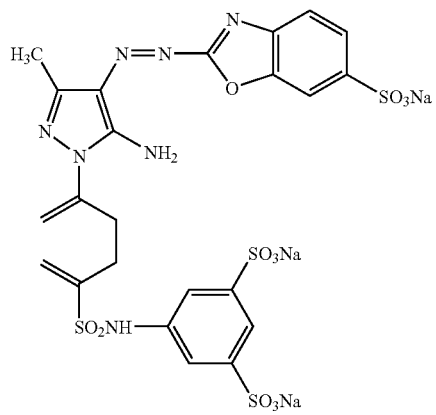
Y1-17
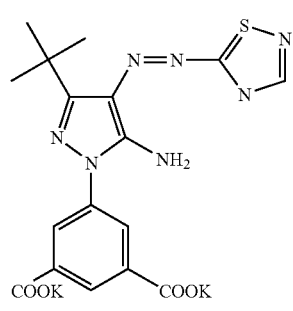
Y2-1
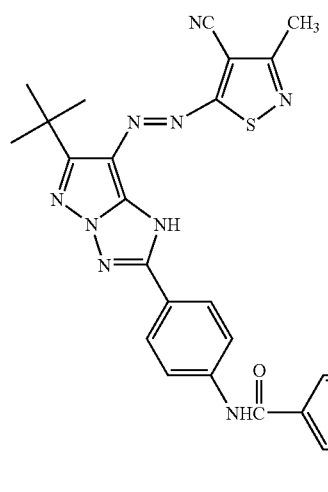
Y2-2
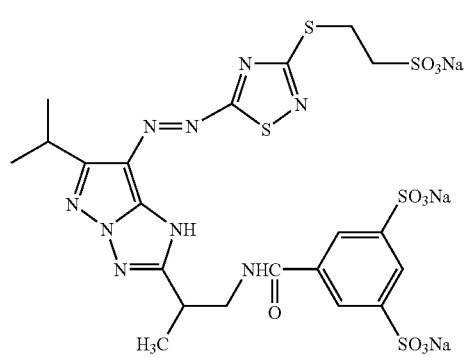
-continued
Y2-3
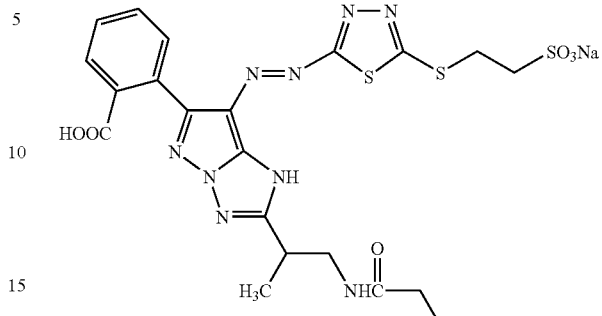
Y2-4
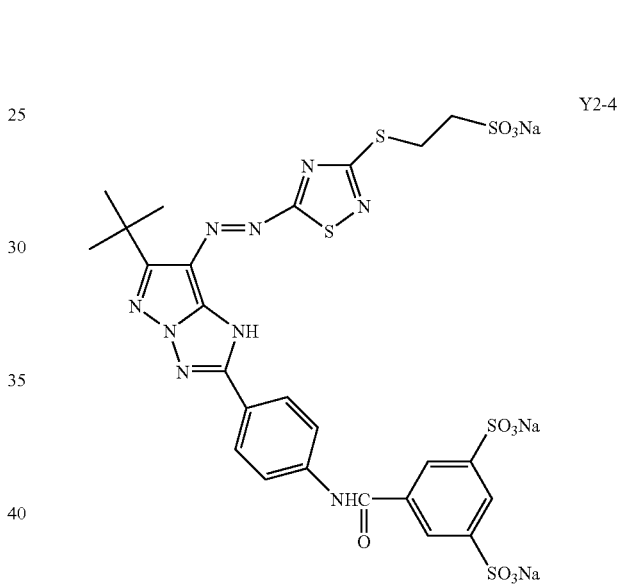
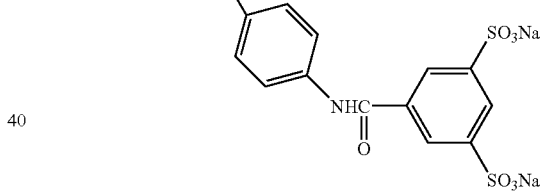
Y2-5
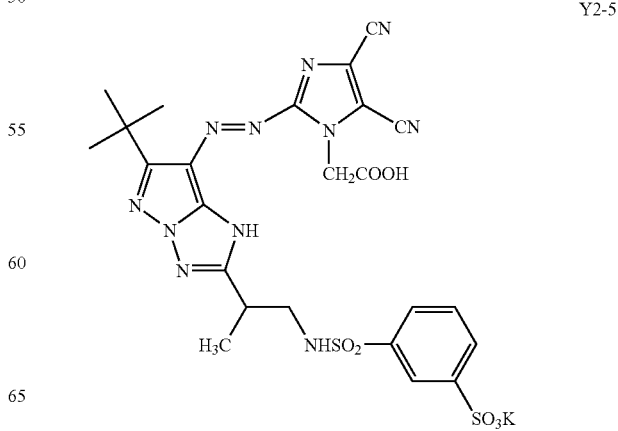

Y2-6
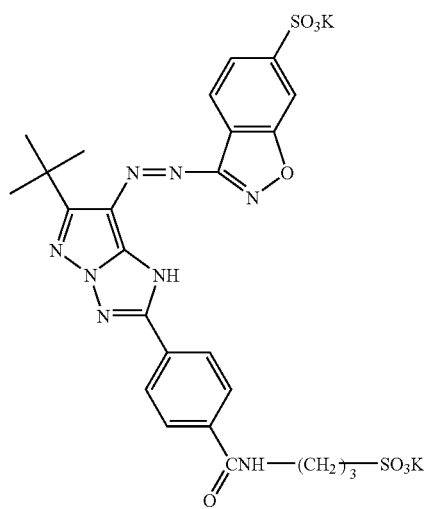
Y2-7
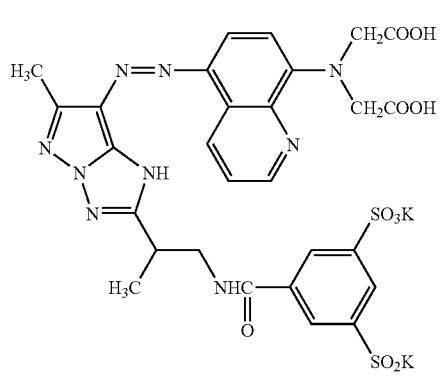
Y2-8
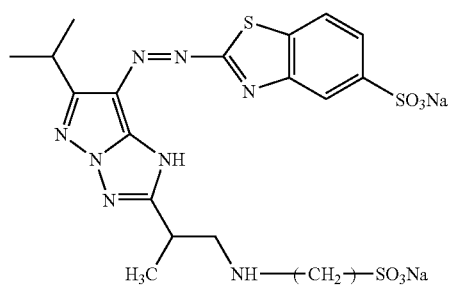
Y2-9
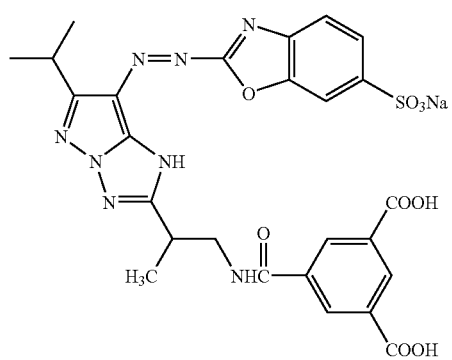
Y2-10
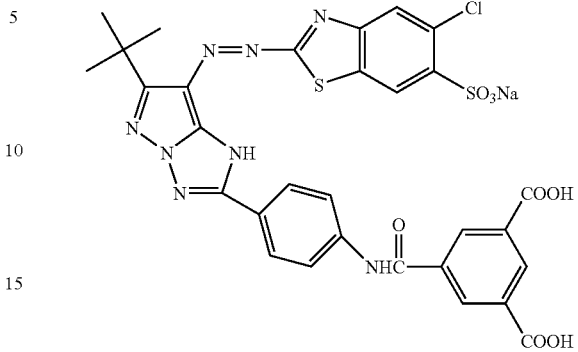
Y2-11
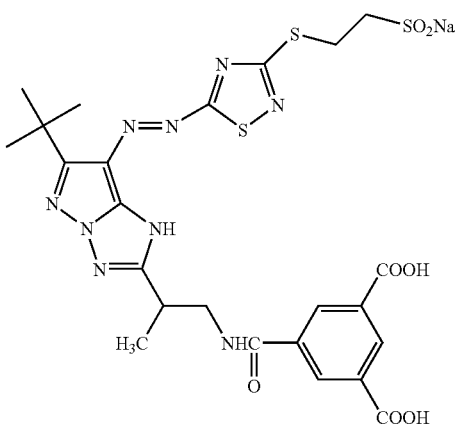
Y2-12
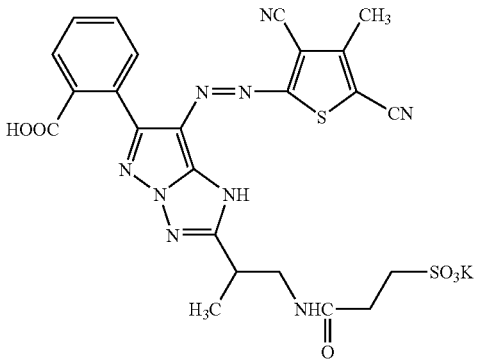
Y2-13
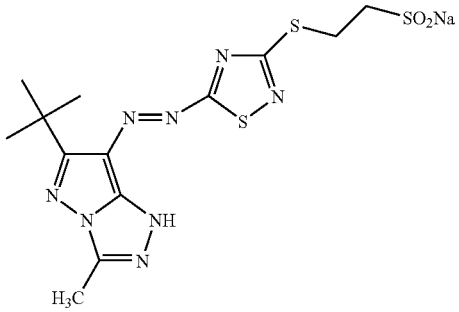

-continued
Y2-14
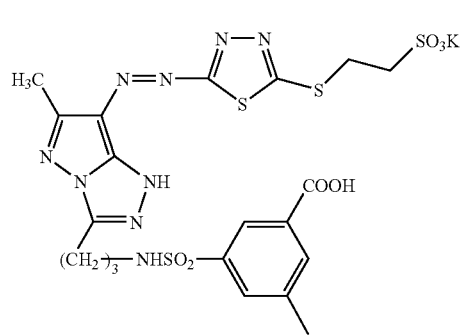
Y2-15
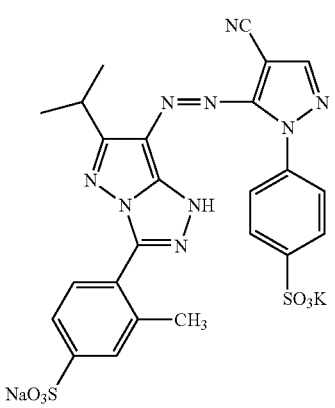
Y2-16
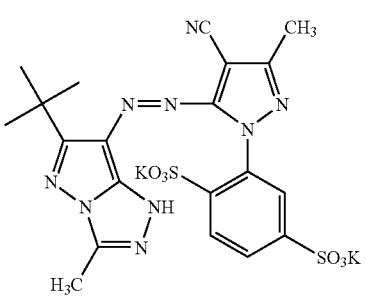
Y2-17
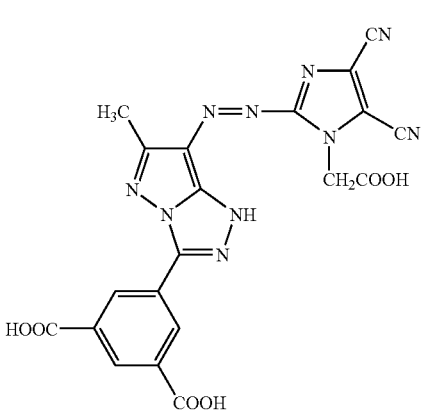
-continued
Y2-18
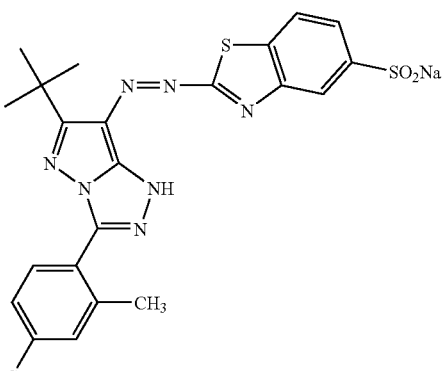
Y2-19
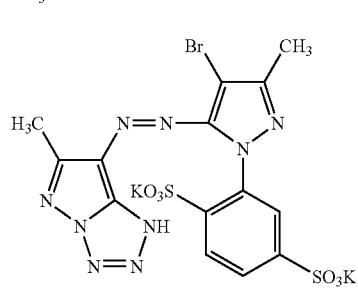
Y2-20
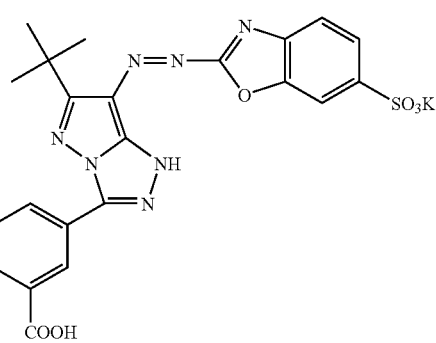
Y3-1
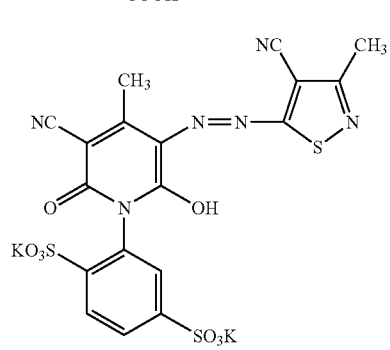
Y3-2
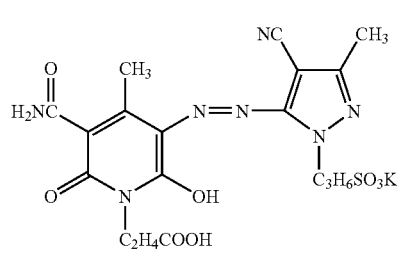

-continued

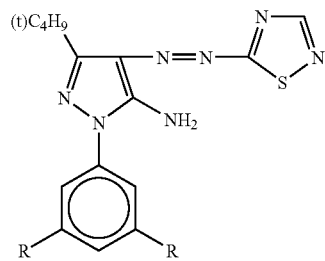
| Dye | R |
|---|---|
| Y-101 | CON(C$_2$H$_5$)$_2$ |
| Y-102 | CON(C$_4$H$_9$)$_2$ |
| Y-103 | CON(C$_6$H$_{13}$)$_2$ |
| Y-104 | COOC$_4$H$_9$ |
| Y-105 | COOC$_6$H$_{13}$ |
| Y-106 | COC$_4$H$_9$ |
| Y-107 | CONHC$_4$H$_9$ |
| Y-108 | CONHC$_6$H$_{13}$ |
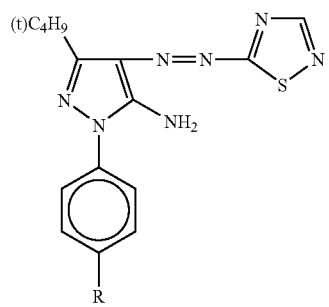
| | R |
|---|---|
| Y-109 | COOC$_4$H$_9$ |
| Y-110 | CONHC$_4$H$_9$ |
| Y-111 | CON(C$_4$H$_9$)$_2$ |
| Y-112 | SO$_2$NHC$_6$H$_{13}$ |
| Y-113 | SO$_2$N(C$_4$H$_9$)$_2$ |
| Y-114 | NHCOC$_6$H$_{13}$ |
| Y-115 | NHSO$_2$C$_8$H$_{17}$ |
| Y-116 | C$_4$H$_9$ |
| Y-117 | OC$_6$H$_{13}$ |
| Y-118 | COOC$_{12}$H$_{25}$ |
Y-119
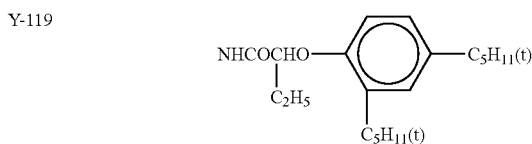
Y-120
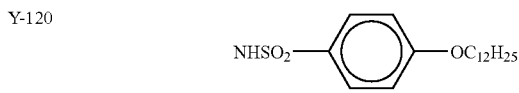

-continued
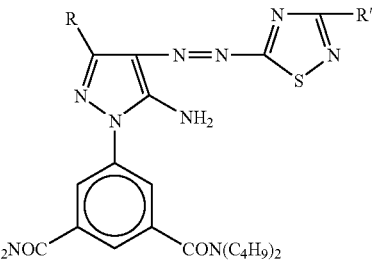
| Dye | R | R' |
|---|---|---|
| Y-121 | CH₃ | H |
| Y-122 | Ph | H |
| Y-123 | OC₂H₅ | H |
| Y-124 | C₄H₉(t) | SCH₃ |
| Y-125 | C₄H₉(t) | Ph |
| Y-126 | C₄H₉(t) | CH₃ |
| Y-127 | C₄H₉(t) | SC₈H₁₇ |
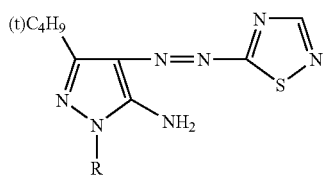
| Dye | R |
|---|---|
| Y-128 | CH₂Ph |
| Y-129 | C₄H₉ |
| Y-130 | C₈H₁₇ |
| Y-131 | CONH₂ |
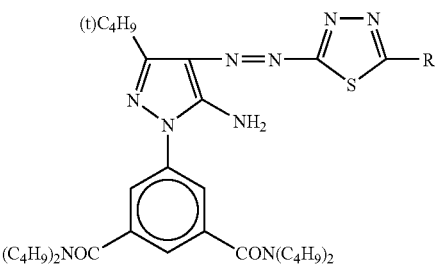
| Dye | R |
|---|---|
| Y-132 | H |
| Y-133 | CH₃ |
| Y-134 | Ph |
| Y-135 | SCH₃ |
Y-136
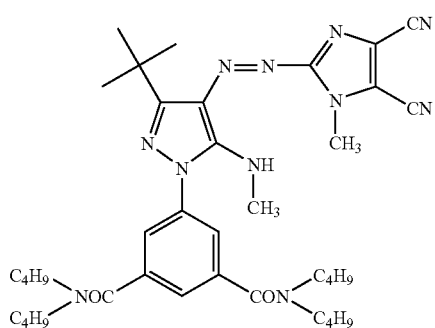

-continued
Y-137
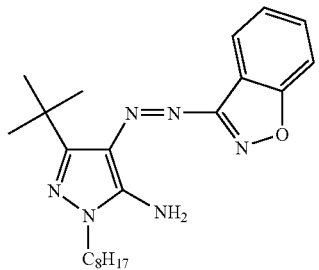
Y-138
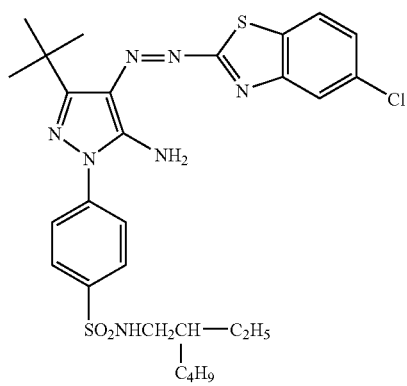
Y-139
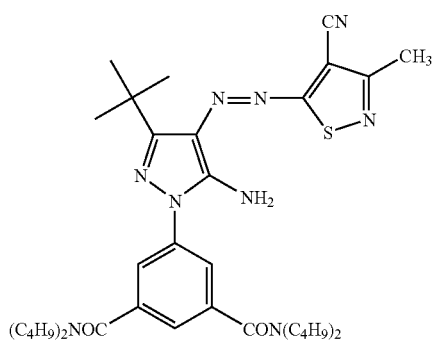
Y-140
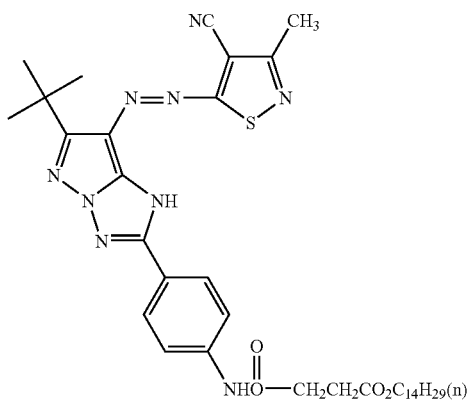

-continued
Y-141
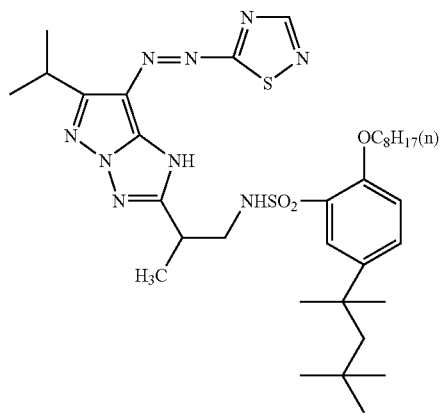
Y-142
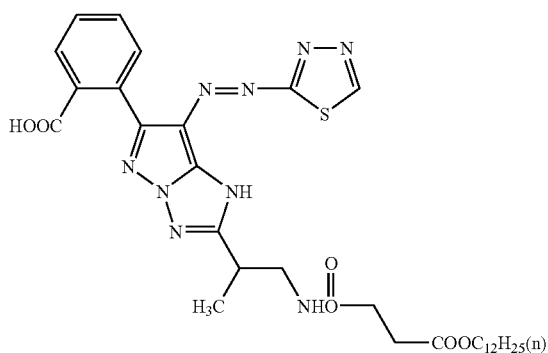
Y-143
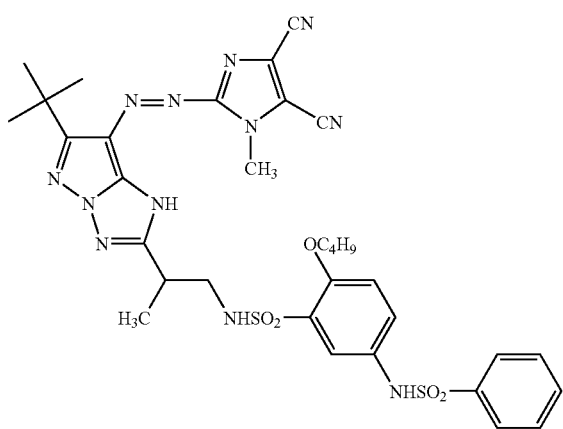
Y-144
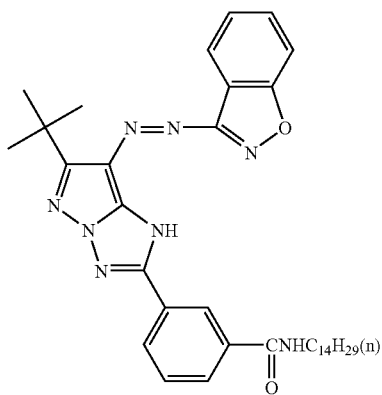

-continued
Y-145
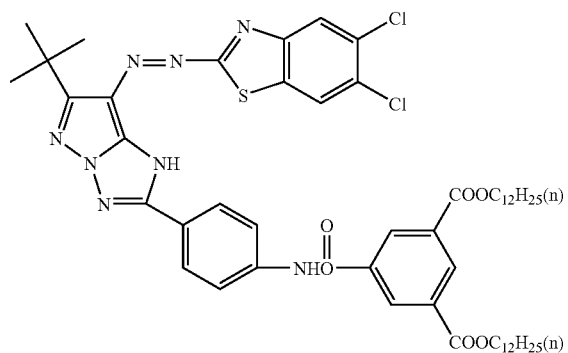
Y-146
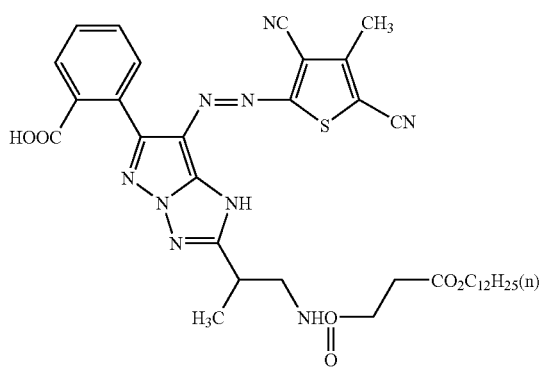
Y-147
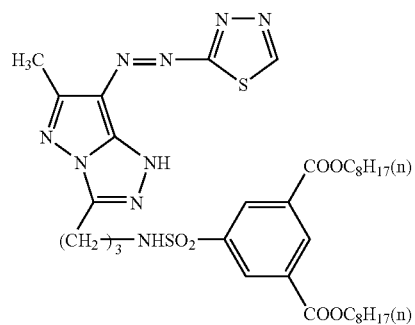
Y-148
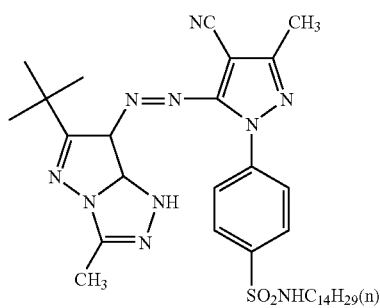

-continued
Y-149
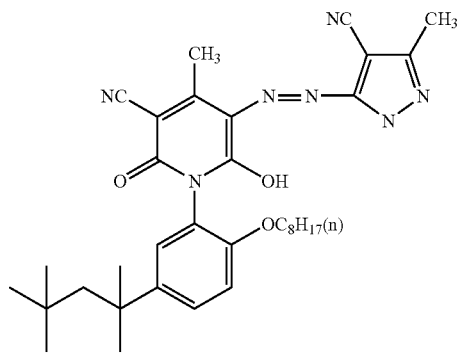
Y-150
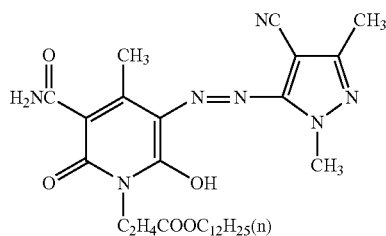
Y-151
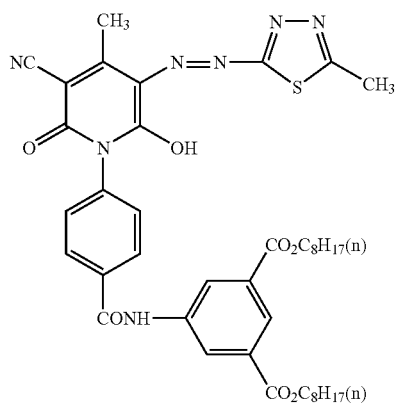
Y-152
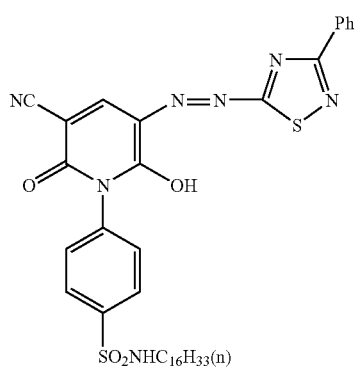

-continued

Y-153 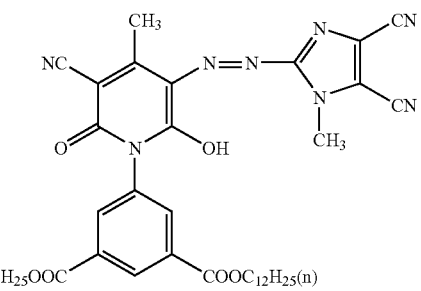

Y-154 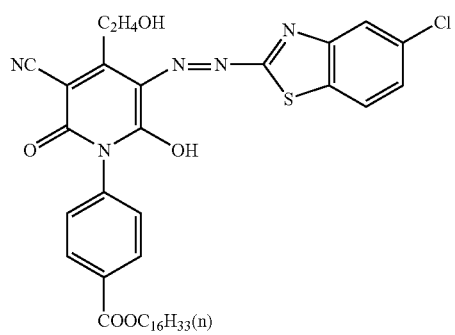

Y-155 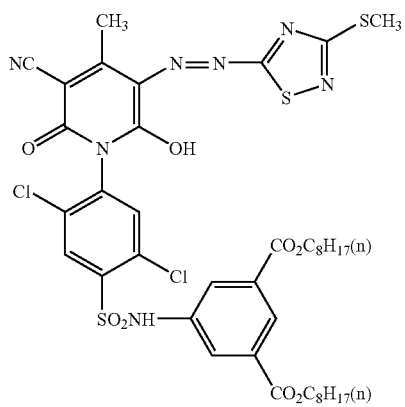

The dyes represented by the above-mentioned general formulas (Y-I), (Y-II), (Y-III) and (Y-IV) can be synthesized by the coupling reaction of diazo components with coupler components. The yields and λmax (in DMF) in synthesis of the dyes represented by the above-mentioned general formulas (Y-I), (Y-II), (Y-III) and (Y-IV) are shown in the following table:

TABLE 31

| Dye | Yield (%) | λmax (nm) |
|---|---|---|
| Y1-5 | 68 | 448.3 |
| Y1-6 | 70 | 460.2 |
| Y1-7 | 76 | 461.3 |
| Y1-8 | 82 | 458.1 |
| Y1-9 | 64 | 462.8 |
| Y1-10 | 59 | 449.0 |
| Y1-13 | 72 | 455.2 |
| Y1-15 | 73 | 456.3 |
| Y1-16 | 69 | 465.4 |
| Y2-2 | 88 | 443.3 |

TABLE 31-continued

| Dye | Yield (%) | λmax (nm) |
|---|---|---|
| Y2-3 | 82 | 444.2 |
| Y2-4 | 78 | 450.9 |
| Y2-5 | 75 | 448.9 |
| Y2-10 | 76 | 452.7 |

Each coloring agent is preferably contained in an amount of 0.2 to 20 parts by weight per 100 parts by weight of ink. When two or more different inks having the same hue are used in the invention, the concentration of one ink is preferably from 0.05 to 0.5 time that of the other ink.

The ink set of the invention is only required to contain the above-mentioned specific black ink, and the ink set further having at least a cyan ink, a magenta ink and a yellowing together with this black ink is preferred. In order to obtain full-color images or adjust hues, other coloring materials are used in combination together with the above-mentioned black dye (ab) to prepare, for example, inks for black, cyan magenta, yellow, red, green and blue, respectively, and these inks are combined, thereby being able to provide the ink set suitable for the formation of color images. In this case, various coloring materials (dyes and pigments) are available as coloring agents used when other inks constituting the ink set in combination with the ink of the invention are prepared.

Examples of the coloring materials which can be used in combination in the ink for ink jet recording of the invention include the following.

Yellow dyes include an arylazo or heterylazo dye having, for example, a phenol, a naphthol, an aniline, a pyrazolone, a pyridone or an open chain type active methylene compound as a coupling component; an azomethine dye having, for example, an open chain type active methylene compound as a coupling component; a methine dye such as a benzylidene dye or a monomethineoxonol dye; and a quinone dye such as a naphthoquinone dye or anthraquinone dye. Other dye species include a quinophthalone dye, a nitro/nitroso dye, an acridine dye and an acridinone dye. These dyes may be ones showing a yellow color only after chromophores partly dissociate. In that case, counter cations may be either inorganic cations such as alkali metals and ammonium or organic cations such as pyridinium and quaternary ammonium salts. Further, the counter cations may also be polymer cations having those as partial structures.

Magenta dyes include an arylazo or heterylazo dye having, for example, a phenol, a naphthol or an aniline as a coupling component; an azomethine dye having, for example, a pyrazolone or a pyrazolotriazole as a coupling component; a methine dye such as an arylidene dye, a styryl dye, a merocyanine dye or an oxonol dye; a carbonium dye such as a diphenylmethane dye, a triphenylmethane dye or a xanthene dye; a quinone dye such as a naphthoquinone dye, an anthraquinone dye or an anthrapyridone dye; and a condensed polycyclic coloring material such as a dioxazine dye. These dyes may be ones showing a magenta color only after chromophores partly dissociate. In that case, counter cations may be either inorganic cations such as alkali metals and ammonium or organic cations such as pyridinium and quaternary ammonium salts. Further, the counter cations may also be polymer cations having those as partial structures.

Cyan dyes include an azomethine dye such as an indoaniline dye or a indophenol dye; a polymethine dye such as a cyanine dye, an oxonol dye or a merocyanine dye; a carbonium dye such as a diphenylmethane dye, a triphenylmethane dye or a xanthene dye; a phthalocyanine dye; an anthraquinone dye; an arylazo or heterylazo dye having, for example, a phenol, a naphthol or an aniline as a coupling component; and an indigo/thioindigo dye. These dyes may be ones showing a cyan color only after chromophores partly dissociate. In that case, counter cations may be either inorganic cations such as alkali metals and ammonium or organic cations such as pyridinium and quaternary ammonium salts. Further, the counter cations may also be polymer cations having those as partial structures.

Further, a black dye (excluding black dye (ab)) such as a polyazo dye, and a carbon black dispersion can also be used.

In the invention, when the dye is oil-soluble, a high boiling organic solvent is preferably used in combination. The boiling point of the high boiling organic solvent used in the invention is 150° C. or more, and preferably 170° C. or more. The high boiling organic solvents used in the invention include, for example, a phthalate (for example, dibutyl phthalate, dioctyl phthalate, dicyclohexyl phthalate, di-2-ethylhexyl phthalate, decyl phthalate or bis(2,4-di-tert-amylphenyl)isophthalate, bis(1,1-diethylpropyl) phthalate), a phosphoric or phosphonic ester (for example, diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate or di-2-ethylhexylphenyl phosphate), a benzoate (for example, 2-ethylhexylbenzoate, 2,4-dichlorobenzoate, dodecylbenzoate or 2-ethylhexyl p-hydroxybenzoate), an amide (for example, N,N-diethyldodecaneamide or N,N-diethyllaurylamide), an alcohol (for example, isostearyl alcohol), an aliphatic ester (for example, dibutoxyethyl succinate, di-2-ethylhexyl succinate, 2-hexyldecyl tetradecanoate, tributyl citrate, diethyl azelate, isostearyl lactate or trioctyl citrate), an aniline derivative (for example, N,N-dibutyl-2-butoxy-5-tert-octylaniline), a chlorinated paraffin (for example, a paraffin having a chlorine content of 10% to 80%), a trimesate (for example, tributyl trimesate), dodecylbenzene, diisopropylnaphthalene, a phenol (for example, 2,4-di-tert-amylphenol, 4-dodecyloxyphenol, 4-dodecyloxycarbonylphenol or 4-(4-dodecyloxyphenylsulfonyl) phenol), a carboxylic acid (for example, 2-(2,4-di-tert-amylphenoxy)butyric acid or 2-ethoxyoctanedecanoic acid), and an alkylphosphoric acid (for example, di(2-ethylhexyl) phosphoric acid or diphenylphosphoric acid). Further, an organic solvent having a boiling point of 30° C. to about 160° C. (for example, ethyl acetate, butyl acetate, ethyl propionate, methyl ethyl ketone, cyclohexanone, 2-ethoxyethyl acetate or dimethylformamide) may be used in combination there with as an auxiliary solvent. The high boiling organic solvent can be used in a 0- to 2.0-fold excess amount, preferably in a 0- to 1.0-fold excess amount, by weight in relation to the coupler.

These high boiling organic solvents may be used either alone or as a mixture of several kinds of them (for example, tricresyl phosphate and dibutyl phthalate, trioctyl phosphate and di(2-ethylhexyl)sebacate, and dibutyl phthalate and poly (N-t-butylacrylamine)).

Compound examples of the high boiling organic solvents other than the above, which are used in the invention, and/or methods for synthesizing these high boiling organic solvents are described, for example, in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276,319, EP-A-286,253, EP-A-289,820, EP-A-309,158, EP-A-309,159, EP-A-309, 160, EP-A-509,311, EP-A-510,576, East German Patents 147,009, 157,147, 159,573 and 225,240A, British Patent 2,091,124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338.

The above-mentioned high boiling organic solvent is used in a 0.1- to 3-fold excess amount, preferably in a 0.5-to 1.0-fold excess amount, by weight in relation to the dye.

In the invention, when the hydrophobic dye, the high boiling organic solvent and other additives are hydrophobic, they are emulsified and dispersed in the aqueous medium to use. In emulsifying and dispersing them, a low boiling organic solvent can be used in combination with them from the viewpoint of emulsifying properties in some cases. The low boiling organic solvent is an organic solvent having a boiling point of about 30° C. to 150° C. at ordinary pressure. Examples of the low boiling organic solvents preferably used include but are not limited to an ester (for example, ethyl acetate, butyl acetate, ethyl propionate, β-ethoxyethyl acetate or methyl cellosolve acetate), an alcohol (for example, isopropyl alcohol, n-butyl alcohol or sec-butyl alcohol), a ketone (for example, methyl isobutyl ketone, methyl ethyl ketone or cyclohexanone), an amide (for example, dimethylformamide or N-methylpyrrolidone) and an ether (for example, tetrahydrofuran or dioxane).

Emulsification and dispersion are carried out in order to disperse an oil phase in which the dye is dissolved in the high boiling organic solvent or in the mixed solvent of the high boiling organic solvent and the low boiling organic solvent in some cases into an aqueous phase mainly composed of water to form micro oil droplets of the oil phase. In this case, additives such as a surfactant, a wetting agent, a dye stabilizing agent, an emulsion stabilizer, a preservative and a fungicide, which are described later, can be added to either of the aqueous phase and the oil phase or both as needed.

As the emulsification method, a method of adding the oil phase to the aqueous phase is general. However, a so-called phase inversion emulsification method of adding the aqueous phase to the oil phase is also preferably usable.

In the emulsification and dispersion of the invention, various surfactants can be used. Preferred examples thereof include an anionic surfactant such as a fatty acid salt, an alkyl sulfate, an alkylbenzenesulfonate, an alkyl naphthalenesulfonate, a dialkylsulfosuccinate, an alkylphosphate, a naphthalenesulfonic acid-formalin condensation product or a polyoxyethylenealkylsulfate; and nonionic surfactant such as a polyoxyethylene alkyl ether, a polyoxyethylene alkyl allyl ether, a polyoxyethylene fatty acid ester, a sorbitan fatty acid ester, a polyoxyethylene sorbitan fatty acid ester, a polyoxyethylenealkylamine, a glycerol fatty acid ester or an oxyethylene-oxypropylene block copolymer. SURFYNOLS (Air Products & Chemicals), an acetylenic polyoxyethylene oxide surfactant, is also preferably used. Further, amine oxide type amphoteric surfactants such as an N,N-dimethyl-N-alkylamine oxide are also preferred. Furthermore, surfactants described in JP-A-59-157636, pages 37 and 38, *Research Disclosure* No. 308119 (1989) and Japanese Patent Application Nos. 2001-11821, 2001-11822, 2001-80690 and 2001-80659 can also be used.

In order to stabilize a dye dispersion just after emulsification, a water-soluble polymer can also be added in combination with the above-mentioned surfactant. As the water-soluble polymer, there is preferably used polyvinyl alcohol, polyvinyl pyrrolidone, polyethylene oxide, polyacrylic acid, polyacrylamide or a copolymer thereof. A natural water-soluble polymer such as a polysaccharide, casein or gelatin is also preferably used. Further, in order to stabilize the dye dispersion, a polyvinyl compound, a polyurethane, a polyester, a polyamide, a polyurea or a polycarbonate obtained by polymerization of an acrylate, a methacrylate, a vinyl ester, an acrylamide, a methacrylamide, an olefin, a styrene, a vinyl ether and an acrylonitrile, which is substantially insoluble in the aqueous medium, can also be used in combination. It is preferred that these polymers contain —$SO^{2-}$ or —$COO^-$. When the polymer substantially insoluble in the aqueous medium is used in combination, it is used preferably in an amount of 20% by weight or less, and more preferably in an amount of 10% by weight or less, based on the high boiling organic solvent.

When the oil-soluble dye is dispersed by the emulsification and dispersion to prepare the aqueous ink, particularly important is the control of its particle size. In order to increase color purity and density in forming an image by ink jet, it is indispensable to decrease the average particle size. The volume average particle size is preferably from 5 nm to 100 nm.

Further, it has become clear that the presence of coarse particles plays a very major role in printing performance. That is to say, it has been revealed that the coarse particles clog nozzles of a head, or form stains, even when the coarse particles do not clog the nozzles, which causes the failure of ink ejection or the distortion of ink ejection to exert an important influence on the printing performance. In order to prevent this, it is important that particles having a size of 5 μm or more contained in the ink is reduced to 10 particles or less, and that particles having a size of 1 μm or more is reduced to 1,000 particles or less.

As methods for removing these coarse particles, known centrifugation and microfiltration can be used. These separating means may be applied either just after the emulsification and dispersion, or after various additives such as the wetting agent and the surfactant have been added to the emulsified dispersion and just before the resulting dispersion is loaded in an ink cartridge.

As an effective means for reducing the average particle size and removing coarse particles, a mechanical emulsifier can be used.

As the emulsifiers, known apparatus such as a simple stirrer or impeller stirring system, an inline stirring system, a mill system such as a colloid mill, and an ultrasonic system can be used. However, the use of a high-pressure homogenizer is particularly preferred.

As for the high-pressure homogenizer, a detailed mechanism thereof is described in U.S. Pat. No. 4,533,254 and JP-A-6-47264. As commercially available apparatus, there are a Gaulin homogenizer (A. P. V. GAULIN INC.), a Microfluidizer (MICROFLUIDEX INC.) and an Ultimizer (Sugino Machine Limited).

The high-pressure homogenizer having a mechanism of finely pulverizing particles in ultra-high pressure jet streams, which has recently been used and is described in U.S. Pat. No. 5,720,551, is particularly effective. Examples of the emulsifiers using the ultra-high pressure jet streams include DeBEE 2000 (BEE INTERNATIONAL LTD.).

When the emulsification is conducted with the high-pressure emulsifying disperser, the pressure is 500 bars or more, preferably 600 bars or more, and more preferably 1800 bars or more. It is particularly preferred that two or more types of emulsifiers are used in combination, for example, that the dye dispersion is emulsified with the stirring emulsifier and then passed through the high-pressure homogenizer. It is also preferred that the dye dispersion is once emulsified with the emulsifier, and then passed through the high-pressure homogenizer again after additives such as the wetting agent and the surfactant have been added and before the resulting ink is loaded in an ink cartridge.

When the low boiling organic solvent is contained in addition to the high boiling organic solvent, it is preferred from the viewpoints of stability of the emulsified product and safety and health that the low boiling solvent is removed. As methods for removing the low boiling solvent, various known methods can be used depending on the type of solvent. That is to say, such methods include evaporation, vacuum evaporation and ultrafiltration. This process of removing the low boiling organic solvent is preferably conducted as soon as possible just after emulsification.

Examples of the water-soluble organic solvents available in the invention include an alcohol (for example, methanol, ethanol, propanol, isopropanol, butanol, isobutanol, sec-butanol, t-butanol, pentanol, hexanol, cyclohexanol or benzyl alcohol), a polyhydric alcohol (for example, ethylene glycol, diethylene glycol, triethylene glycol, polyethylene glycol, propylene glycol, dipropylene glycol, polypropylene glycol, butylene glycol, hexanediol, pentanediol, glycerol, hexanetriol orthiodiglycol), a glycol derivative (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, propylene glycol monomethyl ether, triethylene glycol monomethyl ether, ethylene glycol diacetate, ethylene glycol monomethyl ether acetate, triethylene glycol monoethyl ether or ethylene glycol monophenyl ether), an amine (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine or tetramethylpropylenediamine), and another polar solvent (for example, formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile or acetone). The above-mentioned water-soluble organic solvents may be used as a combination of two or more of them.

When the fine coloring particle dispersion obtained in the invention is used as the ink for ink jet recording, additives such as an anti-drying agent for preventing clogging caused by drying of the ink in jet nozzles, a permeation accelerator for allowing the ink to better permeate in paper, an ultraviolet absorber, an antioxidant, a viscosity modifier, a surface tension adjuster, a dispersing agent, a dispersion stabilizer, a fungicide, a corrosion inhibitor, a pH adjusting agent, an antifoaming agent and a chelating agent can be accordingly selected to use in suitable amounts.

As the anti-drying agent used in the invention, a water-soluble organic solvent having a vapor pressure lower than that of water is preferred. Specific examples thereof include a polyhydric alcohol represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerol or trimethylolpropane; a lower alkyl ether of a polyhydric alcohol such as ethylene glycol monomethyl (or monoethyl) ether, diethylene glycol monomethyl (or monoethyl) ether or triethylene glycol monoethyl (or monobutyl) ether; a heterocycle such as 2-pyrrolidone, N-methyl-2-pyrrolidone, 1,3-dimethyl-2-imidazolidinone or N-ethylmorpholine; a sulfur-containing compound such as sulfolane, dimethyl sulfoxide or 3-sulfolene; a multifunctional compound such as diacetone alcohol or diethanolamine; and a urea derivative. Of these, a polyhydric alcohol such as glycerol or diethylene glycol is more preferred. The above-mentioned anti-drying agents may be used either alone or as a combination of two or more of them. These anti-drying agents are each preferably contained in the ink in an amount of 10% to 50% by weight.

As the permeation accelerator used in the invention, there can be used an alcohol such as ethanol, isopropanol, butanol, di(tri)ethylene glycol monobutyl ether or 1,2-hexanediol; sodium lauryl sulfate; sodium oleate; or a nonionic surfactant. When these are each contained in the ink in an amount of 10% to 30% by weight, the effect is sufficiently achieved. It is therefore preferred that these are each used within the range of the amount added in which no blotting of print and no print through occur.

As the ultraviolet absorbers used for improving image keeping quality in the invention, there can be used benzotriazole compounds described in JP-A-58-185677, JP-A-61-190537, JP-A-2-782, JP-A-5-197075 and JP-A-9-34057, benzophenone compounds described in JP-A-46-2784, JP-A-5-194483 and U.S. Pat. No. 3,214,463, cinnamic acid compounds described in JP-B-48-30492 (the term "JP-B" as used herein means an "examined Japanese patent publication"), JP-B-56-21141 and JP-A-10-88106, triazine compounds described in JP-A-4-298503, JP-A-8-53427, JP-A-8-239368, JP-A-10-182621 and JP-T-8-501291, compounds described in *Research Disclosure* No. 24239 and compounds absorbing ultraviolet rays and emitting fluorescence represented by stilbene and benzoxazole compounds, so-called fluorescent brightening agents.

As the antioxidants used for improving image keeping quality in the invention, various organic and metal complex antifading agents can be used. The organic antifading agents include a hydroquinone, an alkoxyphenol, a dialkoxyphenol, a phenol, an aniline, an amine, an indane, a chroman, an alkoxyaniline and a heterocycle, and the metal complex antifading agents include a nickel complex and a zinc complex. More specifically, there can be used compounds described in patents cited in *Research Disclosure* No. 17643, VII, paragraphs I and J, *ibid.* No. 15162, *ibid.* No. 18716, page 650, left column, *ibid.* No. 36544, page 527 and *ibid.* No. 307105, page 872, and compounds included in general formulas of typical compounds and compound examples described in JP-A-62-215272, pages 127 to 137.

The fungicides used in the invention include sodium dehydroacetate, sodium benzoate, sodium pyridinethione-1-oxide, ethyl p-hydroxybenzoate, 1,2-benzisothiazoline-3-one and a salt thereof. These are each preferably used in the ink in an amount of 0.02% to 5.00% by weight.

Details of these are described in Bokin Bobai-zai Jiten (Cyclopedia of Microbicides and Fungicides) edited by Nippon Bokin Bobai Gakkai Jiten Henshu Iinkai (Cyclopedia Editorial Committee of Japan Antimicobe and Antifungus Society).

Further, the corrosion inhibitors include, for example, an acid sulfite, sodium thiosulfate, ammonium thioglycolate, diisopropylammonium nitrite, pentaerythritol tetranitrate, dicyclohexylammonium nitrite and benzotriazole. These are each preferably used in the ink in an amount of 0.02% to 5.00% by weight.

The pH adjusting agent used in the invention can be suitably used in terms of pH adjustment and dispersion stability, and is added so as to give preferably a pH of 4.5 to 10.0, and more preferably a pH of 6 to 10. The pH adjusting agents include an organic base and an inorganic alkali as basic agents, and an organic acid and an inorganic acid as acidic agents.

The organic bases include triethanolamine, diethanolamine, N-methyldiethanolamine and dimethylethanolamine. The inorganic alkalis include an alkali metal hydroxide (for example, sodium hydroxide, lithium hydroxide or potassium hydroxide), a carbonate (for example, sodium carbonate or sodium hydrogen carbonate) and ammonium.

Further, the organic acids include acetic acid, propionic acid, trifluoroacetic acid and an alkylsulfonic acid. The inorganic acids include hydrochloric acid, sulfuric acid and phosphoric acid.

The surface tension adjusters used in the invention include nonionic, cationic and anionic surfactants. For example, the anionic surfactants include a fatty acid salt, an alkyl sulfate, an alkylbenzenesulfonate, an alkylnaphthalenesulfonate, a dialkylsulfosuccinate, an alkylphosphate, a naphthalenesulfonic acid-formalin condensation product and a polyoxyethylenealkylsulfate, and the nonionic surfactants include a polyoxyethylene alkyl ether, a polyoxyethylene alkyl allyl ether, a polyoxyethylene fatty acid ester, a sorbitan fatty acid ester, a polyoxyethylene sorbitan fatty acid ester, a polyoxyethylenealkylamine, a glycerol fatty acid ester and an oxyethylene-oxypropylene block copolymer. SURFYNOLS (Air Products & Chemicals), an acetylenic polyoxyethylene oxide surfactant, is also preferably used. Further, amine oxide type amphoteric surfactants such as an N,N-dimethyl-N-alkylamine oxide are also preferred. Furthermore, surfactants described in JP-A-59-157636, pages 37 and 38 and *Research Disclosure* No. 308119 (1989) can also be used.

The surface tension of the ink used in the invention is preferably from 20 to 50 mN/m, and more preferably from 20 to 40 mN/m, at 25° C. in both the dynamic surface tension and the static surface tension. When the surface tension exceeds 50 mN/m, ejection stability is decreased, and blotting in color mixing and smeared print edges occur to significantly deteriorate print quality. On the other hand, when the surface tension of the ink is less than 20 mN/m, the ink adheres to a surface of hardware to cause poor print in some cases.

The viscosity of the ink of the invention is from 1 to 20 mPa·S, more preferably from 2 to 15 mPa·S, and particularly preferably from 2 to 10 mPa·S, at 25° C. Exceeding 20 mPa·S results in a slow fixing rate of a recorded image and deterioration of ejection performance, whereas less than 1 mPa·S results in blotting of a recorded image to lower a quality level.

The viscosity of the ink is arbitrarily adjustable by the amount of an ink solvent added. The ink solvents include, for example, glycerol, diethylene glycol, triethanolamine, 2-pyrrolidone, diethylene glycol monobutyl ether and triethylene glycol monobutyl ether.

Further, the viscosity modifier may also be used. The viscosity modifiers include, for example, a cellulose, a water-soluble polymer such as polyvinyl alcohol, and a nonionic surfactant. They are described in *Viscosity Controlling Technology*, Chapter 9, Gijutsu Joho Kyokai (Technical Information association) (1999), and *Chemicals for Ink Jet Printers* (supplemented in 1998), Survey of Development Trend-Outlook of Materials, pages 162 to 174, CMC (1997), in more detail.

Further, in the invention, a fine polymer particle dispersion can also be used. Details thereof are described in Japanese Patent Application No. 2001-63780.

In the invention, the various cationic, anionic and nonionic surfactants described above can be used as the dispersing agents and dispersion stabilizers, and fluorine or silicone compounds or chelating agents represented by EDTA can also be used as the antifoaming agents, as needed.

The ink of the invention has no limitation on the ink jet recording system, and is used in known systems such as a charge control system in which the ink is ejected by electrostatic induction force, a drop-on-demand system (pressure pulse system) utilizing oscillation pressure of piezoelectric elements, an acoustic ink jet system in which electric signals are converted to acoustic beams, with which the ink is irradiated to eject the ink by the use of radiation pressure, and a thermal ink jet system (bubble jet system) in which the ink is heated to form bubbles, and pressure generated is utilized.

The ink jet recording systems include a system of ejecting an ink low in concentration, which is called photo ink, as many drops small in volume, a system of improving image quality using a plurality of inks substantially identical in hues and different in concentration, and a system of using a transparent and colorless ink.

As an ink jet recording method and an ink cartridge preferably available in the invention, known ones can be used. Specifically, they are described in JP-A-2000-198958.

The ink set and ink cartridge of the invention can be used for forming images on known recording materials, that is to say, plain paper, resin-coated paper, paper exclusive to ink jet recording described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10- 235995, JP-A-10-337947, JP-A-10-217597 and JP-A-10-337947, films, paper also used for electrophotographic use, cloth, glass, metals and ceramics.

Recording paper and recording film which are reflection type media and used for conducting ink jet printing using the ink of the invention will be described below.

An available support of the recording paper or the recording film is made of chemical pulp such as LBKP or NBKP, mechanical pulp such as GP, PGW, RMP, TMP, CTMP, CMP or CGP, or used paper pulp such as DIP, to which known additives such as a pigment, a binder, a sizing agent, a fixing agent, a cationic agent and a paper strong agent are added, and manufactured with various machines such as a wire paper machine and a cylinder paper machine. Besides these supports, any of synthetic paper and a plastic film sheet may be used as the support. The thickness of the support is desirably from 10 to 250 μm, and the basis weight thereof is desirably from 10 to 250 g/m$^2$.

The support may be provided with an ink-receiving layer and a back coat layer as such, or may be provided with size press coatings or anchor coat layers on both sides thereof using starch or polyvinyl alcohol, and then provided with an ink-receiving layer and a back coat layer. Further, the support may be subjected to flattening treatment using a calendering apparatus such as a machine calender, a TG calender or a soft calender. In the invention, as the support, there is more preferably used paper or a plastic film sheet both sides of which are laminated with a polyolefin (for example, polyethylene, polystyrene, polybutene or copolymers of them) or polyethylene terephthalate. A white pigment (for example titanium oxide or zinc oxide) or a toning dye (for example, cobalt blue, ultramarine blue or neodymium oxide) is preferably added to the polyolefin.

The image-receiving layer provided on the support contains a pigment and an aqueous binder. As the pigment, preferred is a white pigment. The white pigments include a white in organic pigment such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide or zinc carbonate, and an organic pigment such as a styrenic pigment, an acrylic pigment, a urea resin or a melamine resin. As the white pigment contained in the ink-receiving layer, preferred is a porous inorganic pigment, and synthetic amorphous silica having a large pore area is particularly suitable. As the synthetic amorphous silica, there are available both silicic anhydride obtained by the dry manufacturing process and hydrated silicic acid obtained by the wet manufacturing process. However, it is particularly desirable to use hydrated silicic acid. These pigments may be used as a combination of two or more of them.

The aqueous binders contained in the ink-receiving layer include a water-soluble polymer such as polyvinyl alcohol, silanol-modified polyvinyl alcohol, starch, cationized starch, casein, gelatin, carboxymethyl cellulose, hydroxyethyl cellulose, polyvinylpyrrolidone, a polyalkylene oxide or a polyalkylene oxide derivative, and a water-dispersible polymer such as a styrene-butadiene latex or an acrylic latex. These aqueous binders can be used either alone or as a combination of two or more of them. In the invention, of these, polyvinyl alcohol and silanol-modified polyvinyl alcohol are particularly suitable in respect to adhesion properties to the pigment and separation resistance of the ink-receiving layer.

The ink-receiving layer can contain a mordant, a water resistance-imparting agent, a light resistance improver, a surfactant, a hardener and other additives, as well as the pigment and the aqueous binder.

It is preferred that the mordant to be added to the ink-receiving layer is immobilized. Forth at purpose, a polymer mordant is preferably used.

The polymer mordants are described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122820, JP-A-60-122941, JP-A-60-122942, JP-A-60-235134, JP-A-1- 161236, and U.S. Pat. Nos. 2,484,430, 2,548,564, 3,148,061, 3,309,690, 4,115,124, 4,124,386, 4,193,800, 4,273,853, 4,282,305 and 4,450,224. Image-receiving materials containing polymer mordants described in JP-A-1-16123, pages 212 to 215 are particularly preferred. The use of the polymer mordants described in JP-A-1-16123 provides images having excellent image quality, and improves the light resistance of the images.

The water resistance-imparting agent is effective for imparting water resistance to images, and as the water resistance-imparting agent, a cationic resin is particularly desirable. Such cationic resins include polyamidepolyamine epichlorohydrin, polyethyleneimine, polyaminesulfone, dimethyldiallylammonium chloride polymer and cationic polyacrylamide. The content of these cationic resins is preferably from 1% to 15% by weight, and particularly preferably from 3% to 10% by weight, based on the total solid content of the ink-receiving layer.

The light resistance improvers include zinc sulfate, zinc oxide, a hindered amine-based antioxidant, and a benzophenone-based or benzotriazole-based ultraviolet absorber.

The surfactant acts as a coating aid, a separation improver, a slippage improver or an antistatic agent. The surfactants are described in JP-A-62-173463 and JP-A-62-183457.

In pace of the surfactant, an organic fluoro compound may be used. It is preferred that the organic fluoro compound is hydrophobic. Examples of the organic fluoro compounds include a fluorine surfactant, an oily fluorine compound (for example, fluorine oil) and a solid fluorine compound (for example, an ethylene tetrafluoride resin). The organic fluoro compounds are described in JP-B-57-9053 (columns 8 to 17), JP-A-61-20994 and JP-A-62-135826.

As the hardeners, there can be used materials described in JP-A-1-161236, page 222.

Other additives to be added to the ink-receiving layer include a pigment dispersing agent, a viscosity improver, an antifoaming agent, a dye, a fluorescent brightening agent, a preservative, a pH adjusting agent, a matte agent and a hardener. The ink-receiving layer may be composed of either one layer or two layers.

The recording paper and recording film can each also be provided with a back coat layer. Components addible to this layer include a white pigment, an aqueous binder and other components. The white pigments contained in the back coat layer include, for example, a white inorganic pigment such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrous halloysite, magnesium carbonate or magnesium hydroxide, and an organic pigment such as a styrenic plastic pigment, an acrylic plastic pigment, polyethylene, microcapsules, a urea resin and a melamine resin.

The aqueous binders contained in the back coat layer include a water-soluble polymer such as a styrene-maleate copolymer, a styrene-acrylate copolymer, polyvinyl alcohol, silanol-modified polyvinyl alcohol, starch, cationized starch, casein, gelatin, carboxymethyl cellulose, hydroxyethyl cellulose or polyvinylpyrrolidone, and a water-dispersible polymer such as a styrene-butadiene latex and an acrylic latex. The other components contained in the back coat layer include an antifoaming agent, a foam inhibitor, a dye, a fluorescent brightening agent, a preservative and a water resistance-imparting agent.

A polymer latex may be added to layers (including a back layer) constituting the ink jet recording paper or recording film. The polymer latex is used for improvements in film properties such as dimensional stabilization, curl prevention, adhesion prevention and film crack prevention. The polymer latexes are described in JP-A-62-245258, JP-A-62-136648 and JP-A-62-110066. When the polymer latex having a low glass transition temperature (of 40° C. or less) is added to a mordant-containing layer, crazing of the layer and curling can be prevented. Also when the polymer latex having a high glass transition temperature is added to the back layer, curling can be prevented.

Images formed on the above-mentioned recording paper or recording film using the ink set or ink cartridge of the invention are high in fastness, so that extremely excellent ink recorded matter can be provided.

EXAMPLES

The invention will be illustrated with reference to the following examples, but the invention should not be construed as being limited thereto.

Example 1

Deionized water was added to the following components to bring the volume to 1 liter, followed by stirring for 1 hour with heating at 30 to 40° C. Then, the resulting solution was adjusted to pH 9 with 10-mol/liter KOH, and filtered through a microfilter having an average pore size of 0.25 μm under reduced pressure to prepare an ink solution for black.

| | |
|---|---|
| Dye (T-5) | 20.0 g |
| Dye (T-6) | 20.0 g |
| Dye (T-7) | 20.0 g |
| Dye (T-3) | 20.0 g |
| Diethylene Glycol | 20 g |
| Urea | — |
| Glycerol | 120 g |
| Triethylene Glycol Monobutyl Ether | — |
| Diethylene Glycol Monobutyl Ether | 230 g |
| 2-Pyrrolidone | 81 g |
| SURFYNOL 465 (Air Products & Chemicals) | — |

-continued

| | |
|---|---|
| SURFYNOL STG | 9.8 g |
| Triethanolamine | 17.9 g |
| Benzotriazole | 0.06 g |
| PROXEL XL2 | 1.1 g |

Further, a light cyan ink, a cyan ink, a light magenta ink, a magenta ink and a yellow ink were prepared by changing the dye species and additives, and ink set 101 having the composition shown in Table A.

TABLE A

| | Light Cyan | Cyan | Light Magenta | Magenta | Yellow | Black |
|---|---|---|---|---|---|---|
| Dye (g/l) | T-2 | T-2 | T-1 | T-1 | T-3 | T-5 |
| | 8.75 | 35.0 | 7.5 | 30.0 | 14.7 | 20.0 |
| | | | | | T-4 | T-6 |
| | | | | | 14.0 | 20.0 |
| | | | | | | T-7 |
| | | | | | | 20.0 |
| | | | | | | T-3 |
| | | | | | | 20.0 |
| Diethylene Glycol (g/l) | 200 | 130 | 150 | 110 | 85 | 20 |
| Urea | — | — | 37 | 46 | — | — |
| Glycerol (g/l) | 150 | 180 | 130 | 160 | 150 | 120 |
| Triethylene Glycol Monobutyl Ether (g/l) | 130 | 140 | 130 | 140 | 180 | — |
| Diethylene Glycol Monobutyl Ether (g/l) | — | — | — | — | — | 230 |
| 2-Pyrrolidone (g/l) | — | — | — | — | — | 81 |
| SURFYNOL 465 (g/l) | 9.8 | 10.5 | 10.5 | 10.0 | — | — |
| SURFYNOL STG (g/l) | — | — | — | — | 8.5 | 9.8 |
| Triethanolamine (g/l) | 6.0 | 6.3 | 6.9 | 7.0 | 0.9 | 17.9 |
| Benzotriazole (g/l) | 0.08 | 0.08 | 0.08 | 0.07 | 0.06 | 0.06 |
| PROXEL XL2 (g/l) | 1.1 | 1.2 | 3.5 | 1.5 | 1.5 | 1.1 |

T-1

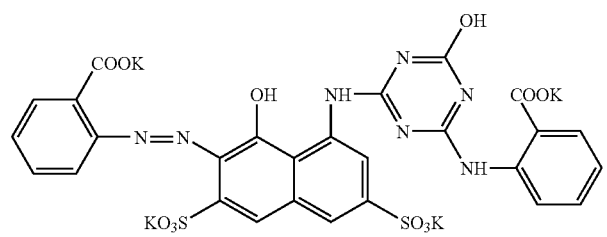

T-2

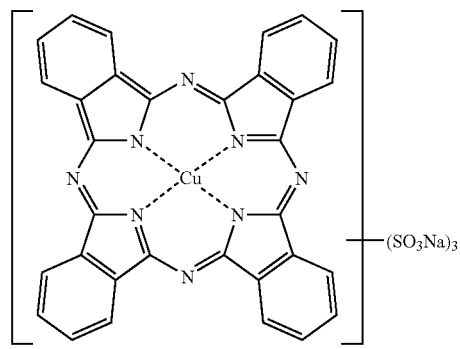

T-3

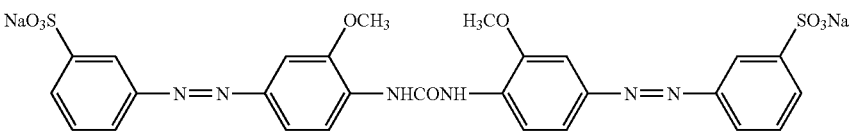

TABLE A-continued

T-4: [chemical structure showing a triazine-based dye with naphthalene sulfonate groups, methyl-substituted phenyl azo linkages, and NHCH₂CH₂OH substituent]

T-5: [chemical structure showing a phosphonate-substituted phenyl azo compound linked to methyl/ethoxy-substituted benzene and aminonaphthol with sulfonate]

T-6: [chemical structure showing a dicarboxylate phenyl azo naphthalene linked to aminonaphthol sulfonate]

T-7: [chemical structure showing a carboxylate phenyl azo compound with ethoxy substituents linked to aminonaphthol sulfonate]

Then, the dye species was changed for each ink of ink set 101 as shown in Table B to prepare ink sets 102 to 105. The dye was changed on the basis of equimolar substitution, and the dye density was adjusted so that the transmission density of each ink solution became equivalent to that of ink set 101. Further, the dyes were used in combination, they were used at an equimolar ratio.

TABLE B

| Ink Set | Light Cyan | Cyan | Light Magenta | Magenta | Yellow | Black | Remarks |
|---|---|---|---|---|---|---|---|
| 101 | T-2 | T-2 | T-1 | T-1 | T-3 T-4 | T-5 T-6 T-7 T-3 | Comparison |
| 102 | 144 | 144 | a-29 | a-29 | Y1-17 | Ba-1 T-3 | Invention |
| 103 | 145 | 144 | a-29 | a-29 | Y1-17 | Ba-1 Y1-17 | Invention |
| 104 | 144 | 137 142 | b-5 c-3 | d-1 e-4 | Y2-1 Y3-5 | Ba-1 T-3 | Invention |

TABLE B-continued

| Ink Set | Light Cyan | Cyan | Light Magenta | Magenta | Yellow | Black | Remarks |
|---|---|---|---|---|---|---|---|
| 105 | T-2 144 | T-2 144 | T-1 a-29 | T-1 a-29 | T-3 Y1-17 | Ba-1 Y1-17 | Invention |

Then, these ink sets 101 to 105 were each loaded in a cartridge of an ink jet printer PM-770C (manufactured by Seiko Epson Corporation), and images were printed with the printer on ink jet paper, PM Photographic Paper manufactured by Seiko Epson Corporation. The following evaluations were made.

1) Printing performance (1): The cartridge was set on the printer. After confirmation of ejection of the ink from all nozzles, 50 A-4 size sheets were printed, and print distortion was evaluated.

A: No print distortion is observed from the start of printing to the termination.

B: Some outputs having print distortion occur.

C: Print distortion is observed from the start of printing to the termination.

2) Printing performance (2): The cartridge was allowed to stand at 60° C. for 10 days, and then, print distortion was evaluated in the same manner as with printing performance (1).

3) Drying property: Paper was touched with a finger just after printed, and a stain adhered onto the finger was visually observed.

4) Blotting of thin lines: Thin line patterns of yellow, magenta, cyan and black were printed, and visually evaluated (evaluation (1)). As for black, after solid printing with a magenta ink, a thin line of black was printed, and blotting due to contact of two colors was also evaluated (evaluation (2)).

5) Water resistance: An image obtained was immersed in deionized water for 5 seconds, and then, blotting of the image was visually observed.

6) Image keeping quality: A plastic print sample was prepared, and the following evaluations were made.

Light fastness: The chromaticity (a*1, b*1) and lightness (L1) just after printing were measured with an SPM 100-11 meter manufactured by Gretag Co., and then, an image was irradiated with xenon light (85,000 luxes) for 7 days by using a weather meter manufactured by Atlas Co. Thereafter, the chromaticity (a*1, b*1) and lightness (L1) were measured again, and the color difference (ΔE) between before and after light irradiation was determined according to the following equation and evaluated.

$$\Delta E = \{(a*1-a*2)^2 + (b*1-b*2)^2 + (L1-L2)^2\}^{1/2}$$

The color differences were evaluated at three reflection densities of 1, 1.3 and 1.6. The case where the color differences were "5" or less at all densities was evaluated as A, the case where the color differences were more than "5" at two densities was evaluated as B, and the case where the color differences were more than "5" at all densities was evaluated as C.

Heat fastness: A sample was kept under conditions of 80° C. for 6 days, and the color difference between before and after that was evaluated in the same manner as with the light fastness. The dye residual rates were evaluated at three reflection densities of 1, 1.3 and 1.6. The case where the color differences were "3" or less at all densities was evaluated as A, the case where the color differences were more than "3" at two densities was evaluated as B, and the case where the color differences were more than "3" at all densities was evaluated as C.

Gas fastness: A sample was kept under conditions of an ozone concentration of 0.5 ppm for 7 days, and the color difference between before and after that was evaluated in the same manner as with the light fastness. The dye residual rates were evaluated at three reflection densities of 1, 1.3 and 1.6. The case where the color differences were "10" or less at all densities was evaluated as A, the case where the color differences were more than "10" at two densities was evaluated as B, and the case where the color differences were more than "10" at all densities was evaluated as C. Results thereof are shown in Table C and Table D.

TABLE C

| Ink Set | Printing Performance (1) | Printing Performance (2) | Drying Property | Blotting of Thin Lines (1) | Blotting of Thin Lines (2) | Water Resistance |
|---|---|---|---|---|---|---|
| 101 | A | A | Good | Good | Good | Good |
| 102 | A | A | Good | Good | Good | Good |
| 103 | A | A | Good | Good | Good | Good |
| 104 | A | A | Good | Good | Good | Good |
| 105 | A | A | Good | Good | Good | Good |

TABLE D

| Ink Set | Light Fastness | Heat Fastness | Gas Fastness |
|---|---|---|---|
| 101 | B | C | C |
| 102 | A | A | B |
| 103 | A | A | A |
| 104 | A | A | B |
| 105 | B | B | B |

The results reveal that the use of the ink composition of the invention provides excellent ejection stability without clogging, and also gives excellent water resistance and fastness. Further, no blotting is observed in outputting the thin lines, so that the composition of the invention is also excellent in its performance.

Even when the image receiving paper used in the invention is changed to ink jet paper manufactured by Fuji Photo Film o., Ltd., image brightness, photographic finishing and PR101 manufactured by Canon Inc., effects similar to the above-mentioned results are observed. Further, even when surfactants described in Japanese Patent Application No. 2001-80090, 2001-11821 or 2001-11822 are used either alone in place of SURFYNOL 465, or in combination with SURFYNOL 465, similar effects were obtained.

Example 2

The ink sets prepared in Example 1 were each loaded in a cartridge of an ink jet printer BJ-F850 (manufactured by Canon Inc.), and images were printed with the printer on ink jet paper manufactured by Fuji Photo Film Co., Ltd. to image brightness and photographic finishing. The same evaluations as with Example 1 provided results similar to those of Example 1. Further, even when PM Photographic Paper manufactured by Seiko Epson Corporation and PR101 manufactured by Canon Inc. were used as the image receiving paper, similar effects were observed.

The ink set of the invention is excellent in respect to handling, odors and safety, high in ejection stability, moreover also excellent in hues, light resistance and water resistance of images obtained, has no drawback with regard to image quality such as blotting of thin lines, and can be improved in image keeping quality under severe conditions. Accordingly, the ink set of the invention, the ink cartridge containing it, and further the printer carrying them can maintain excellent ejection stability, even when the ink is kept for a long period of time or under severe conditions. Further, the resulting recorded matter is also high in fastness.

The entire disclosure of each and every foreign patent application: Japanese Patent Applications No. 2002-242237, from which the benefit of foreign priority has been claimed in the present application is incorporated herein by reference, as if fully set forth.

What is claimed is:

1. An ink set comprising a plurality of inks different in hues, wherein the plurality of inks includes a black ink containing a coloring agent that is a dye having: a λmax of 500 nm to 700 nm; a half value width of 100 nm or more in an absorption spectrum of a dilute solution normalized to an absorbance of 1.0; and a forced fading rate constant of $5.0 \times 10^{-2}$ [hour$^{-1}$] or less, in which the forced fading rate constant is decided by dissolving and/or dispersing the dye in an aqueous medium to form an ink composition for ink jet recording, printing the ink composition on a reflection type medium, thereafter measuring a reflection density through a Status A filter, specifying one point having a reflection density ($D_B$) in an yellow region of 0.90 to 1.10 as an initial density of the ink, forcedly fading the printed matter by use of an ozone fading tester that can regularly generate 5 ppm of ozone, and determining the time taken until the reflection density reaches 80% of the initial density, wherein the dye is compound represented by the following general formula (1):

  (1)

wherein A, B and C each independently represents an aromatic group or a heterocyclic group, which may be substituted, m is an integer of 1 or 2, and n is an integer of 0 or more, with the proviso that at least one of A, B and C is a heterocyclic group which may be substituted.

2. An ink set comprising a plurality of inks different in hues, wherein the plurality of inks includes a black ink containing a coloring agent that is a dye represented by the following general formula (1), the dye having: a λmax of 500 nm to 700 nm; and a half value width of 100 nm or more in an absorption spectrum of a dilute solution normalized to an absorbance of 1.0:

  (1)

wherein A, B and C each independently represents an aromatic group or a heterocyclic group, which may be substituted, m is an integer of 1 or 2, and n is an integer of 0 or more, with the proviso that at least one of A, B and C is a heterocyclic group which may be substituted.

3. The ink set described in claim 1 or 2, which further comprises at least one dye having a λmax of 350 nm to 500 nm.

4. The ink set described in claim 1 or 2, wherein n and m in the formula (1) are 1.

5. The ink set described in claim 1 or 2, wherein at least two of A, B and C in the general formula (1) are a heterocyclic group which may be substituted.

6. The ink set described in claim 1 or 2, which further comprises at least a coloring agent represented by the following general formula (M-I) as the magenta ink:

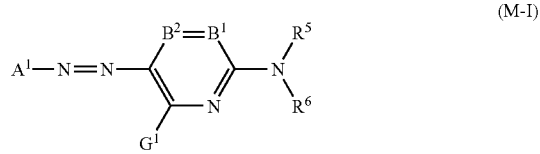  (M-I)

wherein $A^1$ represents a residue of a 5-membered heterocyclic diazo component $A_1$-NH$_2$; $B^1$ and $B^2$ each represent a nitrogen atom, —CR$^1$= and —CR$^2$=, and when one of $B^1$ and $B^2$ represents a nitrogen atom, the other represents —CR$^1$= or —CR$^2$=; $R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, which may further have a substituent group; $G^1$, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group (containing a heterocyclic amino group and an anilino group), an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, an alkyl- or arylsulfonyl group, a heterocyclic sulfonyl group, an alkyl- or arylsulfinyl group, a heterocyclic sulfinyl group, a sulfamoyl group, a sulfo group or a heterocyclic thio group, which may be further substituted; and $R^1$ and $R^5$, or $R^5$ and $R^6$ may combine with each other to form a 5- or 6-membered ring.

7. The ink set described in claim 1 or 2, which further comprises a coloring agent represented by the following general formula (C-I) as the cyan ink:

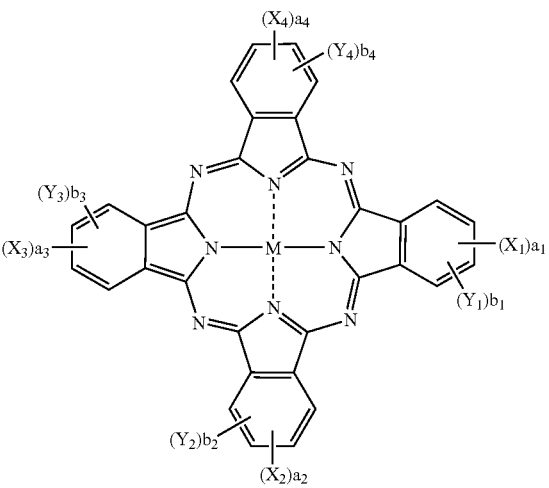

wherein $X_1$, $X_2$, $X_3$ and $X_4$ each independently represents —SO-$Z_1$, —SO$_2$-$Z_1$, —SO$_2$NR$_{21}$R$_{22}$, —CONR$_{21}$R$_{22}$ or —CO$_2$R$_{21}$; $Z_1$ represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; $R_{21}$ and $R_{22}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; $Y_1$, $Y_2$, $Y_3$ and $Y_4$ each independently represents a univalent substituent group; $a_1$ to $a_4$ and $b_1$ to $b_4$ each represents the substituent group number of $X_1$ to $X_4$ and $Y_1$ to $Y_4$, respectively, $a_1$ to $a_4$ each independently represents a number of 0 to 4, but there is no case where all are 0 at the same time, $b_1$ to $b_4$ each independently represents a number of 0 to 4, and when $a_1$ to $a_4$ and $b_1$ to $b_4$ each represents a number of 2 or more, pluralities of $X_1$'s to $X_4$'s and $Y_1$'s to $Y_4$'s may each be the same or different; and M is a hydrogen atom, a metal atom, or an oxide, hydroxide or halide thereof.

8. The ink set described in claim 1 or 2, which further comprises a coloring agent represented by the following general formula (Y-I) as the yellow ink:

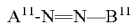

$$A^{11}\text{-}N{=}N\text{-}B^{11} \qquad (Y\text{-}I)$$

wherein $A^{11}$ and $B^{11}$ each independently represents a heterocyclic group which may be substituted.

9. The ink set described in claim 6, wherein the magenta ink includes a set of two or more inks different in ink concentration, and the ink concentration of one magenta ink is 0.05 to 0.5 time that of the other magenta ink.

10. The ink set described in claim 7, wherein the cyan ink includes a set of two or more inks different in ink concentration, and the ink concentration of one cyan ink is 0.05 to 0.5 time that of the other cyan ink.

11. A color ink cartridge comprising at least a black ink, wherein the black ink includes the coloring agent described in claim 1 or 2.

12. The ink cartridge described in claim 11, which further comprises: a coloring agent represented by the following general formula (M-I) as the magenta ink; and a coloring agent represented by the following general formula (C-I) as the cyan ink:

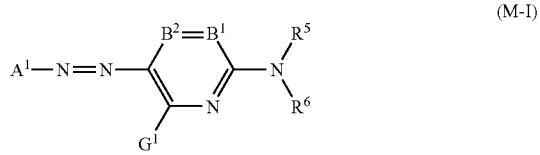

(M-I)

wherein $A^1$ represents a residue of a 5-membered heterocyclic diazo component $A_1\text{-}NH_2$; $B^1$ and $B^2$ each represent a nitrogen atom, $-CR^1=$ or $-CR^2=$, and one of $B^1$ and $B^2$ represents a nitrogen atom, the other represents $-CR^1=$ or $-CR^2=$; $R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, which may further have a substituent group; $G^1$, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group containing a heterocyclic amino group and an anilino group, an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, an alkyl- or arylsulfonyl group, a heterocyclic sulfonyl group, an alkyl- or arylsulfinyl group, a heterocyclic sulfinyl group, a sulfamoyl group, a sulfo group or a heterocyclic thio group, which may be further substituted; and $R^1$ and $R^5$, or $R^5$ and $R^6$ may combine with each other to form a 5- or 6-membered ring:

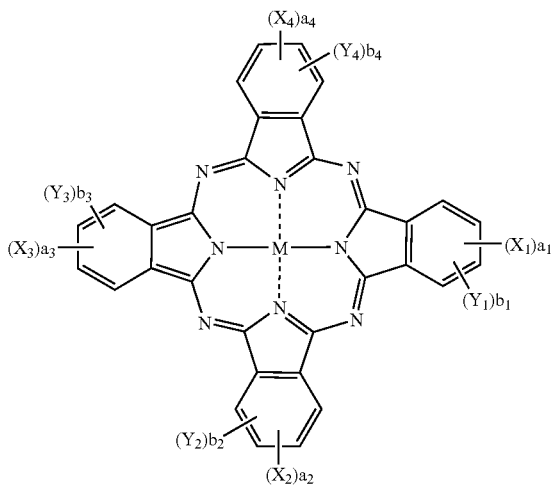

(C-I)

wherein $X_1$, $X_2$, $X_3$ and $X_4$ each independently represents $-SO\text{-}Z_1$, $-SO_2\text{-}Z_1$, $-SO_2NR_{21}R_{22}$, $-CONR_{21}R_{22}$ or $-CO_2R_{21}$; $Z_1$ represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; $R_{21}$ and $R_{22}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; $Y_1$, $Y_2$, $Y_3$ and $Y_4$ each independently represents a univalent substituent group; $a_1$ to $a_4$ and $b_1$ to $b_4$ each represents the substituent group number of $X_1$ to $X_4$ and $Y_1$ to $Y_4$, respectively, $a_1$ to $a_4$ each independently represents a number of 0 to 4, but there is no case where all are 0 at the same time, $b_1$ to $b_4$ each independently represents a number of 0 to 4, and when $a_1$ to $a_4$ and $b_1$ to $b_4$ each represents a number of 2 or more, pluralities of $X_1$'s to $X_4$'s and $Y_1$'s to $Y_4$'s may each be the same or different; and M is a hydrogen atom, a metal atom, or an oxide, hydroxide or halide thereof.

13. The ink cartridge described in claim 11, which further comprises at least one coloring agent represented by the following general formula (Y-I) as the yellow ink:

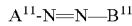

$$A^{11}\text{-}N{=}N\text{-}B^{11} \qquad (Y\text{-}I)$$

wherein $A^{11}$ and $B^{11}$ each independently represents a heterocyclic group which may be substituted.

14. An ink jet printer incorporating the ink set described in claim 1 or 2.

15. An image recording method comprising forming an ink jet image by inkjet printing with the ink set described in claim 1 or 2 in conducting color printing.

* * * * *